(12) United States Patent
Mushtaq

(10) Patent No.: US 10,764,313 B1
(45) Date of Patent: Sep. 1, 2020

(54) METHOD AND SYSTEM FOR PROTECTION AGAINST NETWORK-BASED CYBER THREATS

(71) Applicant: SlashNext, Inc., Pleasanton, CA (US)

(72) Inventor: Atif Mushtaq, San Ramon, CA (US)

(73) Assignee: SLASHNEXT, INC., Pleasanton, CA (US)

( * ) Notice: Subject to any disclaimer, the term of this patent is extended or adjusted under 35 U.S.C. 154(b) by 161 days.

(21) Appl. No.: 15/878,792

(22) Filed: Jan. 24, 2018

Related U.S. Application Data

(60) Provisional application No. 62/449,960, filed on Jan. 24, 2017.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/145* (2013.01)

(58) Field of Classification Search
CPC ................................................. H04L 63/1425
See application file for complete search history.

(56) References Cited

U.S. PATENT DOCUMENTS

| | | | | |
|---|---|---|---|---|
| 7,054,930 B1 * | 5/2006 | Cheriton | ............. | H04L 63/0263 370/390 |
| 8,402,543 B1 * | 3/2013 | Ranjan | ................ | H04L 63/1416 709/223 |
| 9,165,142 B1 * | 10/2015 | Sanders | ................ | G06F 21/566 |
| 9,672,355 B2 | 6/2017 | Titonis et al. | | |
| 10,565,376 B1 * | 2/2020 | Jung | ................... | G06F 11/3034 |
| 2006/0130144 A1 * | 6/2006 | Wernicke | ................ | G06F 21/56 726/24 |
| 2008/0141376 A1 * | 6/2008 | Clausen | ................ | G06F 21/566 726/24 |
| 2009/0047937 A1 | 2/2009 | Zellner et al. | | |
| 2013/0054619 A1 * | 2/2013 | Liu | ........................ | H04L 43/028 707/748 |
| 2014/0298460 A1 | 10/2014 | Xue et al. | | |

(Continued)

FOREIGN PATENT DOCUMENTS

WO     WO-2011028176 A1 *    3/2011    ............. H04L 63/02

OTHER PUBLICATIONS

Shabtai, Asaf, et al. "Detection of malicious code by applying machine learning classifiers on static features: A state-of-the-art survey." information security technical report 14.1 (2009): 16-29. (Year: 2009).*

(Continued)

*Primary Examiner* — Shawnchoy Rahman
(74) *Attorney, Agent, or Firm* — Wilson Sonsini Goodrich & Rosati

(57) ABSTRACT

An Active Cyber Defense method and system is provided for detecting and stopping malicious cyber activity including for example Drive-By Exploits, Malicious Binaries, Data Exfiltration, Social Engineering and Credential Stealing Attacks. The system disclosed herein can be configured to detect and block multi protocol network-based cyber attacks targeting different platforms or operating systems. The system can also be configured to be scalable. The system as disclosed herein can conduct real time inspection of network traffic and can self-learn and adapt as needed to a changing cyber threat landscape.

17 Claims, 27 Drawing Sheets

(56) References Cited

U.S. PATENT DOCUMENTS

| | | | |
|---|---|---|---|
| 2016/0149943 A1* | 5/2016 | Kaloroumakis | H04L 63/1416 726/23 |
| 2020/0104498 A1* | 4/2020 | Smith | G06F 21/567 |

OTHER PUBLICATIONS

Bilge, et al. EXPOSURE: Finding Malicious Domains Using Passive DNS Analysis, Ndss, 2011.

Burnap, et al. Real-time classification of malicious URLs on Twitter using machine activity data, Advances in Social Networks Analysis and Mining (ASONAM), 2015 IEEE/ACM International Conference on. IEEE, 2015.

Co-pending U.S. Appl. No. 15/662,993, filed Jul. 28, 2017.

Seifert, et al. Identification of malicious web pages through analysis of underlying DNS and web server relationships, LCN, 2008.

Le, et al. Two-stage classification model to detect malicious web pages, Advanced Information Networking and Applications (AINA), IEEE, 2011, 8 pages.

Ma, et al. Beyond blacklists: learning to detect malicious web sites from suspicious URLs, Proceedings of the 15th ACM SIGKDD international conference on Knowledge discovery and data mining, ACM, 2009.

Ma, et al. Learning to detect malicious Urls, ACM Transactions on Intelligent Systems and Technology Article 30, Apr. 2011, 24 pages.

Xu, et al. Autoprobe: Towards automatic active malicious server probing using dynamic binary analysis, Proceedings of the 2014 ACM SIGSAC Conference on Computer and Communications Security, ACM, 2014.

U.S. Appl. No. 15/662,993 Office Action dated Oct. 31, 2019.

U.S. Appl. No. 15/662,993 Office Action dated May 14, 2019.

U.S. Appl. No. 15/662,993 Notice of Allowance dated May 20, 2020.

\* cited by examiner

FIG. 18

| | Detail | Infected Machine ▽ | Infection Information | | Headquarter | | |
|---|---|---|---|---|---|---|---|
| | | | | | ⊛ C&C | ⊗ Malware | ⊛ Hacker Group |
| ○ | ≡ | DAVE_LAPTOP | Infected Machine IP | 10.0.0.28 | Name: CredStealing:Web/ Origin: Panama | | |
| ○ | ≡ | Karen_LAP | Infected Machine Name | DAVE-LAPTOP | GoogleDrive | | |
| ○ | ≡ | HR_PC | Department | Dev | Alias: N/A | | |
| ○ | ≡ | JHG_ACCEL | OS | Macintosh | Affected Platforms: Windows, OSX, iOS and Android | | |
| ○ | ≡ | John_LT | Connection Attempts | 1 | Description | | |
| ○ | ≡ | John_LT | Malware Name | CredStealing:Web/Goog... | Warning: System has intercepted a Credential Stealing attempt. In this instance attackers operating out of a remote location setup a web server hosting a fake google login page. The page was designed to look visually similar to the original Google Docs login interface. This stealing attempt has been intercepted and attacker's information has been submitted to your firewall in order to block all subsequent connection attempts to malicious server.<br><br>What is Credential Stealing?<br><br>Credential Stealing is an effective way to snatch someone's confidential information. Hacker's create a look-a-like web page matching different brands' (Google, Yahoo, Microsoft etc.) Sign-in, Sign-up, Password recovery pages etc. and send victim a deceiving email or instant message linking to this fake page. When the victim reads the message, the fake page is displayed for the victim. If the victim doesn't pay close attention to the URL or security certificate of the page, he/she would enter confidential information onto the fake page - resulting in real time transfer of the user's sensitive information to attackers. | | |
| ○ | ≡ | Home-98 | Attack Category | Crimeware | | | |
| ○ | ≡ | Home-98 | Hacker Group | EnergeticBear | | | |
| ○ | ≡ | MIKE-PC | Malware Type | Credential Stealing | | | |
| ○ | ≡ | JHG-ACCEL | First seen | 31/05/2016 08:41 AM | | | |
| ○ | ≡ | JHG-ACCEL | Last seen | 31/05/2016 08:41 AM | | | |
| ○ | ≡ | JHG-ACCEL | Tag | High Priority | | | |
| ○ | ≡ | Lab-09876 | Event Type | DeNet | | | |
| | | | Event Id | 493 | | | |

FIG. 19

| | | Infection Information | |
|---|---|---|---|
| Detail | Infected Machine ▽ | Infected Machine IP | 10.0.0.28 |
| | DAVE_LAPTOP | Infected Machine Name | DAVE-LAPTOP |
| | Karen_LAP | Department | Dev |
| | HR_PC | OS | Macintosh |
| | JHG_ACCEL | Connection Attempts | 1 |
| | John_LT | Malware Name | CredStealingWeb/Goog... |
| | John_LT | Attack Category | Crimeware |
| | Home-98 | Hacker Group | EnergeticBear |
| | Home-98 | Malware Type | Credential Stealing |
| | MIKE-PC | First seen | 31/05/2016 08:41 AM |
| | JHG-ACCEL | Last seen | 31/05/2016 08:41 AM |
| | JHG-ACCEL | Tag | High Priority |
| | JHG-ACCEL | Event Type | DeNet |
| | Lab-09876 | Event Id | 493 |

Headquarter

C&C | Malware | Hacker Group

Name: EnergeticBear  Country/Region: China
Expertise: APTs (Advance Persistent Threats)
Common Targets: Defence Contractors, Media outlets, High-Tech companies and multiple governments
Location: China
Alias: APT-12, DYNCALC, IXESHE, JOY RAT
Description:
EnergeticBear, famous with the name of APT-12 is a Chinese Attacker Group that deals with Advanced Persistent Threats. EnergeticBear has a long list of high-profile victims including different Governments, Fortune 500 Companies and Media Outlets.

In 2013, the New York Times found out it has been persistently attacked by Chinese hackers for the past four months. The nature of the hack had experts believing it was coming from a Chinese cyberattack group, dubbed Numbered Panda in the U.S. for Advanced Persistent Threat 12. According to the New York Times, the computer systems and passwords of several reporters and other employees, including the email account of Shanghai bureau chief David Barboza, who wrote the initial report on Wen Jiabao's family wealth, were accessed by APT entities. The two malware families spotted in the attacks, Aumlib and Ixeshe, have been enhanced to encode HTTP communication and use new network traffic patterns respectively. The researchers speculate this is an attempt to avoid detection by security systems.

EnergeticBear likes to use is to dynamically calculate the Command and Control (C2) port by resolving a DNS. This effectively helps them bypass egress filtering implemented to prevent unauthorized communications on some enterprises.

EnergeticBear started a new campaign targeting organizations in Japan and Taiwan in 2014.

Major Weaponizing tactics used by EnergeticBear are Screen saver (.scr) files, binary executables and PDF documents. Etumbot (named as RIPTIDE by FireEye) is a proxy-aware backdoor malware that communicates via HTTP to a hard-coded command and control (C2) server is also associated with Energetic Bear which is spread by using screen saver (.scr)

FIG. 20

METHOD AND SYSTEM FOR PROTECTION AGAINST NETWORK-BASED CYBER THREATS

CROSS-REFERENCE TO RELATED APPLICATIONS

This application claims the priority and benefit of U.S. Provisional Application No. 62/449,960 filed on Jan. 24, 2017, the entire content of which is incorporated herein by reference.

BACKGROUND OF INVENTION

1. Field of the Invention

The present application relates to the field of Internet security and in particular, to a method and system for detecting and blocking different types of network-based cyber attacks.

2. Description of Background Art

Modern day hackers can attempt to infiltrate computer systems using a variety of network-based cyber attacks. These malicious attacks can be conducted to perform different types of malicious activities like Data Theft, Spam, Click-Fraud, Espionage, Ransom, Data Destruction etc. Although anti-virus software has been available since the late 1990's and more recently, Intrusion Prevention Systems (IPS), Sandbox based Web MPS, and Next Generation Firewalls have attempted to add protection against certain attacks such as, for example certain types of malware, none of these systems has been able to provide sufficient protection against the current generation of cyber attacks.

There are many types of network-based cyber attacks including for example Drive-By Exploits, Malicious Binaries, Data Exfiltration, Social Engineering and Credential Stealing Attacks. Modern day hackers try to infiltrate computer systems using a variety of attacks including but not limited to Drive-by Exploits, Malicious Binaries, Data Exfiltration, Social Engineering and Credential Stealing attacks.

These malicious attacks can be delivered through multiple types of protocols like HTTP, HTTPS/TLS/SSL, SMB, RPC, FTP, SMTP, DNS etc. designed to target multiple types of operating systems like Windows, Linux, Android, iOS, IOT devices and SCADA systems.

Drive-By Exploits usually try to compromise users' browsers by exploiting a variety of software vulnerabilities within browsers' code, plugins and operating system underneath. End goal is to exploits these vulnerabilities and run a remote shell code within browse memory that can download and install additional malicious executables on the compromised system. Most of these software exploits are delivered through malicious web sites using HTTP or HTTPS protocols. Executables delivered through these exploits can be of different types depending on the target OS, like Widows PE format, Linux ELF, OSX MACH-O, Android APK etc.

Malicious binaries are standard OS executable used to compromise a system permanently. Malicious executables or binaries can be of different types depending on the target OS, like Windows PE format, Linux ELF, MACH-O, APK designed to carry different types of malicious activities like Data Theft, Spam, Click-Fraud, Espionage, Ransom, Data Destruction etc. These malicious binaries can be delivered to target systems though Drive-by or Social Engineering Attacks (SEAs). In some cases, a malicious binary can be downloaded and installed by malware already installed on the system to increase the attacks surface or as an update.

Data Exfiltration is the end game for most of the cyber attacks, the aim of the attackers is often to steal Victim's personal information once this information is gathered from the infected machine or from the surrounding network. It is uploaded to a remote location controlled by hackers. Sometime this data exfiltration phase is done directly through installed malicious binaries or a human threat actor can remotely log into the machine through a planted backdoor and upload this information manually. Attackers use protocols of their choice to exfiltrate this data, most common choices are HTTP, HTTPS/TLS/SSL, FTP and the like.

Credential Stealing Attacks are an effective way to snatch someone's confidential information. Hacker's create a look-a-like web page matching different brands' (Google, Yahoo, Microsoft etc.) Sign-in, Sign-up, Password recovery pages etc. and send victim a deceiving email or instant message linking to this fake page. When the victim reads the message, the fake page is displayed for the victim. If the victim doesn't pay close attention to the URL or security certificate of the page, he/she would enter confidential information onto the fake page—resulting in real time transfer of the user's sensitive information to attackers.

Anti-virus software has been available since the late 1990's. More recently, Intrusion Prevention Systems (IPS), Sandbox based Web MPS and Next Generation Firewalls have attempted to add protection against certain types of malware. These devices commonly depend on two detection technologies for detecting malware: signatures and sandboxes. Unfortunately, both of these detection mechanisms are easily circumvented by the current generation of cyber-attacks.

Binary Signatures are constant patterns or a numeric hash of a known bad binary created by human researchers to identify a malware and its future variants with a quick lookup. An anti-virus engine is used to test each file on a system against a database of known malicious signatures. This method of detection has been around since the beginning of anti-virus systems and is well understood by both anti-virus vendors and hackers. To circumvent signature based detection, modern malware employ polymorphic designs that evade detection through the use of self-modifying code. Malware capable of polymorphism can change their binary code on the fly so that signatures designed to catch them using known code patterns should not longer be able to detect them.

As the internet grew, malware began to proliferate over the network. Network signatures based malware detection technologies emerged to protect against threats using network as an infection medium. Network signatures based malware detection technologies look for constant patterns (signatures) in network streams, known bad domain names or ip addresses (blacklist). Like binary signatures, these network based signatures and blacklisting cannot detect zero-day/never seen before and polymorphic attacks.

The inherent limitations of signatures and blacklisting based detection lead to the creation of virtual machines or "sandboxes". Using this approach, a suspected malware object is "detonated" within the controlled sandbox environment and its behavior is carefully observed for malicious activity. While better than a simple signature check, sandbox detection also suffers from several inherent limitations.

Sandbox detection may be unable to detect all types of attacks. Since the sandbox "observes" what an object does, it is only useful for malware delivered as a payload object such as an EXE, DOC or PDF file etc. Data Exfiltration, Credential Stealing attacks, Social Engineering, Java-script Exploits, or attacks embedded inside a container such as flash animation files running inside browser cannot be easily detected using a sandbox.

Encryption can be an issue. If the object is delivered via an encrypted network stream (HTTPS/TLS/SSL) the sandbox cannot extract the object and so cannot test it. Moreover, most modern shell codes and malware download subsequent binary payloads using customized encryption. Sandbox object extraction modules cannot detect these encrypted payloads and so cannot submit these payloads to Virtual Machines for dynamic analysis—resulting in false negatives. Profile Mismatch is another big problem. The sandbox environment must be updated for each operating system and application variant—no easy task for the security vendor. In fact, it's almost impossible to maintain a single software profile inside a virtual machine (sandbox) that matches the configuration of all deployed devices on a corporate network. This profile mismatch can severely limit the sandboxes' ability to detect an attack. For example, an attack might succeed when run in a sandbox that has a vulnerable software or OS installed but fail on the actual host with a patched version of the software or OS—causing False Positives. Or, an attack might fail when run in a sandbox that has the most recent patches installed, but succeed on the actual machine that has not yet had patches applied—in this case missing a threat. Similarly, if a particular software or library is not installed or missing inside a Virtual Machine but present on a real machine then an exploit targeting that software or library will succeed on the real machines but will fail inside the Virtual Environment.

Polymorphic Rootkits can be a problem. Most malware developed prior to 2008 had constant rootkits that would produce a fixed set of system modifications (registry, file system, memory, etc.) making it relatively easy for the sandbox based system to do its job. With static rootkit variants, it is easy to manually develop sandbox rules to catch a wide range of attacks, however as the "bad guys" realized that hard coded rootkit logic (inside the actual binary) is easy to detect and hard to change, they began designing dynamically changing variants that generated rootkits "on-the-fly". These polymorphic variants easily bypass static sandbox rules. Additionally, the practice of using dynamically generated rootkits gave birth to the so called FUD (Fully Undetectable) tools. These tools can attach a dynamic rootkit to any binary without changing the underlying source code—which forced sandbox vendors to write thousands of sandbox rules just to catch even a small subset of malware. Essentially sandbox rules became like just signatures, requiring continual updates from an army of human researchers just to keep up with the constantly changing flow of polymorphic malware.

There may be limited operating system support. A sandbox is not a universal detection technology applicable to every platform or OS. It must be expressly designed to emulate a target platform. For example, a sandbox designed to emulate Windows is different from a sandbox designed to emulate OSX, which is different from a sandbox designed to emulate iOS, etc. Most sandbox vendors support only a handful of common OS and application variations. It is extremely difficult to scale a sandbox implementation to support IoT and SCADA systems due to diversity of available platforms.

Latency can be a problem. The sandbox approach is much more time consuming than a simple signature check and cannot be accomplished in real-time. Because of the amount of time required for a sandbox to execute an object, a malicious binary or exploit requested by a user, endpoint is very likely to be received by the requesting endpoint before the sandbox completes its detection sequence. This is true even if a network based sandbox is running in 'inline blocking' mode. Because it is unacceptable to delay network traffic for several minutes, the main reason sandboxes blocking capability is limited to signature based matching.

Sandbox evasion can be a challenge to address. Modern malware and exploits try to detect the presence of a sandbox environment at the very beginning of their code execution. If they detect that they are running inside a sandbox, the execution is aborted and the malicious payload is never executed, making the sandbox believe that it's a benign object.

Sandbox evasions can be divided into several categories: Emulator Detection and Hypervisor Detection. Emulator or Virtual Machine detection code looks for visible signs left by a particular Virtual Machine implementations such as Virtual Hardware profiles, Virtual Machine tools, References on file system and registry keys. Presence of any VM finger prints would immediately result in execution abort. Hypervisor Detection involves sandbox virtual machines that use virtualized hardware capabilities using kernel hypervisors. There are three popular hypervisors currently used by sandbox vendors: KVM, XEN, and Microsoft Hyper-V. Malware often use machine instructions anomalies to detect the presence of a hypervisor. Many instructions that run perfectly on a bare metal system are but mapped to 'NOP' inside a hypervisor. Similar a lot of instructions behave differently when executed through hypervisors. Once these variations are detected malware may abort any malicious activity.

In addition, a variety of malicious activities including cyber attacks can be performed with the help of malicious servers. These malicious servers are online hosts that are set up and controlled by cyber criminals and can be set up to serve malware binaries, exploits, social engineering, and/or credential stealing attacks. Some of these servers can act as mother-ships that malware can use to retrieve commands and to upload stolen data after successfully compromising a machine.

One challenge in detecting cyber attacks and the malicious servers that perform them lies in gathering intelligence from these servers without alerting cyber criminals who are actively engaged in monitoring server connections to evade detection. Most of the malicious hosts log and monitor all connections to their servers and can block or reset a connection the moment they realize that someone is trying to investigate or is spying on them.

Another challenge lies not just in gathering but also in utilizing the different forensic intelligence available from online servers to accurately and automatically detect whether a given server is malicious or benign.

Moreover, as described above, current methods and systems for protecting against network-based cyber attacks lack the ability to detect and block cross platform attacks and thus cannot effectively adapt to a changing cyber threat landscape.

What is needed is a method and system for detecting and stopping malicious cyber activity that is applicable to any platform or OS, is supported by all major operating systems, has the ability to detect and block both object and non object based cyber attacks, and is scalable. It would also be advantageous for such a universal detection method and system to conduct real time inspection of network traffic and to self-learn and adapt as needed to a changing cyber threat landscape.

Additionally, it would be desirable to provide a method and system that can automatically and covertly spy on an online server to extract forensic data and intelligence gathered in real time and utilize such data to determine whether the server is part of a cybercrime infrastructure. If an online server is found to be malicious then an inference can be made that all packets transferred to and from this server are malicious as well. It would also be advantageous to gather the real-time intelligence in a manner that does not alert a cybercriminal or malicious host that someone is trying to spy on them.

Finally, it would be desirable to provide a method and system that can use Natural Language Processing (NLP) and Visual Analysis to automatically analyze a web page for detecting a variety of malicious activities. For instance, Natural Language and Visual Analysis may be used to detect network based cyber-attacks.

SUMMARY OF INVENTION

According to one or more embodiments, an Active Cyber Defense System is provided for automatically inspecting network traffic in real time and for detecting and blocking different types of network-based cyber attacks using a series of machine learning classifiers that can self-learn and adapt according to changing cyber threat landscape. In one aspect, a method for detecting and blocking malicious cyber activity can comprise: monitoring and capturing network session activity between one or more clients and one or more internet servers; extracting a network flow from the network session activity; and evaluating the network flow to identify a potentially malicious traffic session. Features can be extracted from the identified potentially malicious traffic session and the features can be evaluated to classify the identified potentially malicious traffic session as a malicious session or as a benign session. An automated incident management engine can be provided that can receive the malicious session and can independently block all subsequent communication associated with the malicious session. The incident management engine can determine an infected machine and user information in response to the malicious session and can add the infected machine and user information to a database. The added infected machine and user information can be marked as an incident. The incident management engine can also send a notification related to the incident.

In another aspect, a system for detecting and blocking malicious cyber activity can comprise: a digital processing device comprising: at least one processor, an operating system configured to perform executable instructions, a memory, and a computer program including instructions executable by the digital processing device to create an Active Cyber Defense application. The Active Cyber Defense application can comprise a packet capturing module, a protocol finger printing module, an analysis engine module, an incident management engine module, and a user interface. The packet capturing module can be configured to monitor and capture network session activity between one or more clients and one or more internet servers and to extract a network flow from the network session activity. The protocol finger printing module can be configured to evaluate the network flow to identify a type of protocol associated with the network flow.

The analysis engine module can comprise a protocol analysis engine module and an active analysis engine module. The protocol analysis engine module can be configured to extract and evaluate features from the network flow and to classify the network flow as a potentially malicious flow or as a benign flow in response to the feature evaluation. The active analysis engine module can be configured to evaluate a potentially malicious flow received from the protocol analysis engine and to determine whether the potentially malicious flow is malicious or benign.

The incident management engine module can comprise a threat attribution engine, a blocking module, a notification module, and a central database. The threat attribution engine can be configured to identify an infected machine and user information in response to the malicious flow and to evaluate the malicious flow to identify a group responsible for an attack associated with the malicious flow. The blocking module can be configured to block subsequent communication associated with the malicious flow. The incident manager can be configured to interact with and/or to manage the threat attribution engine, the blocking module, a notification module, and a central database. The incident manager can store the infected machine and user information in the central database. The stored infected machine and user information can be marked as an incident and the notification module can be configured to send a notification related to the incident.

In addition, an Active Intelligence method and system is provided for automatically and covertly extracting forensic data and intelligence in real time to determine whether a selected server is part of a cybercrime infrastructure. In some embodiments, a method for detecting an online malicious server using an active intelligence manager comprises: analyzing network traffic between one or more clients and one or more internet servers, the network traffic comprising one or more internet communications between at least one client and at least one server; extracting network variables from the internet communication, wherein the network flow consists of one or more variables related to the internet communication between the client and the server; and constructing a session identity structure from the network flow. An automated active intelligence manager can be provided that receives the session identity structure. The active intelligence manager can independently perform several steps. In particular, the active intelligence manager can process the session identity structure and can collect or gather one or more types of forensic intelligence related to the operation of the server based on the processed session identity structure.

In some embodiments, a method and system for detecting credential stealing attacks using an automated machine-learning page examination engine can be used to detect brand-based and custom credential stealing attacks. For instance, a method for analyzing a candidate web page to detect credential stealing attacks using a machine-learning page examination engine can comprise providing a candidate web page, providing brand profiles stored in a brand knowledge base, wherein each brand profile comprises brand identity information and brand features extracted from a known brand web page, and providing an automated machine-learning page examination engine that receives and processes the candidate web page. The page examination engine can independently extract candidate identity information and candidate features from the candidate web page and can compare the candidate identity information to the brand identity information. If the candidate identity information matches the brand identity information from at least one of the brand profiles, the engine determines that the candidate web page is not a credential stealing page. Conversely, if the candidate identity information does not match the brand identity information from at least one of the brand profiles, the engine determines whether the candidate web page is a replica of a known brand page by comparing the candidate features to corresponding brand features from each of the brand profiles. If the candidate web page is determined to be a replica of at least one of the known brand web pages, the engine determines that the candidate web page is a brand-based credential stealing page.

In another example, a method for analyzing a candidate web page to detect credential stealing attacks using a machine-learning page examination engine can further comprise providing custom credential stealing page profiles stored in a custom credential stealing page knowledge base, wherein each custom credential stealing page profile comprises custom features extracted from a web page determined to be a custom credential stealing page. Additionally, brand logo profiles stored in a brand logo knowledge base can also be provided, wherein each brand logo profile comprises brand logo features extracted from official logos of one or more brands. Having determined that: (1) the candidate identity information does not match the brand identity information from at least one of the brand profiles; and (2) the candidate web page is not a brand-based credential stealing page, the page examination engine can compare the candidate features to corresponding custom features from each of the custom credential stealing page profiles to generate custom similarity feature sets. The engine can also compare the candidate features to corresponding brand logo features from each of the brand logo profiles to generate brand logo similarity feature sets. Finally, based on the custom similarity features sets and the brand logo similarity feature sets, the engine can determine whether the candidate web page is a custom credential stealing page.

In an aspect, a method for detecting and blocking malicious cyber activity of a network is provided. The method comprises: (a) monitoring and capturing network session activity between one or more clients and one or more internet servers; (b) extracting a network flow from the network session activity; (c) evaluating the network flow to identify a potentially malicious traffic session; (d) extracting features from the identified potentially malicious traffic session, wherein the features comprise visual and natural language based features; and (e) evaluating the features to classify the identified potentially malicious traffic session as a malicious session or as a benign session.

In some embodiments, the method further comprises: (i) blocking subsequent communication associated with the malicious session; (ii) determining an infected machine and user information in response to the malicious session; and (iii) adding the infected machine and user information to a database, wherein the added infected machine and user information are marked as an incident. In some embodiments, the method further comprises displaying information related to the incident using a graphical interface. In some cases, the infected machine is determined using automated self-learning classifiers.

In some embodiments, the potentially malicious traffic session is identified by processing at least protocol features of the network flow. In some cases, the protocol features of the network flow are processed by automated self-learning classifiers. In some embodiments, the visual and natural language based features comprise at least two of images, texts and source code. In some embodiments, the features further comprise features extracted from real-time intelligence collected by probing a suspicious server associated with the potentially malicious traffic session.

In a separate yet related aspect, a computer-implemented system is provided. The system comprises: a digital processing device comprising: at least one processor, an operating system configured to perform executable instructions, a memory, and a computer program including instructions executable by the digital processing device to create an application comprising: (a) a first module configured to monitor and capture network session activity between one or more clients and one or more internet servers and to extract a network flow from the network session activity; (b) a second module configured to evaluate the network flow to identify a type of protocol associated with the network flow; and (c) a third module configured to: (i) extract and evaluate features from the network flow and to classify the network flow as a potentially malicious flow or as a benign flow in response to the feature evaluation; (ii) evaluate the potentially malicious flow and to determine whether the potentially malicious flow is malicious or benign.

In some embodiments, the system further comprises a fourth module configured to: (i) identify a malware name in response to the malicious flow and to evaluate the malicious flow to identify a hacker group responsible for an attack associated with the malicious flow; and (ii) block subsequent communication associated with the malicious flow. In some cases, the fourth module is further configured to store the infected machine and user information, and wherein the stored infected machine and user information are marked as an incident. In some cases, the fourth module is further configured to send a notification related to the incident.

In some embodiments, the features comprise protocol features. For example, the features comprise one or more members selected from the group consisting of: binary features, nominal features, and numeric features.

In some embodiments, the potentially malicious flow is classified using automated self-learning classifiers. In some embodiments, potentially malicious flow is determined to be malicious or benign based on active features comprising at least visual and natural language based features. In some cases, the visual and natural language based features comprise at least two of images, texts and source code. In some cases, the active features further comprise features extracted from real-time intelligence collected by probing a suspicious server associated with the potentially malicious flow. In some embodiments, the potentially malicious flow is determined to be malicious or benign using automated self-learning classifiers.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 18 is a screen capture of an Event Notification and Command and Control (C&C) page viewed via an interface of Active Cyber Defense System.

FIG. 19 is a screen capture of an Incident Notification and Malware Detail page viewed via an interface of Active Cyber Defense System.

FIG. 20 is a screen capture of an Incident Notification and Hacker Group Detail page viewed via an interface of Active Cyber Defense System.

DETAILED DESCRIPTION

Figure 1:
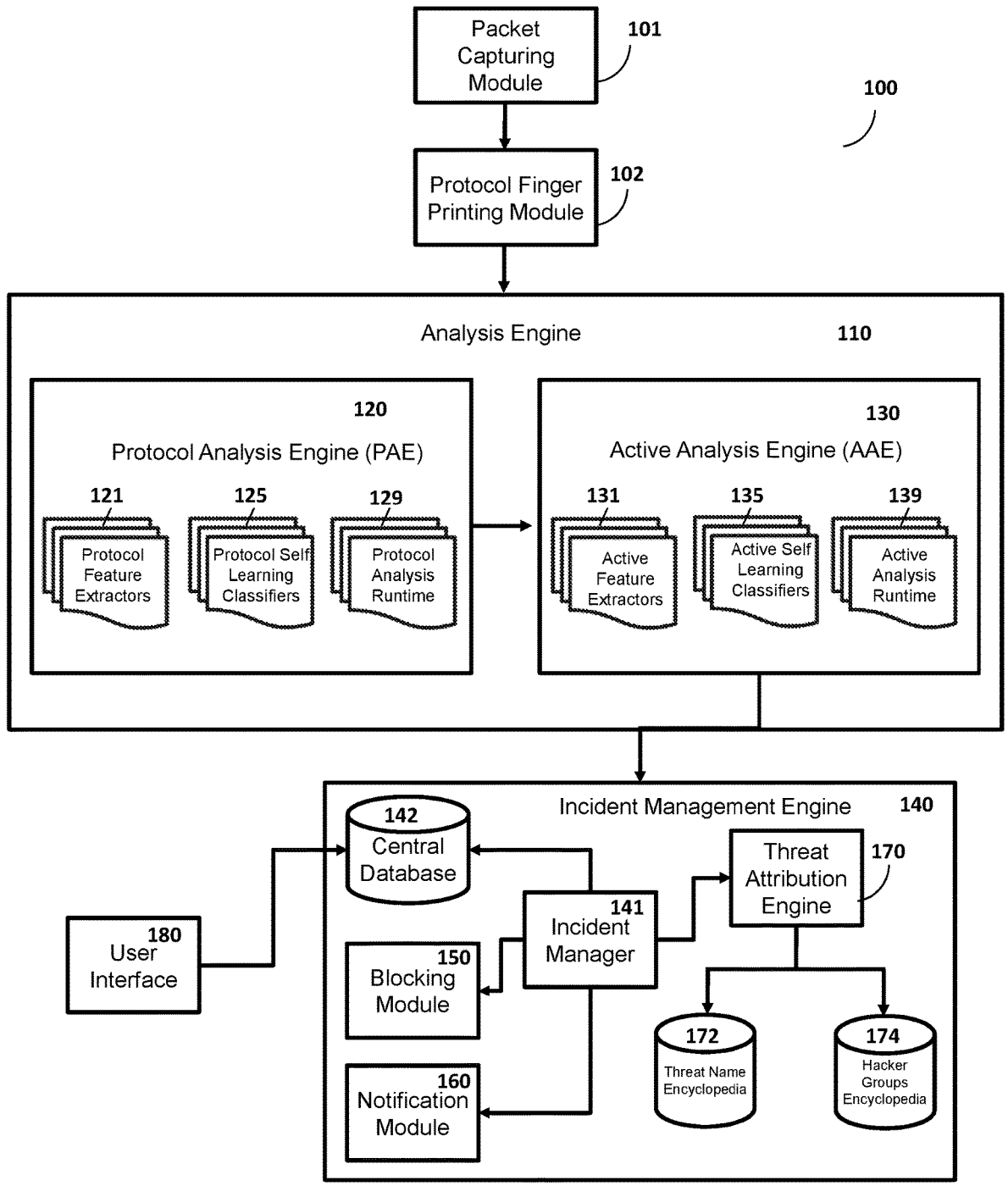
FIG. 1 shows a number of functional components of an embodiment of an Active Cyber Defense System.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Specific embodiments of the disclosed method and system will now be described with reference to the drawings. Nothing in this detailed description is intended to imply that any particular step, component, or feature is essential to the invention.

An Active Cyber Defense System can comprise a cyber attacks protection framework designed specifically to stop a variety of cyber threats like Drive-by Exploits, Malicious Binaries, Data Exfiltration, Social Engineering and Credential Stealing attacks. The system can inspect network traffic in real-time and analyzes it with a series of filtrations, machine learning classification and an attribution process to pin-point and stop a series of malicious activities going within a network.

Once malicious activity is detected, the system can use different mechanisms to block this communication, hence making the attackers attempts to infiltrate the network unsuccessful. Additionally, the system may log all the recorded malicious activity along with digital evidence and identification of the victim machine as an incident. The incident data may further be consumed by network administrators and incident response teams through a variety of built-in user interfaces like Web, CLI (Command Line Interface) and Mobile application for record keeping and postmortem analysis.

The system's Analysis Engine may use a series of machines learning classifiers. The series of machine learning classifiers may be unlike conventional machines learning which are based on supervised learning. Such machine learning classifiers may self learn from its experience and past decision and become incrementally more accurate both in terms of precision and recall. The Analysis engine can detect and stop malicious activities using multiple types of standard and custom protocols like HTTP, HTTPS/TLS/SSL, FTP, SMPTP, DNS, SMB/CIFS, RPC or raw TCP or UDP payloads.

The Analysis Engine, unlike Sandboxes, may rely on a multi layered analysis that can be supported by all major OS like Windows, Linux, OSX, iOS, Android, IOT devices and SCADA giving it a unique ability to detect and block cross platform cyber attacks. The Active Cyber Defense Analysis Engine may not depend on signatures, sandbox, domain/ip blacklisting and instead uses Natural Language Processing (NLP), Visual Analysis and Active Intelligence powered by self-learning machine learning algorithms that are capable of detecting zero-day and polymorphic attacks without a need to update again and again.

In some embodiments, an Active Cyber Defense system and method provides a protection framework against cyber attacks and may be specifically configured to stop a variety of cyber threats including, for example Drive-by Exploits, Malicious Binaries, Data Exfiltration, Social Engineering and Credential Stealing attacks. The system may inspect network traffic in real-time and may analyze and evaluate the network traffic with a series of filtrations, machine learning classification models, and an attribution process in order to pin-point and stop a series of malicious activities that might be going on within a network. In particular, once a malicious activity has been detected, the system can use different mechanisms to block a communication associated with or corresponding to the malicious activity, and thus may thwart any attackers' attempts to infiltrate the network. Not only can the system block malicious communications, but it can also log, in form of an incident, all recorded malicious activity along with digital evidence and identification of the victim machine. The incident data can further be consumed by network administrators and incident response teams through a variety of built-in user interfaces like Web, CLI (Command Line Interface) and Mobile application for record keeping and postmortem analysis.

In addition, the system as disclosed herein can use a series of machine learning classifiers that, unlike conventional machine learning based on supervised learning, can self learn from its experience. Decisions can thus become incrementally more accurate both in terms of precision and recall.

As shown in FIG. 1, an embodiment of an Active Cyber Defense System (100) can comprise a packet capturing module (101), a protocol finger printing module (102), an analysis engine (110), an incident manager (140) and a user interface (180). Information can be acquired by a packet capturing module (101), passed through a protocol finger printing module (102), and into the analysis engine (110), network traffic determined as malicious by analysis engine can then be transferred to the incident management engine (140) in form of an incident.

The system's core functionality can depend on the real time inspection of network traffic. A packet capturing module (101) can capture traffic flowing through a network in a systematic way and forward the traffic to the Analysis Engine for the analysis. Packet acquisition can be achieved through a variety of methods, including software agent, appliance, and direct forwarding. A Software Agent can be installed on all end point devices. This end point agent can sniff traffic from OS TCP/IP drivers and forward it to the Analysis Engine for detailed inspection. Appliances, for example a dedicated hardware appliance or a software appliance running inside off the shelf hardware, can be attached with a network switch, router or firewall for sniffing traffic through the physical mediums. In instances where the system is deployed remotely on a public or private cloud, the traffic from the monitoring network can be forwarded to the system through direct tunnels (like IPSEC, GRE) or via web proxies and the like. Malicious attacks can be delivered through multiple types of protocols like HTTP, HTTPS/SSL/TLS, FTP, SMPTP, DNS, SMB/CIFS, RPC or over raw TCP or UDP payloads and the like. designed to target multiple types of operating systems like Windows, Linux, Android, iOS, IOT devices and SCADA systems.

The protocol finger printing module (102) may be configured to receive network traffic captured through packet capturing module (101) and split it across multiple protocols so that it can be processed for further analysis on a per protocol basis. Once a network session is properly identified as belonging to a protocol family it can be pushed into the corresponding protocol queue to be processed by the Analysis Engine (110). In some cases, the protocols that can be handled by the system may be divided into three main categories: 1) known protocols used both for malicious and benign purposes, 2) known protocols historically used only for benign purposes, and 3) unknown/custom protocols. Known protocols used for both benign and malicious purposes may include standard protocols like HTTP, HTTPS/SSL/TLS, FTP, SMPTP, DNS, SMB/CIFS, RPC and the like. Known protocols used only for benign purposes may be network protocols that have been observed historically used only for benign purpose like SIP, UPnP, NTP, SNMP and the like. All the protocols that are not part of known protocols used both for malicious and benign purposes or known protocols used only for benign purposes, may be labeled as unknown/custom protocols. These unknown/custom protocols may be used for benign and malicious purpose.

An Analysis Engine (110) may process all the queues populated by the protocol finger printing module and may run them through a series of protocol and runtime analysis through the protocol analysis engine (120) and the active analysis engine (130). The analysis engine (110) may comprise a protocol analysis engine (120) and an active analysis engine (130). A protocol analysis engine (120) may comprise protocol feature extractors (121), protocol self-learning classifiers (125), and protocol analysis runtime (129). The protocol analysis engine may identify potentially suspicious network traffic and pass it on to the active analysis engine. An active analysis engine (130) may comprise active feature extractors (131), active self-learning classifiers (135), and active analysis runtime (139). Network traffic classified as malicious by the active analysis engine can be passed on to the incident management engine.

If during analysis, a particular flow is found to be malicious, it may be handed over to the incident Manager module (140) for further processing. In some cases, the flows found to be benign by both the protocol and active analysis engine may be marked as benign and/or may be discarded.

The incident management engine (140) may comprise an incident manager (141) that interacts with a blocking module (150), a notification module (160), a central database (142), and a threat attribution engine (170) that may access databases including the threat name encyclopedia (172), and the hacker groups encyclopedia (174). Information from the incident management engine may be fed into a user interface (180) for displaying the content to the user.

Figure 2:
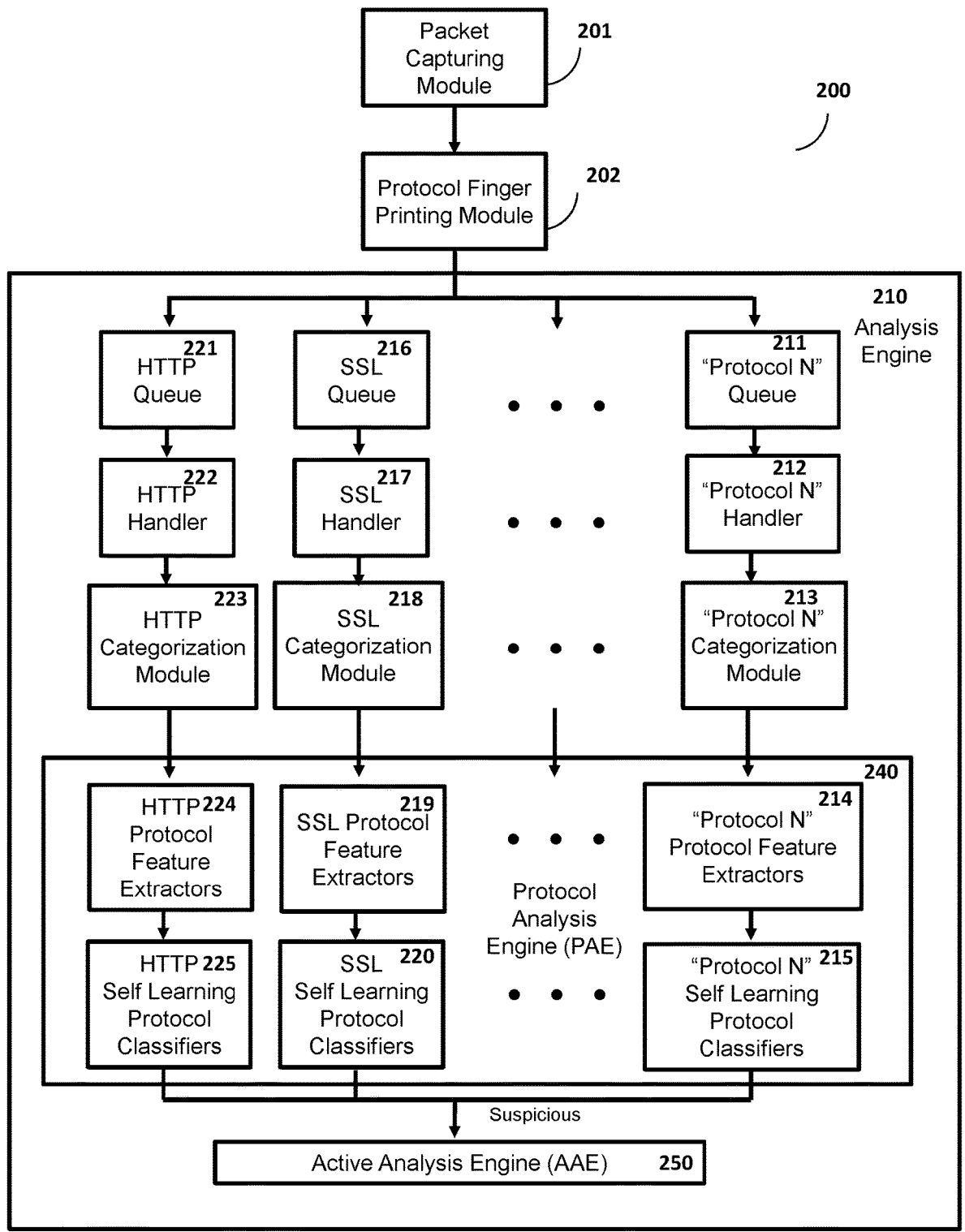
FIG. 2 shows certain elements of the Protocol Analysis Engine (PAE) depicted in FIG. 1 for an exemplary system and method as described herein.

FIG. 2 shows elements of the protocol analysis engine depicted in FIG. 1 for an exemplary system and method as described herein. The packet capturing module (201) may capture traffic and relay it to the protocol finger printing module (202), which may separate the types of protocols before sending the protocols to the analysis engine (210). FIG. 2 illustrates exemplary pathways that protocols may follow as they move through the Protocol Finger Printing Module to the protocol analysis engine. For example, the protocol may comprise an HTTP protocol that is transferred from the protocol finger printing module (202) to an HTTP Queue (221) in the analysis engine (210), then to an HTTP handler (222), and finally to an HTTP Categorization Module (223) before entering the protocol analysis engine (240).

Protocol analysis is a first layer of analysis that may be performed on all the network flows queued by the protocol finger printing module. The purpose of this protocol analysis is to filter the obvious benign traffic and carefully select a handful of sessions that need further scrutiny through active analysis.

Protocol filtering may be a two stage process. In the first phase a session may be selected from the given queue and tagged with appropriate categories. For example, with an http protocol, an input session can be categorized as a HTML Page, Binary download, Java Script Download, Data Upload and the like. Once a protocol session is marked with an appropriate category, it can be handed over to Protocol Analysis Runtime. Protocol Analysis Runtime may consist of several feature extractors and self learning classifiers designed specifically for each protocol category.

An SSL protocol may move from the protocol finger printing module to the protocol analysis engine (240) where it may enter an SSL Queue (216), through an SSL Handler (217) and an SSL categorization module (218) before entering the protocol analysis. Other protocols, for example Protocol N, may move from the protocol finger printer module (202) to a protocol N queue (211) in the analysis engine (210), then to a protocol N handler (212), and finally a protocol N categorization module (213) before moving into the protocol analysis engine (240).

Once in the protocol analysis engine (240), the protocols may be analyzed using protocol analyzers part of protocol analysis runtime. Protocol Analysis runtime is a collection of protocol analyzers that is configured to inspect and parse a given session using different packet inspection techniques. These protocol analyzers may divide a given session into meaningful artifacts. These artifacts may be handed over to the Protocol Feature Extractor module to create machine learning features that are eventually processed by a set of anomaly detection classifiers. For example, for a given TLS session, protocol analysis runtime; by making use of knowledge acquired through standard TLS RFCSs (protocol specifications) can split a TLS session into different segments TLS Client Hello, TLS Server Hello and the encrypted data payload. Similarly, for a given HTTP session, protocol analysis runtime may generate different segments like HTTP Host, HTTP Method, HTTP Url, HTTP Request Headers, HTTP Response Headers and the payload. For a given IRC session, protocol analysis runtime may generate different segments like IRC User, IRC Nick, IRC Channel Name, IRC Private Message, Topic of joined IRC channel, IRC Server log and the like.

After being analyzed by protocol analyzers in protocol analysis runtime, an HTTP protocol, SSL protocol, Protocol N, or other protocols (like IRC, FTP, SMTP, CUSTOM TCP, CUSTOM UDP etc.) undergo protocol feature extraction specific for each protocol. The extractors may be configured for the specific protocols; for example, HTTP protocol feature extractors (224), SSL protocol feature extractors (219), "protocol N" protocol feature extractors (214), or feature extractors specific for other protocols.

Protocol Features Extractors may be configured to receive protocol artifacts generated by Protocol Analysis Runtime and convert them into machine learning features. In some cases, these features can be of three types such as binomial (or binary features), nominal (or discrete features) and numeric features. This module may further combine all features in form of a final feature set that can be processed by the Self Learning Classifiers. The feature set may comprise multiple features related to a specific protocol. For instance, some of the features extracted from a TLS HELLO packets may include TLS Client, TLS Version Number, Number of Ciphers supported by the client, Number of TLS Extension fields, Does Sever Name Extension exist, and other features. Similarly features extracted from the SERVER HELLO packet may include: TLS Version Number, Number of Ciphers supported by the server, Signing Authority of the TLS certificate, Is Certificate Self Signed, Certificate Expiration Time, and other similar features.

After feature extraction the HTTP protocol, HTTPS/TLS/SSL protocol, Protocol N or other protocol, can be analyzed using self-learning protocol classifiers; for example, HTTP self-learning protocol classifiers (225), SSL self-learning protocol classifiers (220), protocol N self-learning protocol classifiers (215), or other protocol classifiers specific to other protocols.

Protocol Self learning classifiers may be a set of algorithms that can learn from a given "Data Set" for the purpose of making accurate predictions. The Protocol Self Learning classifier may use progressive learning. Unlike supervised machine learning, the self-learning classification algorithms can be designed in such a way that after one time initial training phase the algorithms can be capable of self-learning at runtime without a need for re-training or manual human intervention. Novel self-learning capability can enable a system using these algorithms to become incrementally more accurate as the system processes more unknown data and learns automatically from its experience.

Self learning, unlike conventional supervised machine learning, is able to handle large dynamic nominal features. Supervised machine learning techniques can depend on the initial set of features defined at the design phase. Once a supervised classifier is trained, new features may not be introduced. This is not a limitation with Progressive Learning, which is perfectly capable of handling large dynamic nominal features. New nominal features can be introduced at runtime without re-designing the classifier.

Additionally, there is no need to retrain the model to learn from new data since the logic stays the same but the features keep on improving at runtime after each prediction. At the same time, new nominal features can get added at runtime that can improve the algorithms' knowledge about the problem solving domain and hence improve their ability to handle unknown data. Finally, as the system keeps on training, the self learning rate (alpha) becomes small so that even if a new test example has been misclassified because of its diverse feature values, it will not significantly affect the systems learning performance.

The main purpose of the Protocol Classifiers is to filter the maximum amount of benign traffic without missing potential malicious traffic. The high efficacy in detecting benign traffic is achieved by choosing a configuration optimized to generate the maximum amount of TN (True—Vs) or correct rejections. Suspicious sessions identified by the self-learning protocol classifiers may then be transferred to the Active Analysis Engine for further analysis.

Active analysis is a second layer of deep analysis that may be performed on all network flows marked as suspicious by Protocol Analysis Engine (PAE). The purpose of active analysis is to get a single verdict i.e. if the given session is malicious or not (for a given category). Session marked as benign may be discarded and ones marked as malicious may be logged into the database along with appropriate category.

An Active Analysis Engine may extract the artifacts from a given session and perform different type of active analysis on it. This active analysis may include but is not limited to, Visual Analysis, Natural Language Processing and Actively interrogating the suspicious server in real time through a network of anonymous VPN/Proxy servers (Active Intelligence). Active Analysis can result in a generation of active features feeding to self-learning classifiers that output a single verdict, malicious or not malicious (i.e. binary classification).

Figure 3:
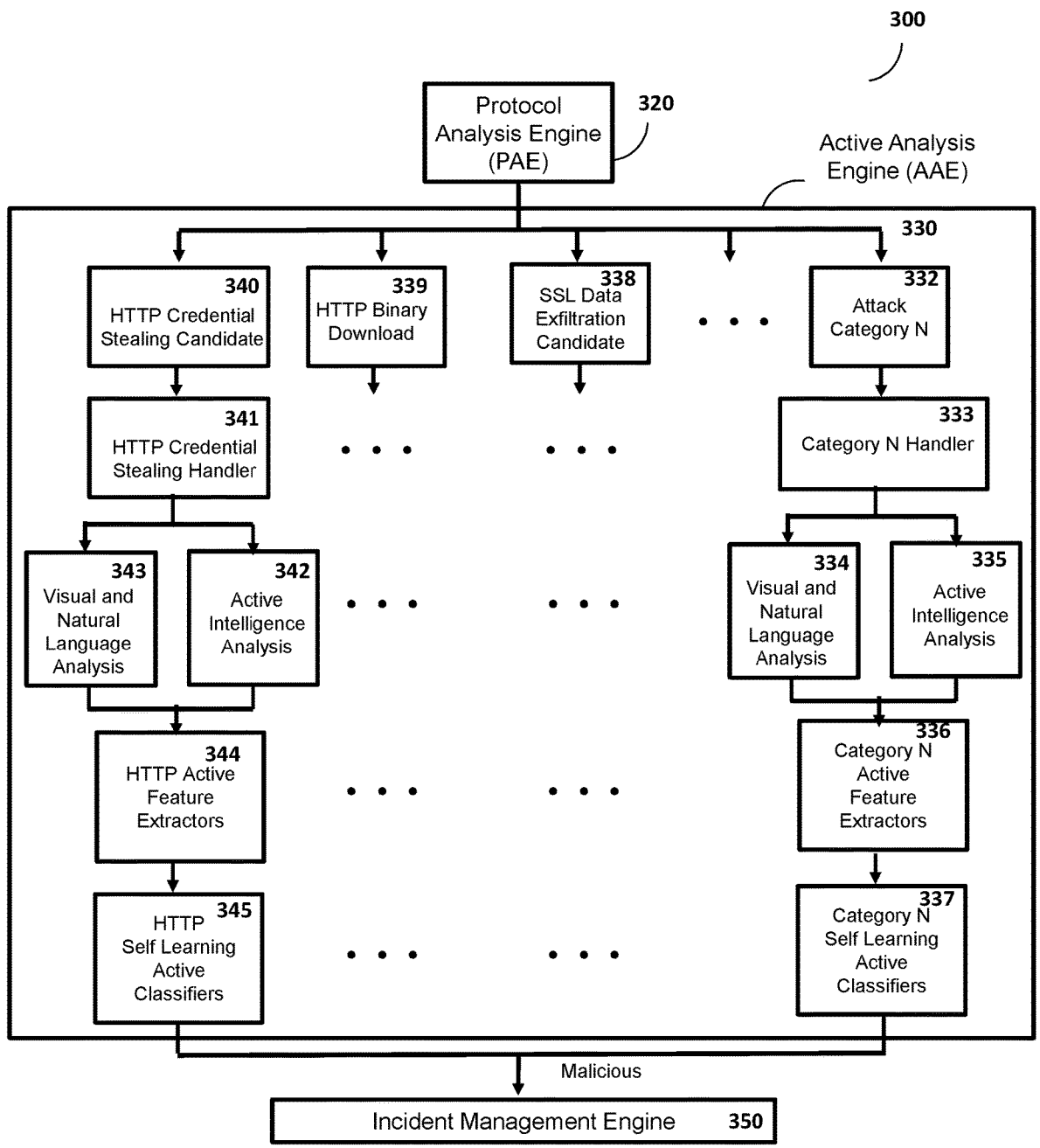
FIG. 3 shows certain elements of the Active Analysis Engine (AAE) depicted in FIG. 1 for an exemplary system and method as described herein.

FIG. 3 shows certain elements of the active analysis engine depicted in FIG. 1 for an exemplary system and method as described herein. Candidates (e.g. HTTP, SSL, Protocol N, other protocols) that are classified as suspicious by the protocol analysis engine (320), can be passed to the active analysis engine (330). The active analysis engine may comprise Active Analysis Runtime, Active Feature Extractors, and Active Self Learning Classifiers.

Active Analysis engine may comprise a set of modules configured for setting up and initiating active analysis. For instance, to perform a Visual and Natural language analysis on a HTTP Session, this module may load the session's URL into browser memory and extract rendered web page's image, written text and source code from the browser memory. The main reason behind extracting these artifacts from browser memory rather than extracting them directly from the http session is to avoid encryption, obfuscation, and encoding. These extracted artifacts may further be handed over to Active Feature Extractor to extract active features. In another instance, one of the Active Analysis runtime modules may collect real-time intelligence by actively probing a suspicious server through a set of anonymous VPN/Proxy servers. The forensics data collected by real-time inspection of these servers may further be handed over to Active Analysis Feature Extractor to extract active features.

For example, an HTTP credential stealing candidate (340) may be passed to the Active Analysis Runtime comprising an HTTP Credential Stealing Handler (341) which passes it on for different types of analysis (e.g. visual and natural language analysis (343) or active intelligence analysis (342)), before being passed to the HTTP Active Feature Extractors (344). Similarly, a candidate categorized into attack category N (332) may be passed to the category N handler (333), from where analysis may be performed (e.g. visual and natural language analysis (334) or active intelligence analysis (335)) before moving to the Category N Active Feature Extractors (336). Other candidates flagged as suspicious, for example HTTP Binary Downloads (339) or SSL Data Exfiltration Candidates (338) may follow similar paths through a handler, into an analysis loop (e.g. with visual and natural language analysis or active intelligence analysis) and into feature extractors.

Active features extractors may be configured to take active artifacts generated by the Active Analysis Run time and convert them into machine learning features. These features may be in any suitable formats such as binomial (or binary features), nominal (or discrete features) and numeric features. This feature extractor module may further combine all of features in form a final feature set that can be processed by the Self Learning Classifiers.

In some cases, the active features to be processed by the self learning classifiers may comprise active visual and/or natural language features. For example, in order to find a potential credential stealing attacks served as a fake replica of a Yahoo Sign-in page, or a credential stealing page, the Active Analysis Runtime must first match the suspicious http web page ("Candidate Page") vital identity information (e.g. Domain, SSL Certificate and Domain Whois information) with Yahoo's authentic identity information stored in a database. If there is a match it is assumed that the "Candidate Page" is the original Yahoo Sign-in page ("Brand Page"). If the vital identity information does not match, then the Active Analysis Runtime may compare the Candidate web page's image, written text and source code with Yahoo's original pages and extract similarity features. These similarity features may be further processed by the self learning classifiers to determine if the Candidate Page resembles with the original Yahoo sign-in page or not. If the Candidate Page is found to be similar to original Yahoo Sign-in with respect to Visual and Textual similarities, then it is declared as a Yahoo Credential Stealing Attack. Examples of active visual and natural language based features in this case may include: Total graphical interest points available in the Candidate Page, Total graphical interest points available in a Brand Page, Graphical Interest points matched between the Candidate and a Brand Page, Image Size of the Candidate Page, Image Size of a Brand Page, Natural Language used on the Candidate Page, Natural Language used on the Brand Page, Percentage of text matched between the Candidate Page and Brand Page, Number of user inputs required by the Candidate Page, Number of user inputs required by a Brand Page, Number of readable paragraphs in the Candidate Page, Number of readable paragraphs in a Brand Page and various others.

In some cases, the active features may comprise collected active intelligence. The active intelligence may comprise behavior of a suspicious entity in response to being probed by the Active Analysis Runtime. The active intelligence may comprise data collected through active monitoring a suspicious entity. For instance in order to find a potential malicious executable download, the Active Analysis Runtime may actively probe a suspicious server through a set of anonymous VPN/Proxy servers to observe its behavior. For instance, if a suspicious server when connected through VPN/Proxy servers tries to use evasion techniques like re-settings the connection, redirecting to a legitimate web site or serving a different payload. In another example, the Active Analysis Runtime may collect intelligence by analyzing the data collected through actively port scanning on a suspicious server like number of opened ports on a suspicious server, type of server software installed on a suspicious server (E.g. web server type), and number of open directories. An Active Analysis Runtime may determine if the suspicious server is resetting the network connections, if the suspicious server is permanently blocking the connecting IPs, if the suspicious server is redirecting connection to a legitimate web site like google.com and the like, or if the suspicious server is trying to evade by serving a legitimate content instead of a malicious one.

After the Active feature extractors process the candidates, the candidates may move on to the self-learning active classifiers (e.g. HTTP Credential Stealing Self Learning Active Classifiers (345), Category N Self Learning Active Classifiers (337), or active classifiers for other suspicious candidates including HTTP Binary Download and SSL Data Exfiltration candidates etc.

Active Self learning classifiers are a set of algorithms that can learn from a given "Data Set" for the purpose of making accurate prediction. The classification algorithms are designed in such a way that after the initial training phase the algorithms can self-learn at runtime without a need for re-training or manual/human intervention. Self-learning capability enables a system using these algorithms to become incrementally more accurate as system process more unknown data and learns automatically from its experience.

Self learning has several benefits over other methods and systems as described above. Once self learning classification is complete, candidates identified or classified as malicious by the active analysis engine classifiers may then be transferred to the Incident Management Engine (350).

Figure 4:
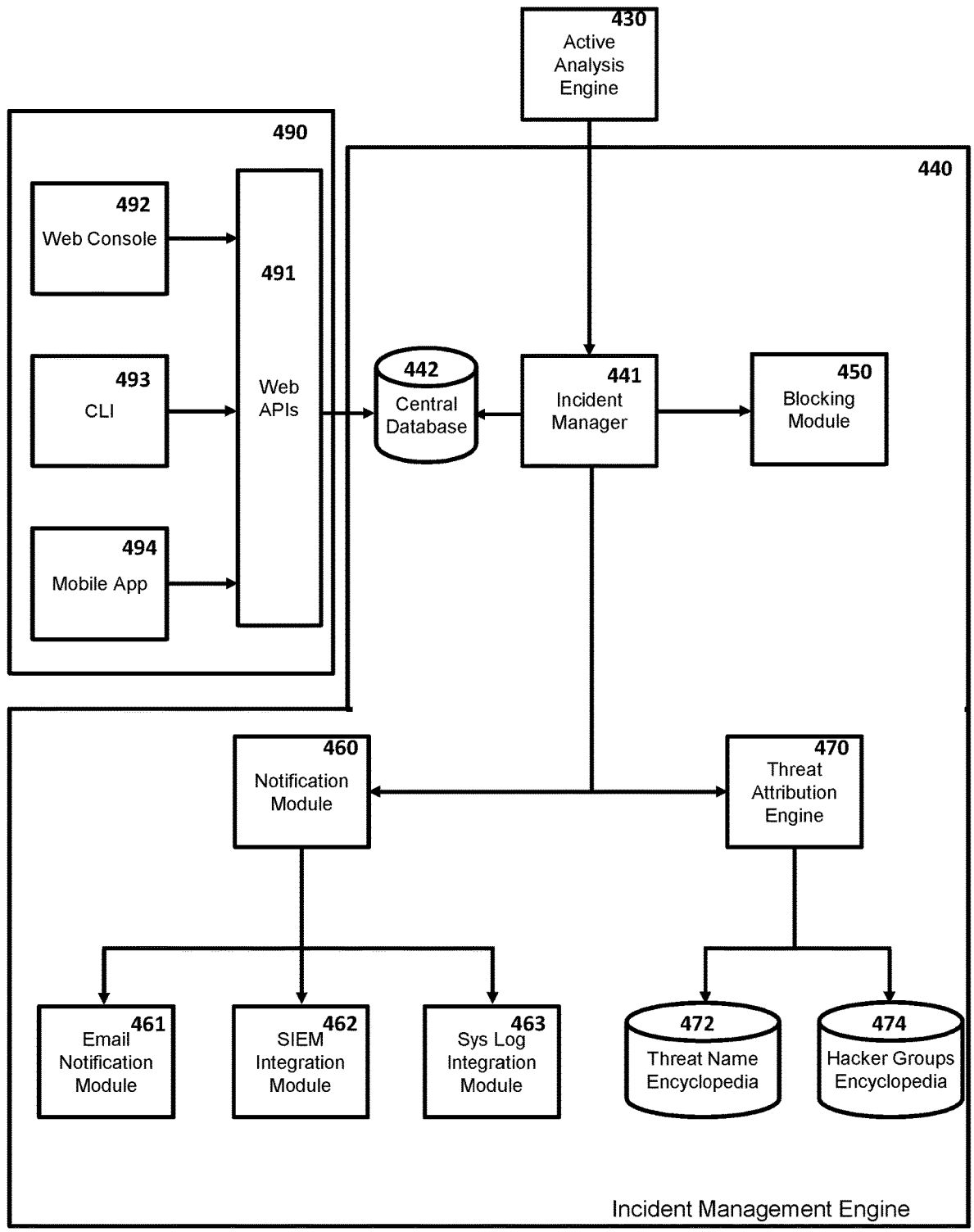
FIG. 4 shows certain elements of the incident management engine depicted in FIG. 1 for an exemplary system and method as described herein.

FIG. 4 shows certain elements of the incident management engine depicted in FIG. 1 for an exemplary system and method as described herein. The active analysis engine (430) may direct malicious candidates to the incident management engine (441); which may direct and coordinate the movement of information through databases (e.g. a central database) (442), engines like the Threat Attribution Engine (470), and modules like the blocking module (450), the notification module (460).

The incident management engine (441) may access and interact with blocking modules (450). Blocking modules (450) may stop subsequent connection attempts through real time blocking capabilities, once the attack is detected by the incident management engine (441). This real time session blocking can be achieved through multiple ways. If the system is deployed as a software agent it can call the OS network APIs to block the subsequent connection attempts to the bad destination. In case the system is deployed as an appliance or cloud in inline mode where all the traffic is flowing in and out of appliances or cloud network interfaces, the system may add a blocking rule at its interface level. In instances where an appliance is deployed in a passive model attached with SPAN or TAP ports, the system may be integrated with existing infrastructure like external DNS server or corporate firewalls to block the bad destination in real time.

The incident management engine (441) may interact with a Threat Attribution Engine (470). When the system detects a malicious flow belonging to a particular threat category, the Threat Attribution Engine (470) can assign an appropriate name to the malicious flow, and try finding the hacker group responsible for the attack. The system can maintain different encyclopedias for this purpose; for example the Threat Name Encyclopedia (472) and the Hacker Group Encyclopedia (474), are two types of encyclopedias that the Threat Attribution Engine (470) might use.

The Threat Name Encyclopedia (472) may comprise a content database that maintains up to date information about recently seen threats. This information can comprise Threat Name, Threat Description, Alias, Infection Vectors. The Hacker group Encyclopedia (474) can comprise a content database that maintains up to date information about known hacker groups. This information may include Hacker Group Name, Country of Origin, Expertise, Common Targets, Alias etc. Both of these encyclopedias can maintain IOCS (Indicators of Compromise) associated with each profile. Some of the IOC include binary digital certificates, C&C infrastructure information, C&C ISP, C&C Name Servers, C&C Passive DNS records etc. Once a malicious flow is detected, the Threat Attribution Engine can extract IOCs associated with this session and runs a search query inside the corresponding encyclopedias. If there is a match, the corresponding information can be pulled from these encyclopedias and linked with the malicious flow.

The Incident Manager (441) and the Threat Attribution Engine (470) may interact with the Notification Module (460). Once a malicious flow is detected, the incident manager (441) may direct the Notification Module (460) to notify the system administers or Incident response team about the malicious incident via Email Notification, using an Email Notification Module (461), and in another use case system may log the incident information through a SIEM Integration Module (462) or a Syslog Integration Module (463). The Incident Manager (441) may access information stored in the central database (442). The central database may capture and store information related to the suspicious incidents, attacks or events including Malicious Sessions, C&C information, Threat Information and Hacker group information. This central database (442) may also store information and keep track of victim's identity for example the infected user's name, machine name, Source IP, Department and the like. System offers multiple type of user interface both for management and monitoring purpose like Web, CLI and Mobile Application. These user interfaces connect with the central database through a set of Web APIs to fetch the stored information which can later be viewed from the Web console (492), the CLI (493), or the Mobile Application (494).

Figure 5:
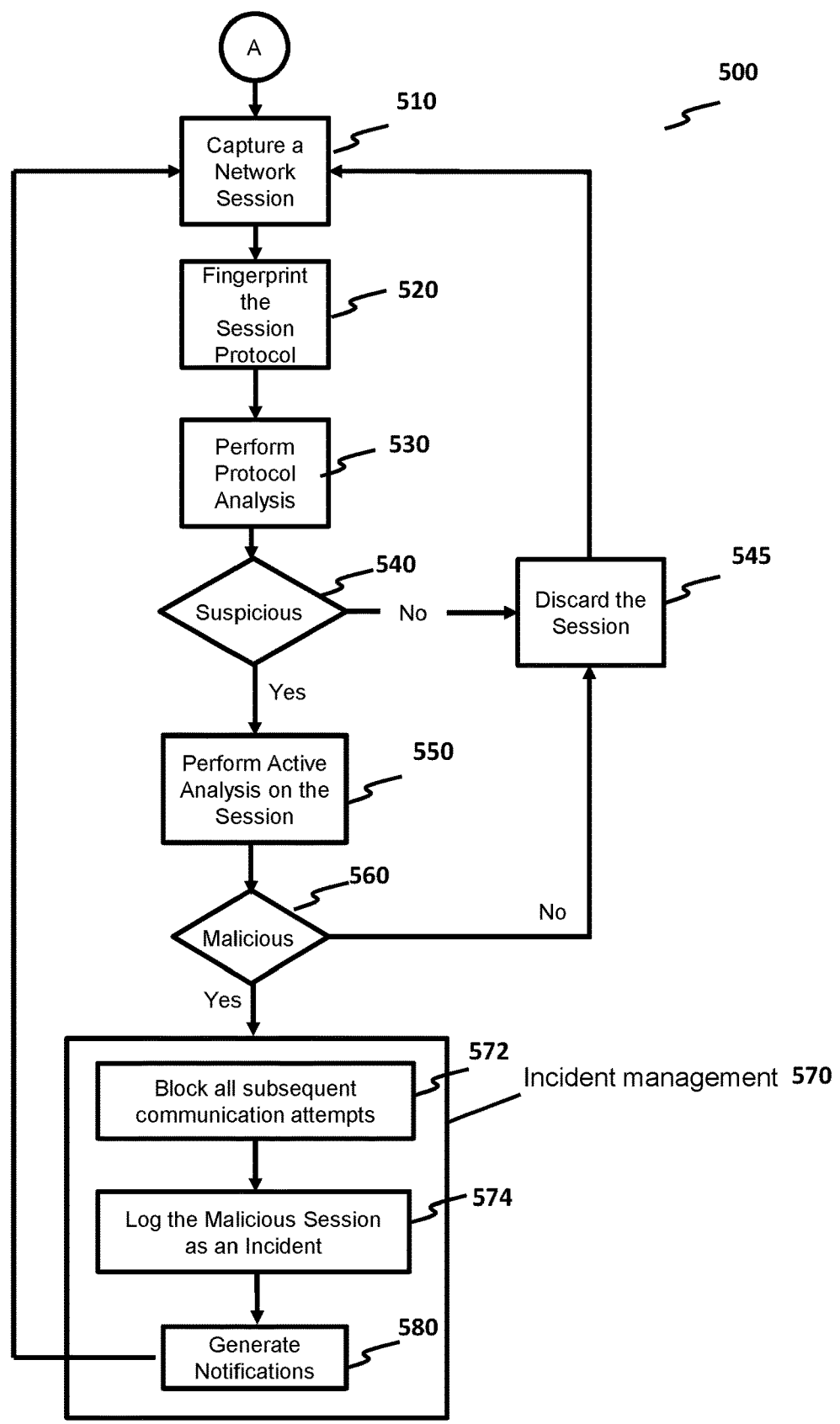
FIG. 5 is a flowchart showing an exemplary method for protecting against network-based cyber attacks as disclosed herein.

FIG. 5 is a flow chart resembling the overall Active Cyber Defense system (500).

Network session activity (A), can be captured (510), and the session protocol can be fingerprinted (520), followed by the performance of protocol analysis (530). If protocol analysis (530) does not identify the session protocol as suspicious, then the session protocol is discarded (545). If protocol analysis (530) reveals that the activity is suspicious (540), then active analysis is performed (550). If active analysis (550) determines that the session protocol is not malicious then the session protocol is discarded (545). If active analysis (550) determines that the session protocol is malicious then the session protocol is directed to the incident management engine (570). The incident management engine can perform a variety of protective steps in response; for example it can block all subsequent communication attempts (572), log the malicious session as an incident (574), and generate notifications (580). The system can then start again with another captured network session.

Figure 6:
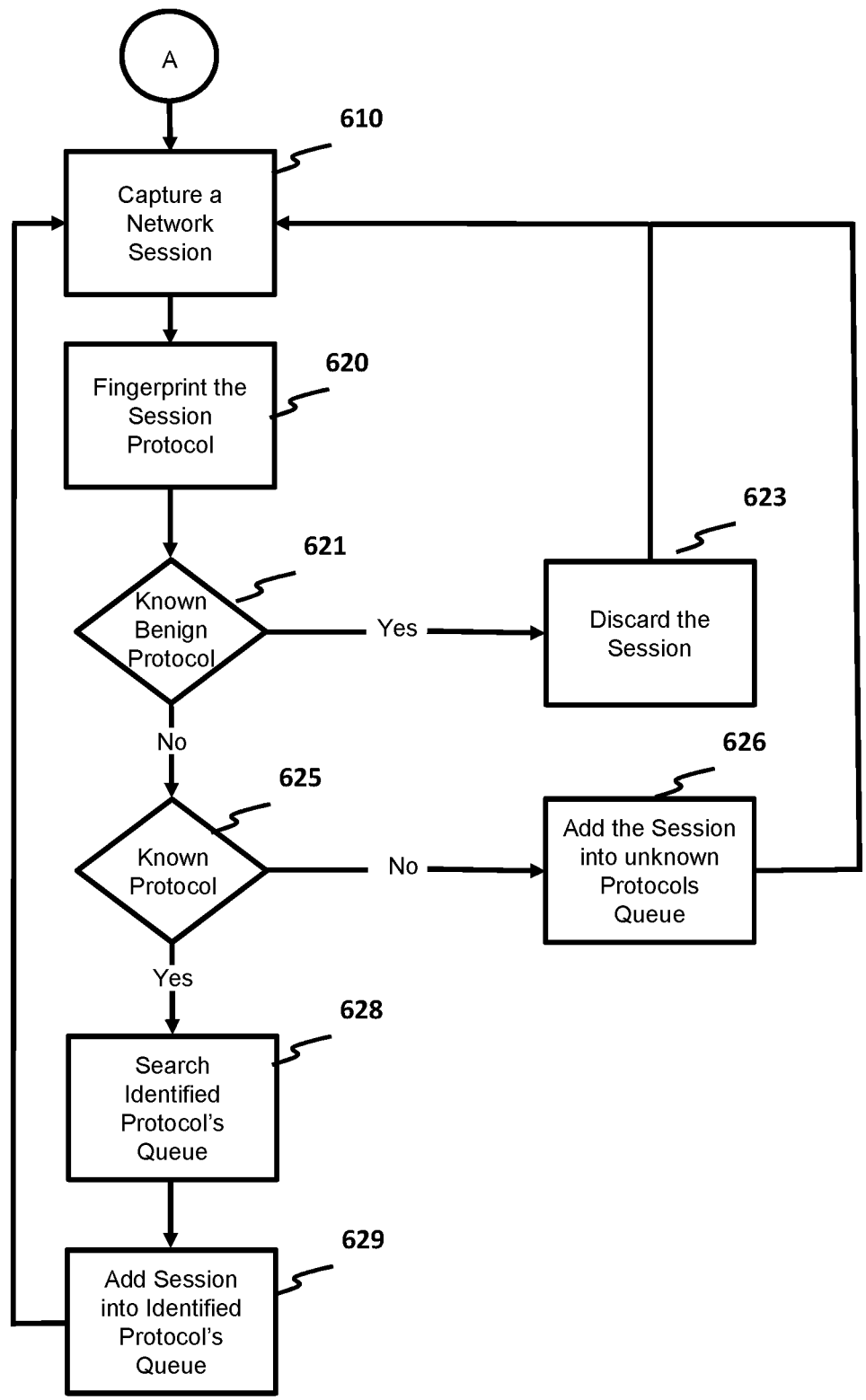
FIG. 6 is a flowchart showing additional detail of an exemplary method as disclosed herein that comprises capturing a network session, fingerprinting a session protocol, and queueing a protocol.

FIG. 6 is a flowchart showing additional detail of an exemplary method as disclosed herein that comprises capturing a network session, fingerprinting the session protocol, and queueing a protocol. A network session is captured (610) and fingerprinted (620), it is determined if the protocol is a known benign protocol (621). If it is a known benign protocol then the session is discarded (623), and if it is not a known benign protocol then it is determined if it is or is not a known protocol (625). If it is not a known protocol (625) then the session is added to the unknown protocols queue (626), and if it is a known protocol (625) then the corresponding protocol queue is searched (628) and the session is added to the identified protocol queue (629) and the system starts again with another captured network session.

Figure 7:
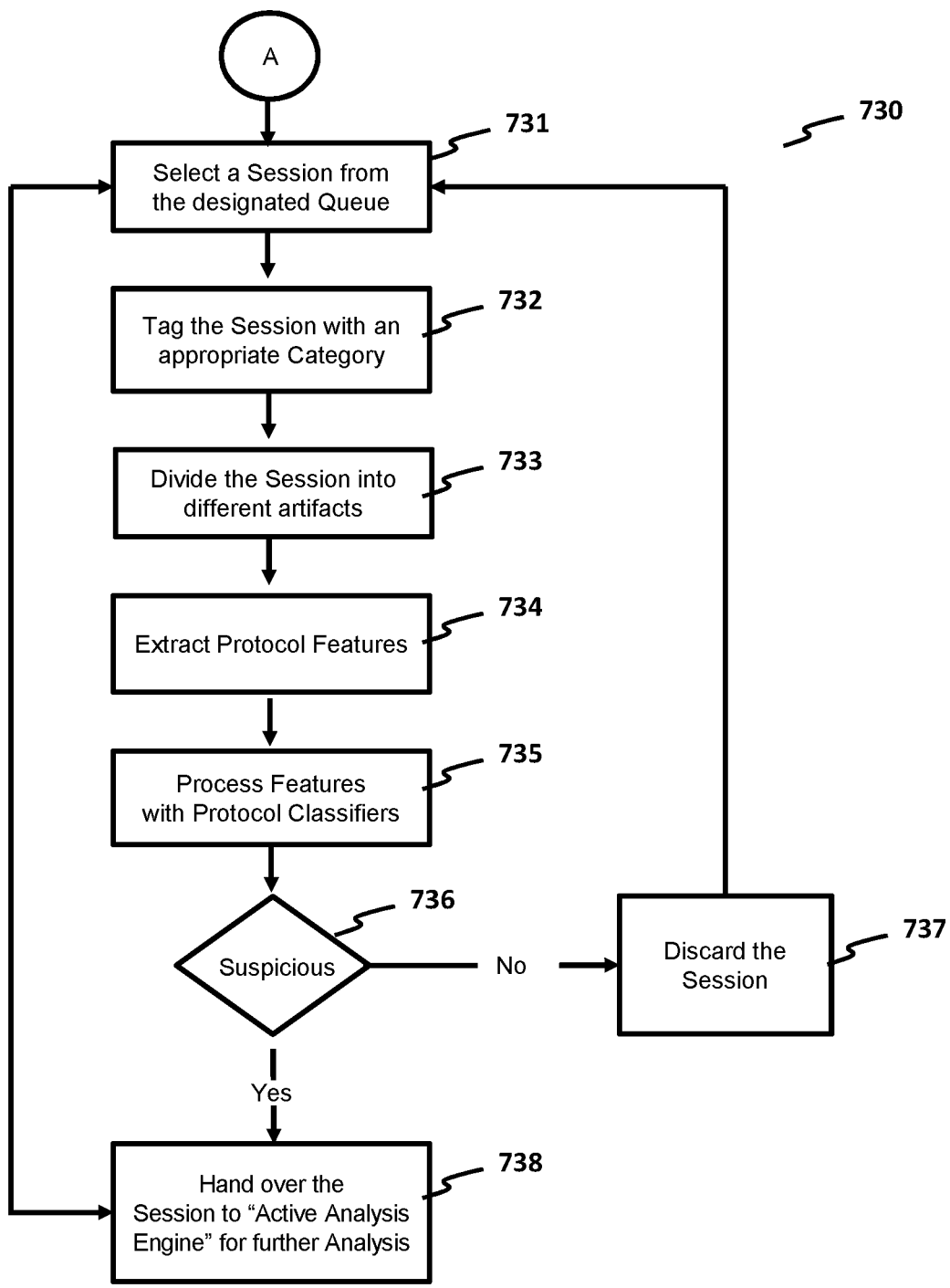
FIG. 7 is a flowchart showing details of the Protocol Analysis as depicted in FIG. 5.

FIG. 7 is a flowchart showing details of the protocol analysis (730) as depicted in FIG. 5. A session from the designated queue is selected (731), tagged with an appropriate category (732), and divided into different artifacts (733). Then the protocol features are extracted (734) and the features are processed with the protocol classifiers (735), to determine if they are suspicious (736) or not. Sessions that are not classified as suspicious are discarded (737) rest are handed over to the Active Analysis Engine for further analysis (738).

Figure 8:
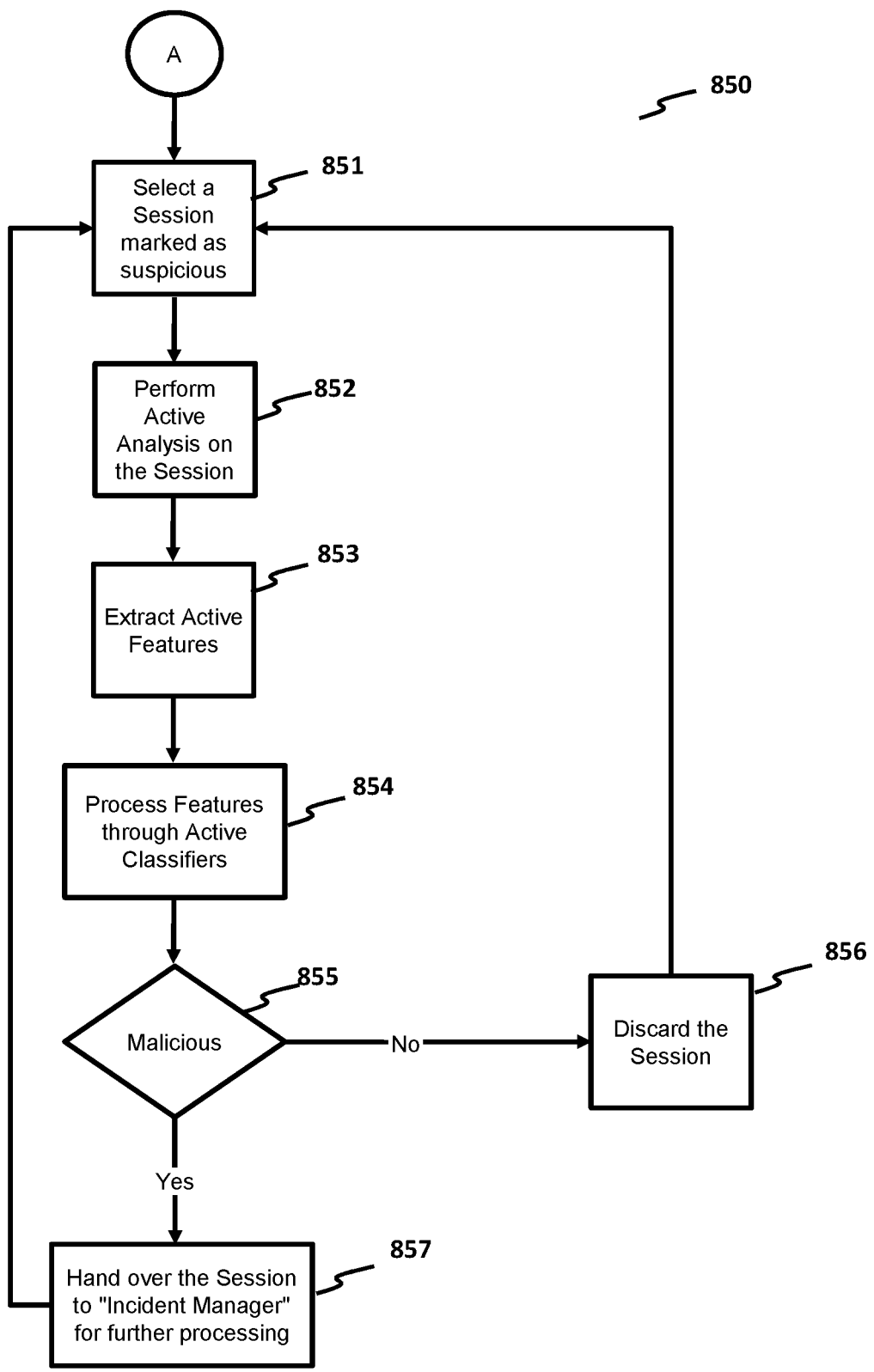
FIG. 8 is a flowchart showing details of the Active Analysis as depicted in FIG. 5.

FIG. 8 is a flowchart showing details of the active analysis (850) as depicted in FIG. 5. A session marked as suspicious is selected (851), and Active Analysis is performed on the session (852), Active Features are extracted (853) and processed through Active Classifiers (854) to determine if they are malicious (855) or not. Sessions that are not classified as malicious are discarded (856), and sessions that are classified as malicious are handed over to an Incident Manager for further processing (857).

Figure 9:
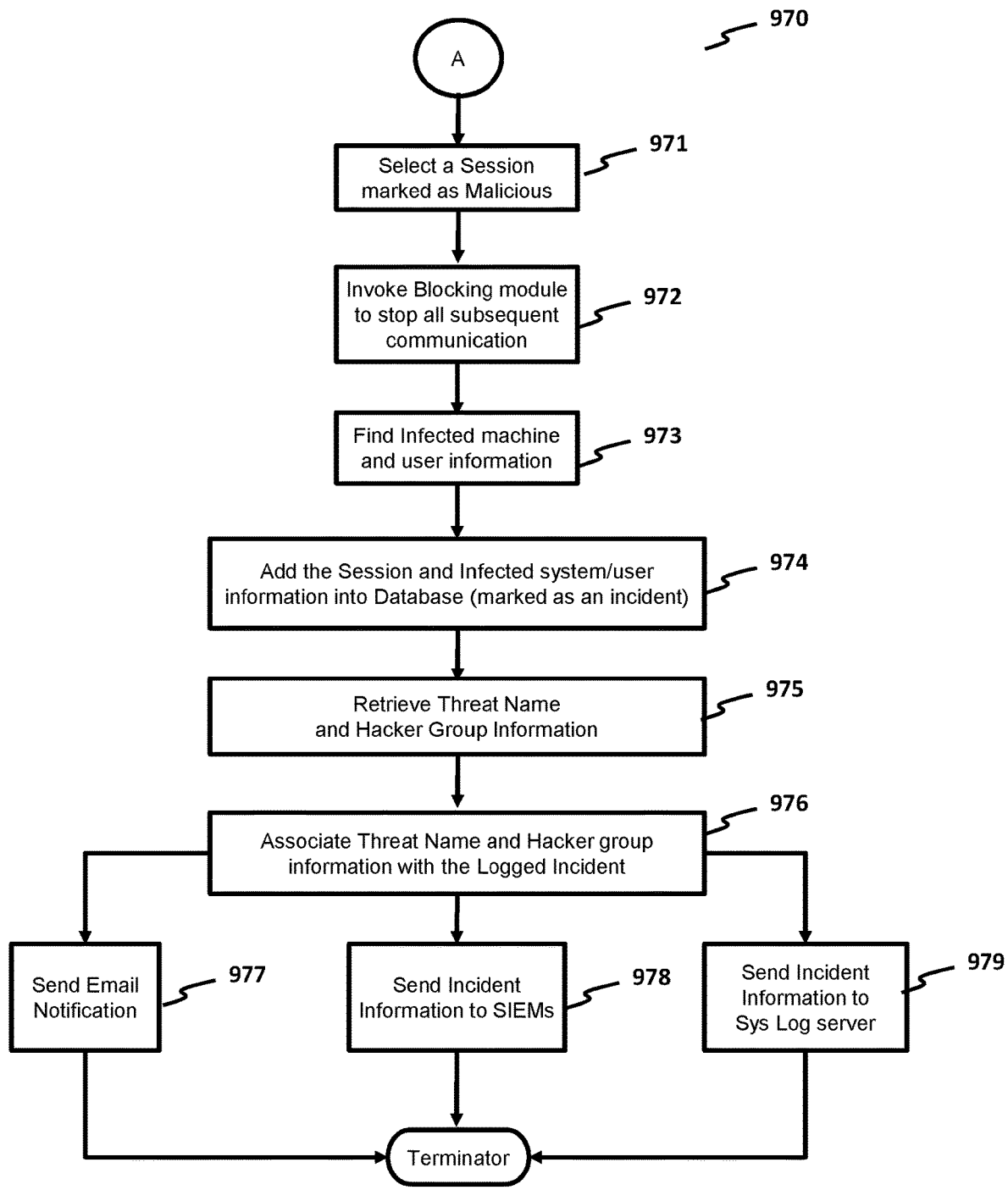
FIG. 9 is a flowchart showing details of the incident management as depicted in FIG. 5.

FIG. 9 is a flowchart showing details of the incident management as depicted in FIG. 5. A session that has been marked as malicious is selected (971), and a blocking module is used to stop all subsequent communication (972).

The infected machine and user information is located (973), and added to a database where it is marked as an incident (974). The Threat Name and Hacker Group Information are associated with the Logged Incident (976), and email notification of the incident is sent (977), incident information is stored to SIEMs (978), and incident information is sent to the sys log server (979) before the sequence is terminated.

The Active Cyber Defense System can display or present information to a user or system administrator through a user interface, or portal. A user or system administrator can login to the portal or access the portal by entering a user name and password. In some instances, login can require two factor authentication, wherein the user must authenticate by providing a password that was supplied through other means e.g. by a dongle, via text to a mobile device or through an external application running on a mobile device.

Figure 18:
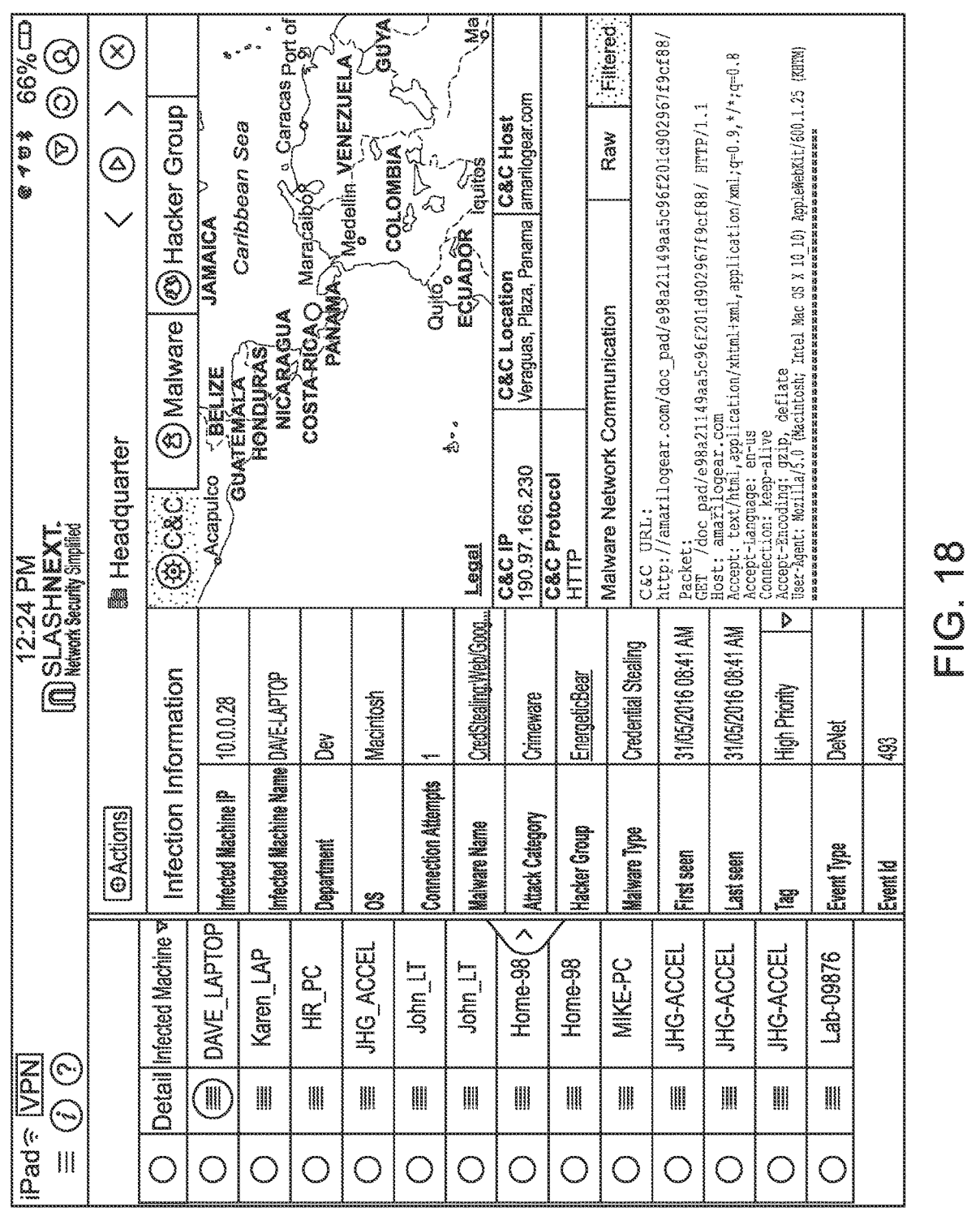

FIG. 18 is a screen capture of an Event Notification and Control and Command page viewed via an interface of Active Cyber Defense System. An Active Cyber Defense System may perform real-time classification of Network Activity. When a computer on a network engages in a malicious activity, the identity of the computer, details regarding the computer and information regarding the malicious activity may be made accessible to a user or system administrator so that the user or system administrator may catalog, record, or take action in response to the information.

An Active Cyber Defense System user interface may comprise information regarding the identity of infected machines on the network, as well as additional details regarding the location, usage, MAC ID, or other features of the machine, including the type of the machine and the identity of the machine users. Other information may include the IP address of the infected machine e.g. 10.0.0.28, the name or identifier of the machine e.g. DAVE-LAPTOP, the department that uses the machine or that the machine was registered to e.g. Dev, and the operating system e.g. Macintosh.

An Active Cyber Defense System user interface may present a user with details regarding the attacker or the attack. Details regarding the attacker may include the number of connection attempts made by the attacker, the name of the Malware that was identified, the type of attack or attack category e.g. Crimeware, the hacker group that performed the attack e.g. Energetic Bear, the type of malware that was used, and the first date/time and the last date/time an attack was detected or registered.

An Active Cyber Defense System user interface may include reference information or labels that may be used for internal reference to the event, or prioritization of events. Examples may include a tag indicating the priority level of the attack, the event type and an event identification or ID that may be used to refer to the particular event.

A user or system administrator may log-in to the Active Cyber Defense System from a remote location or when connected to or on the physical network. Upon login and authentication, a user may be presented with screens similar to those depicted in FIGS. 18-20. In some instances, a system administrator may wish to review all the machines that have been infected, without looking at the specifics for the given machine. To accomplish this, the system administrator may select an icon, for example the detail button on the left hand side of the screen (not visible in the screen shot), which may display a full screen mode where the user may be able to view full details for infected machines on the network. In other instances, after viewing all the infected machines on a network, a system administrator may select one or more infected systems to investigate the nature or details regarding a specific machine specific attack, specific incident, a compiled set of attacks performed by a particular group, the attacks on a particular day or time, and/or attacks that have occurred from a particular location or region.

A system administrator may select an infected machine for example DAVE-LAPTOP as selected in FIGS. 18-20, and view details regarding the attack. Details regarding DAVE-LAPTOP are shown under the infection information, where the IP, Machine Name, Department and Operating System details are presented. Also presented are the number of connection attempts, the malware name, attack category, hacker group, malware type, date and time the attackers were first seen and then last seen, as well as tags including the priority, event type and a unique number that corresponds to the specific event. On the far right side additional details regarding the attack may be presented to the user or system administrator through selection of one or more tabs. Tabs may be used to display content specific to the attack or the attackers on a particular infected machine. Tabs may present information regarding the Command and Control center from where the attack originated, the Malware that was used, and the Hackers that performed the attack.

In the example presented in FIGS. 18-20, an Active Cyber Defense System interface can comprise expandable or selectable tabs for displaying the machine names for infected machines on the network, and/or details regarding an attack or set of attacks, by a particular hacker group, on a particular infected machine. Partial view of the identities and details of other infected machines on the network are greyed out and displayed on one side of a screen, e.g. the left side of the screen. A dark grey bar can be used to separate network display e.g. information regarding the machines on the network, from details pertaining to a specific infected machine on the network. This dark grey bar can comprise a tab with an arrow pointed towards the right side of the screen, and this tab may be used to enter a full screen view of the infected machines on the network.

FIGS. 18-20 are exemplary screenshots for a selected infected machine, in this case a machine referred to as DAVE-LAPTOP. In these examples the identities and details for infected machines on the network can be depicted vertically in a shortened greyed screen on the left hand side of the screen. Detailed content regarding the infected machine, in this case DAVE-LAPTOP, and details regarding the attack on the infected machine are displayed on the middle and right hand side of the screen. In this example, a user can learn more about the attackers that targeted DAVE-LAPTOP by selecting from one of three tabs in the upper right hand corner of the screen e.g. C&C, Malware, and Hacker Group.

In FIG. 18, the Command and Control (C&C) tab has been selected and the user interface provides details regarding the Command and Control center of the attackers that targeted DAVE-LAPTOP. The C&C tab may be identified using the C&C IP address, the C&C Location, the C&C Host and the C&C protocol. Above this information is a map, with a pin showing the location of the C&C; in this example the location is Veraguas, Plaza, Panama. The host page of the C&C, the IP address, the C&C Protocol, as well as the Malware Network Communication are also displayed.

FIG. 19 is a screen capture of an Event Notification and Malware Detail page viewed via an interface of an exemplary embodiment. The greyed out network display listing and the details specific to DAVE-LAPTOP are still displayed on the left side of the screen, however the right side of the screen has changed to display details regarding the Malware. In this instance the full name of the Malware is identified e.g. CredStealing:Web/GoogleDrive, the geographic country of origin of the malware, the alias and the affected platforms are listed. Below the affected platform on the Malware tab display are another three tabs for displaying the description, the virulence, and the safety protocols or approaches. In this instance the description is displayed, providing the user or system administrator with a detailed explanation of the type of attack that has occurred and the potential impact of the attack. This information may allow the user or system administrator to decide on additional courses of action, to raise awareness of organization or individual specific targets or attack, and/or to better inform users so they may anticipate any potential or resulting risks they may encounter later on as a result of the attack.

FIG. 20 is a screen capture of an Event Notification and Hacker Group Detail page viewed via an interface of an exemplary embodiment. As in FIG. 18 and FIG. 19, the greyed out network display listing the details specific to selected infected computer, DAVE-LAPTOP, are still displayed on the left side of the screen, however the right side of the screen has changed to display details regarding the Hacker Group that the Active Cyber Defense System identified as performing the attack. Under this tab the user or system administrator may access information regarding the group that performed the attack. In this case the name of the hacker group is presented e.g. Energetic Bear, and the location of the Hacker Group e.g. China. Also listed is the expertise which indicates that the Hacker Group is part of the APTs (Advance Persistent Threats) group. Additional information includes the Common Targets of the group e.g. Defense Contractors, Media outlets, High-Tech companies and multiple governments, the Location of the Hacker Group e.g. China, Aliases e.g. APT-12, DYNCALC, IXESHE, JOY RAT, and a description of the attacker group along which includes a written description of the group with details regarding the group's history etc.

In addition to the tabs outlined, depicted and described in the examples above, an interface for presenting information from, or interacting with, the Active Cyber Defense System may further comprise buttons, or icons for accessing the identity and access management system and/or profile of the user or system administrator, as well as icons or buttons for closing screens, flipping between screens and refreshing the screens, logs or databases listing the infected machines and details regarding the infected machines.

Active Intelligence Analysis ("Active Analysis Runtime" Use Case)

The Active Cyber Defense system and method described herein provides a platform that can incorporate additional systems for performing various functions. In some embodiments, an Active Cyber Defense system can comprise an Active Intelligence Analysis system 335, as shown in FIG. 3, that can automatically and covertly spy on an online server to extract forensic data and intelligence gathered in real time. This data can further be utilized by Active Feature Extractors and Active Self Learning Classifiers to determine the maliciousness of a given session. As shown in FIG. 3, the Active Intelligence Analysis system is a module or subsystem of the Active Analysis Engine (AAE) 330. In particular, an Active Intelligence Analysis system can collect forensic intelligence from an online server to determine whether the online server is malicious or benign. The maliciousness of an online server is one of the many guilty gestures that Active Cyber Defense system can use to determine if a given session is malicious for a given category. At the start of this process, the Active Intelligent Analysis system can receive a network session marked as suspicious by Protocol Analysis Engine (PAE) and use it for gathering Active Intelligence. This Active Intelligence can further be used by the Active Feature Extractors to derive machine learning features. At the start of the Active Intelligence gathering process, a number of network variables are extracted from the given session. For example, variables related to the identity of the online server such as its IP/Domain and Port etc. These variables can then be processed and used by the Active Intelligent Analysis system to create new out-of-band connections to the selected online server. The system can use these out-of-band connections to probe an online server independently from a different network in order to collect or gather a variety of forensic data or intelligence. Further details of an Active Intelligence system and method are described herein.

Forensic intelligence gathered from online servers can fall into one of four different categories. In particular, forensics intelligence can be based on identifying: (1) whether an online server is trying to perform evasion techniques (i.e. evasion based intelligence); (2) whether an online server changes its behavior across different geo locations (i.e. geo location based intelligence); (3) an online server's hosted contents (i.e. content based intelligence); and (4) an online server's hosting infrastructure (i.e. hosting infrastructure based intelligence). Forensic intelligence data from the four categories can be used individually or collectively to determine if an online server is a cyber crime infrastructure or not.

Evasion Based Intelligence

This type of intelligence relates to whether an online server is trying to perform different types of evasion techniques. Hackers are well aware that security researchers and law enforcement can connect to their servers in order to gather different types of intelligence to determine whether malicious activities are being conducted. Such hackers can employ a variety of evasion techniques in order to evade detection from law enforcement and other investigators and to thwart attempts at spying on their malicious activities. Examples of evasion techniques include: resetting network connections, permanently blocking the connecting IPs, redirecting connections to legitimate web sites, and switching to providing legitimate instead of malicious content.

Geo Location Based Intelligence

This type of intelligence relates to the behavior or content provided by online servers across different geo locations. Malicious servers are known to change behavior across different geo locations. For example, in the case of a targeted cyber-attack towards a company located in United States, hackers may only serve malicious content to an IP located within United States. But if the same server is accessed through another geo location such as for example, Britain, the hackers may assume that the access is not by the original victim but by someone else like law enforcement or other investigators who may be trying to spy on them. In addition, many hacking groups set up their servers in such way so as not to infect any victim who is living in their own county or region. Such a defensive strategy may be employed to make sure that the malicious server does not come under the scrutiny of local law enforcement agencies.

Content Based Intelligence

This type of Intelligence relates to the hosted content of a server. For example, an online server can host a variety of content such as HTML code, images, java script, and binaries.

Hosting Infrastructure

This type of intelligence relates to the hosting infrastructure of a server. For example, in contrast to benign online servers, malicious servers are typically set up in a rush to be used for a very limited time and thus, are usually hosted on cheap hosting infrastructure with poor security posture. Once these malicious servers appear on security vendor black lists, hackers may abandon these servers and move to a new hosting infrastructure. In addition, malicious servers can be overloaded by connection attempts originated by thousands of infected machines, causing the servers to respond very slowly. Thus, information related to open ports can be used to finger print different software components installed on an online server. Some examples of intelligence extracted from hosting infrastructure include: the number of opened ports on an online server; the type of software installed on an online server like web server type; the protocols used by an online server such as http, https, irc, ftp, and ssh; and the online server response time.

Most of the malicious hosts log and monitor all connections to their servers and can block or reset a connection the moment they realize that someone is trying to investigate or spy on them. Thus, in order to hide its identity from a potential malicious server, the invention provides a system that can use a process of connecting to the selected remote server covertly in order to collect a variety of forensics intelligence about that server. In this application, such a process will be referred to as Active Probing.

Active Probing can use anonymous VPN/Proxy servers to establish the out-of-band connections it requires in order to collect various types of forensic intelligence related to the selected server. Using anonymous VPN/Proxy servers to connect to potential malicious servers makes it difficult for the malicious server to trace and to block the Active Probing process. Depending on the type of forensic data or intelligence, the system can also initiate multiple connections to a server through one or more VPN/Proxy gateways. The system can also be configured to mimic or pose as a normal client by configuring its requests to appear similar to the original captured requests. This will enable the system to look like a normal client from the perspective of the selected online server.

Active Intelligence is the forensic data or intelligence collected by conducting Active Probing on an online server. This intelligence can be further used to determine the maliciousness of that server. In particular, once the Active Intelligence is gathered, the system can process the intelligence using a machine-learning based classification engine to determine whether the selected online server is part of a cybercriminal infrastructure.

Figure 10:
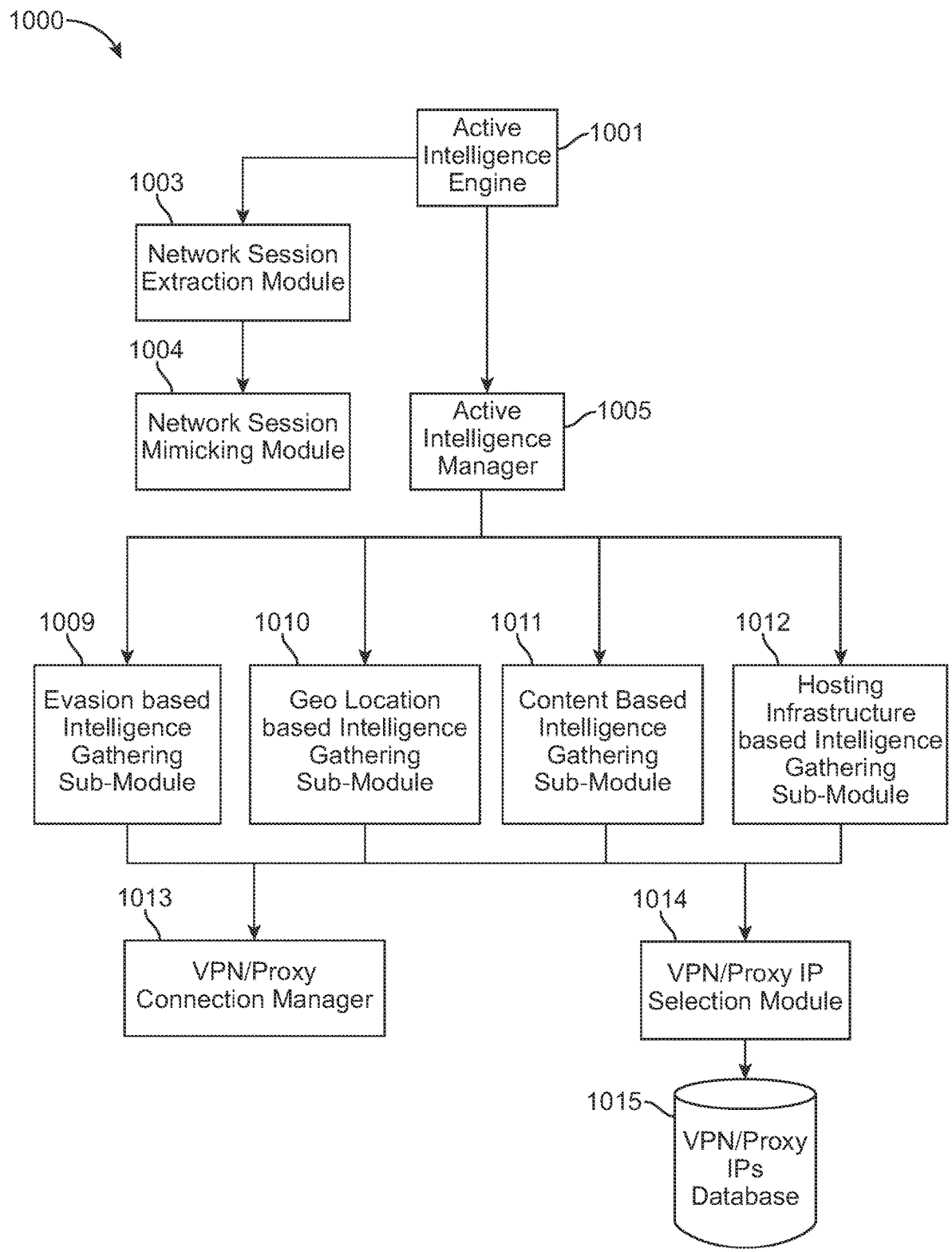
FIGS. 10-11 show a number of functional components of an embodiment of an Active Intelligence System.

As shown in FIG. 10, an Active Intelligence system 1000 comprises a number of functional components, modules, sub-modules and databases. Databases can include VPN/Proxy IPs databases and other databases. The VPN/Proxy IPs databases are data repositories that keep track of the status of all IPs that can be used by the system for probing an online server. The status can include whether the IP is used or new, the geo location of the IP, the connection and health status for each IP, and other status information for IPs as known in the art or yet to be developed. The VPN/Proxy IPs database can further maintain a complete usage history for an IP address. For instance, the database can keep track of all connections that made use of a particular VPN/Proxy gateway in the past. Other databases can be included to store the intelligence data collected using the Active Probing process and to store the analysis results generated by the system. The system can comprise two, three, four, or more different types of databases.

Figure 11:
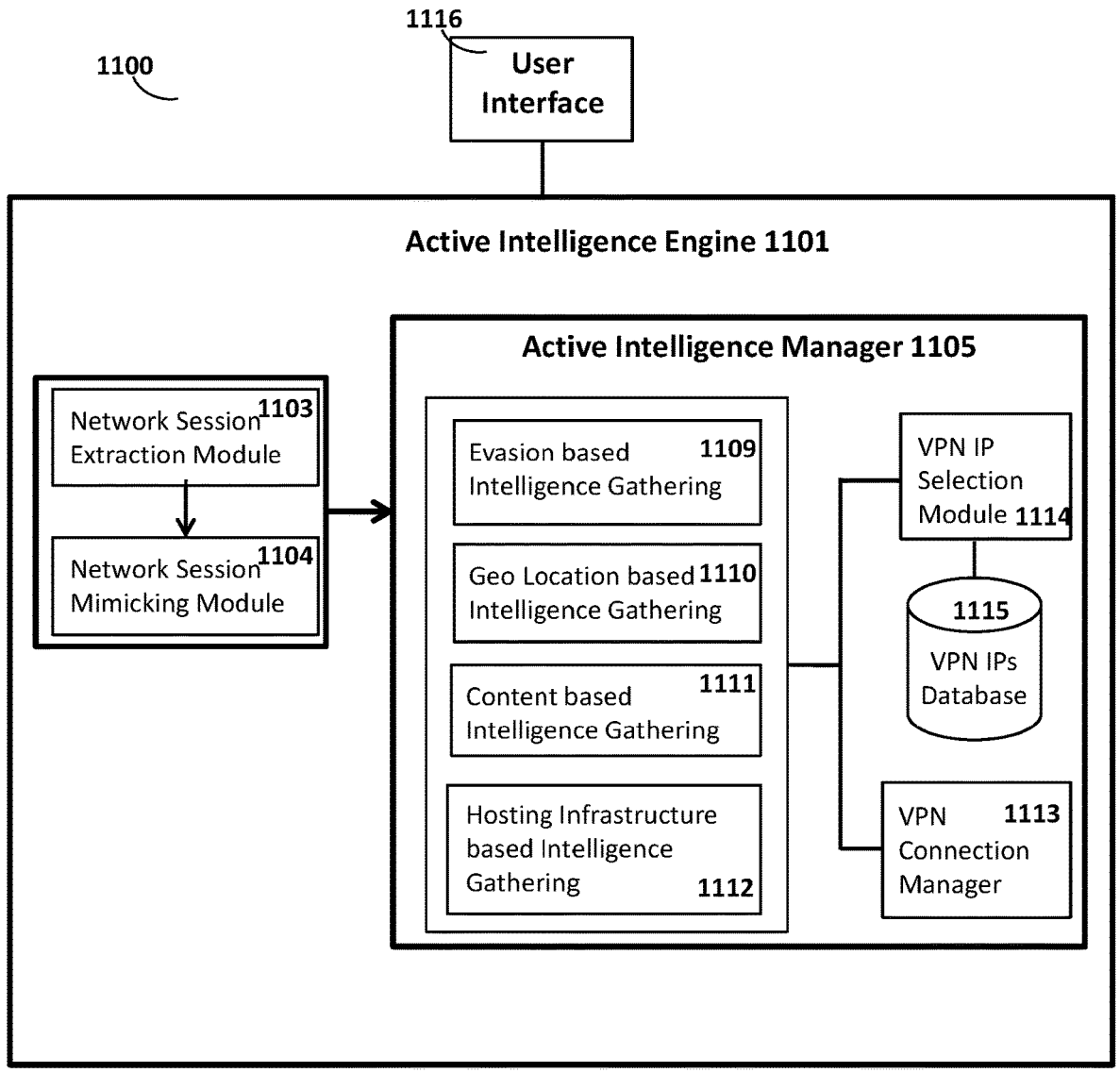

FIG. 11 is a block diagram that illustrates a number of functional components of an embodiment of an Active Intelligence System 1100. The Active Intelligence System 1100 comprises an Active Intelligence Engine 1101. The Active Intelligence Engine 1101 functions as a managing unit of the overall system. The Active Intelligence Engine 1101 can be configured to control all other modules and submodules in the system. The Active Intelligence Engine 1101 can comprise an engine that uses some or all other modules systematically to gather intelligence from an online server.

The Active Intelligence System 1100 may use sessions selected as suspicious by Protocol Analysis Engine (PAE). These sessions are network communications such as requests and responses between clients and servers, clients and clients, and between servers and servers. The clients can be any type, such as for example, desktop, mobile devices, portable devices and any IOT devices, etc. The servers can be any server that provides service to a client such as web server, database server, file server, game server, application server, mail server, etc. The servers in some cases can be malicious servers. The malicious servers can be online hosts that are set up and controlled by cyber criminals to perform a variety of malicious activities. For example, the malicious servers can be set up to serve malware binaries, exploits, phishing, and/or credential stealing attacks. Some of these servers act as mother-ships that malware can use to retrieve commands after successfully compromising a machine. The network suspicious sessions supplied by the Protocol Analysis Engine (PAE) can include various information such as for example, the identity of the online server (IP/Domain, ports, etc.), various protocols, the geo region of the client, and types of messages such as requests and responses A Network Session Extraction Module 1103 can be used to screen and parse the given network session. The Network Session Extraction Module 1103 can be configured to parse different network variables necessary to conduct Active Intelligence Analysis such as protocol, the geo region of a client, destination IP/domain, destination port, and other variables. In some embodiments, multiple variables including protocol, IP domain, and port of an online server (destination) can uniquely define a session or an investigation target. In some instances, an investigation target defined by the three variables (protocol, IP domain and port) can be investigated once. Alternatively, an investigation target can be investigated multiple times at different points in time. The selected network flow can comprise data packets that contain at least four variables and that can include data exchanged between a source (client) and an internet server (online server). In some cases, the data can be requests and responses between clients and servers. The Network Session Extraction Module 1103 can further store the variables and data in form of data structure. The data structure can be a unique "Session Identity" structure. An example of a "Session Identity" structure is as below.

structure SESSION IDENTITY {
  proto
  client geo region
  destination domain/ip
  destination port
  data
}

However, it should be noted the example is for illustrative purposes; other formats of data structure and order of variables can be used to store the same information. In some embodiments, the data may be referred to as session data. The "Session Identity" structure can be further used by an "Active Intelligence Manager" module and submodules for Active Probing activities.

A Network Session Mimicking Module 1104 can be configured to create replicas of the Session Data extracted by the Network Session Extraction Module 1103. As mentioned previously, the Session Data can comprise data packets (e.g., a request) that were exchanged between a client and a server. The replicas of the Session Data can be used in an out-of-band connection between the system and the probed server such that the target server is not able to distinguish the created session request from an actual request. The replicas of the request packets can have a different identifier for the real client. For example, the replicas of the request packet may modify the packet fields that contain client identity information such as the http request 'Cookie', Proxy, Authorization headers, and any other client identity information. A client identity field can be filled with dummy data to replace the original data. In some embodiments, the dummy data can have a similar format such that the probed server is not able to distinguish the created client identity from the real client identity.

The Active Intelligence System 1100 may comprise an Active Intelligence Manager 1105. The Active Intelligence Manager 1105 is responsible for collecting real time intelligence by actively probing (i.e. using an active probing process) an online server. The Active Intelligence Manager 1105 can further analyze the collected active intelligence to determine whether the probed online server is malicious or not. In some embodiments, one or more online servers can be probed by the system simultaneously. The Active Intelligence Manager 1105 may comprise one or more submodules for gathering active intelligence and one or more submodules for analyzing the collected intelligence. Any number, for example one, two, three, four, five, or more of submodules can be included. In some embodiments, the number of modules included may depend on the types of Active Intelligence to be collected and analyzed. In some embodiments, each module can be responsible for a type of active intelligence as described elsewhere herein. Alternatively, the multiple modules can be collectively used to collect one type of active intelligence.

In some embodiments, the multiple sub-modules may include an Evasion based Intelligence Gathering Sub-Module 1109, a Geo Location based Intelligence Gathering Sub-Module 1110, a Content based Intelligence Gathering Sub-Module 1111, and a Hosting Infrastructure based Intelligence Gathering Sub-Module 1112.

The Evasion based Intelligence Gathering Sub-Module 1109 may be responsible for gathering evasion based intelligence. The Evasion based Intelligence Gathering Sub-Module 1109 may collect the evasion based intelligence by examining if an online server is trying to perform any evasion techniques. Hackers who operate malicious server are known to use different evasion techniques in order to hide their footprints. They are well aware that law enforcement may connect to them in order gather different types of intelligence. Once they find that someone is trying to spy on them, they may employ a variety of evasion techniques to distract them. The evasion based intelligence collected by the Evasion based Intelligence Gathering Sub-Module 1109 may include evasion activities of the probed server. Such activities may include, for example, resetting the network connections, permanently blocking the connecting IPs, redirecting a connection to a legitimate website, or other activities indicating that the server is trying to evade detection by serving legitimate content instead of malicious content. This Evasion based Intelligence Gathering Sub-Module 1109 may use anonymous VPN/Proxy IPs to connect to these online servers so that hackers are not able to track the connection and gathering of intelligence. One or more VPN/Proxy IPs can be used. The VPN/Proxy IPs can be provided by a VP/Proxy IP Selection Module as described later herein.

The Geo Location based Intelligence Gathering Sub-Module 1110 may be responsible for collecting Geo Location based intelligence. The Geo Location based Intelligence Gathering Sub-Module 1110 may be configured to connect to an online server from different geo locations simultaneously in order to find out if the online server is behaving the same way across all the geo locations or if its behavior or serving of contents changes with different geo locations. Malicious servers are known to change their behavior across different geo regions. For example, in the case of a targeted cyber attack towards a company located in United States, hackers may only serve malicious contents to an IP located within United States. If the same server is accessed through another Geo location like Britain, the hackers may assume that it is not the original victim but some other entity like law enforcement trying to spy on them. Similarly, hacking groups may set up their servers in such way that they do not infect any victims who live in a country or region they themselves live in. This may be a defensive strategy to avoid the scrutiny of local law enforcement agencies. The Geo Location based Intelligence Gathering Sub-Module 1110 may use two or more VPN/Proxy IPs concurrently or nearly concurrently, where at least one IP can be located within the geo region where the actual request was made and at least one IP is located in a different geo location. In some embodiments, the IP located within/outside the geo region of the actual request can be selected based on the geo region variable of the 'Session Identity' structure. The Geo Location based Intelligence Gathering Sub-Module 1110 may send a request or instructions to the VPN/Proxy IP Selection Module to select one of the IPs. For example, the instruction may request one IP address that is within the geo region of the actual request, and another IP address can be distant from the real geo region. In some embodiments, the selection of the distant IP address can be made based on historical data or a machine learning result or recommendation. For instance, among all the available distant geo regions, the region with the highest law enforcement power can be selected.

The Content based Intelligence Gathering Sub-Module 1111 is responsible for collecting Content Based Intelligence. The Content based Intelligence Gathering Sub-Module 1111 may be configured to gather the intelligence by scanning an online server and downloading all relevant artifacts publicly hosted on this server. The hosted content on a server may take various forms or comprise various types, such as HTML Code, Images, Java Script, Binaries, and the like. The Content based Intelligence Gathering Sub-Module 1111 may use a single VPN/Proxy IP to download all artifacts hosted on an online server. Alternatively, the Content based Intelligence Gathering Sub-Module 1111 may use more than one VPN/Proxy IP to download all artifacts hosted on an online server.

The Hosting Infrastructure based Intelligence Gathering Sub-Module 1112 is responsible for collecting Hosting Infrastructure based Intelligence. The Hosting Infrastructure based Intelligence Gathering Sub-Module 1112 may be configured to gather and check security posture and quality of an online server's hosting infrastructure. For instance, the sub-module may check the number of opened ports on the online server, the type of software components installed on the server such as a web server, protocols supported by the server such as http, https, irc, ftp, ssh, etc and server response time, etc. In some cases, the Hosting Infrastructure based Intelligence Gathering Sub-Module 1112 can use a single VPN/Proxy IP to scan the entire or a portion of the probed server.

The Active Intelligence System 1100 may comprise a plurality of modules to provide VPN/Proxy IPs to be used in the Active Probing process. In some embodiments, the plurality of modules may include a VPN/Proxy Connection manager 1113, a VPN/Proxy IP Selection Module 1114 and a VPN/Proxy IPs Database 1115.

The VPN/Proxy Connection manager 1113 may be referred to as VPN/Proxy Connection module. The VPN/Proxy Connection manager 1113 may be responsible for establishing a VPN/Proxy tunnel to the requested online server. The VPN/Proxy connection manager 1113 may establish a connection to the online server through its gateway and initiate the session request process. The connection may use a VPN/Proxy gateway IP provided by the VPN/Proxy IP Selection Module and a request packet generated by the Network Session Mimicking Module. During this session, multiple request and response packets may be exchanged through VPN/Proxy gateways and the online server under investigation.

The VPN/Proxy IP Selection Module 1114 may be responsible for managing, recycling and selecting VPN/Proxy IPs to be used by the plurality of modules as described elsewhere herein. These VPN/Proxy IPs may be used to establish one or more connections to the online server under investigation. During an Active Probing process, the VPN/Proxy IPs may be selected for various purposes. For example, the same VPN/Proxy IP may not be used again to connect to the same online server under investigation. In another example, the VPN/Proxy IP may be selected based on geo location to be used by the Geo Location based Intelligence Gathering Sub-Module 1110. For instance, the VPN/Proxy IP Selection Module 1114 may be asked for an IP located in a particular Geo location such as USA, Russia and the like. When a geo location is requested, the VPN/Proxy IP Selection Module 1114 may be configured to release IPs located in the requested regions only.

The VPN/Proxy IPs Database 1115 may be configured to keep track of all free, used, and currently used IPs. The VPN/Proxy IPs Database 1115 may be data repositories that keep track of the status of all IPs that can be used by the system for probing an online server. The status may include whether the IP is used or new, the geo location of the IP, the connection and health status for each IP, and other status information. The VPN/Proxy IPs Database 1115 may further maintain a complete usage history for an IP address. For instance, the database may keep track of all connections that made use of a particular VPN/Proxy gateway in the past.

FIG. 11 illustrates a block diagram of the system, in accordance with a preferable embodiment of the invention. As shown in the figure, the Active Intelligence system 1100 may include a user interface 1116. The user interface may be operably coupled to the various components of the system. As mentioned previously, the Active Intelligence System 1100 may comprise an Active Intelligence Engine 1101 that manages the overall system. The Active Intelligence System 1100 ma comprise multiple modules such as the Network Session Extraction Module 1103 and Network Session Mimicking Module 1104 for generating Session Identity structure data used for active probing. The Active Intelligence System 1100 may further comprise an Active Intelligence Manager 1105 for active probing and collecting intelligence from the target server by establishing a connection to the server. The Active Intelligence Manager 1105 can include a plurality of intelligence gathering modules (e.g., Evasion based Intelligence Gathering module 1109, Geo Location based Intelligence Gathering module 1110, Content based Intelligence Gathering module 1111, and Hosing Infrastructure based Intelligence Gathering module 1112). The Manager 1105 may further utilize VPN IPs provided by a plurality of VPN IP managing modules and databases (e.g., VPN IP Selection module 1114, VPN Connection Manager 1113, and VPN IPs Database 1115).

Figure 12:
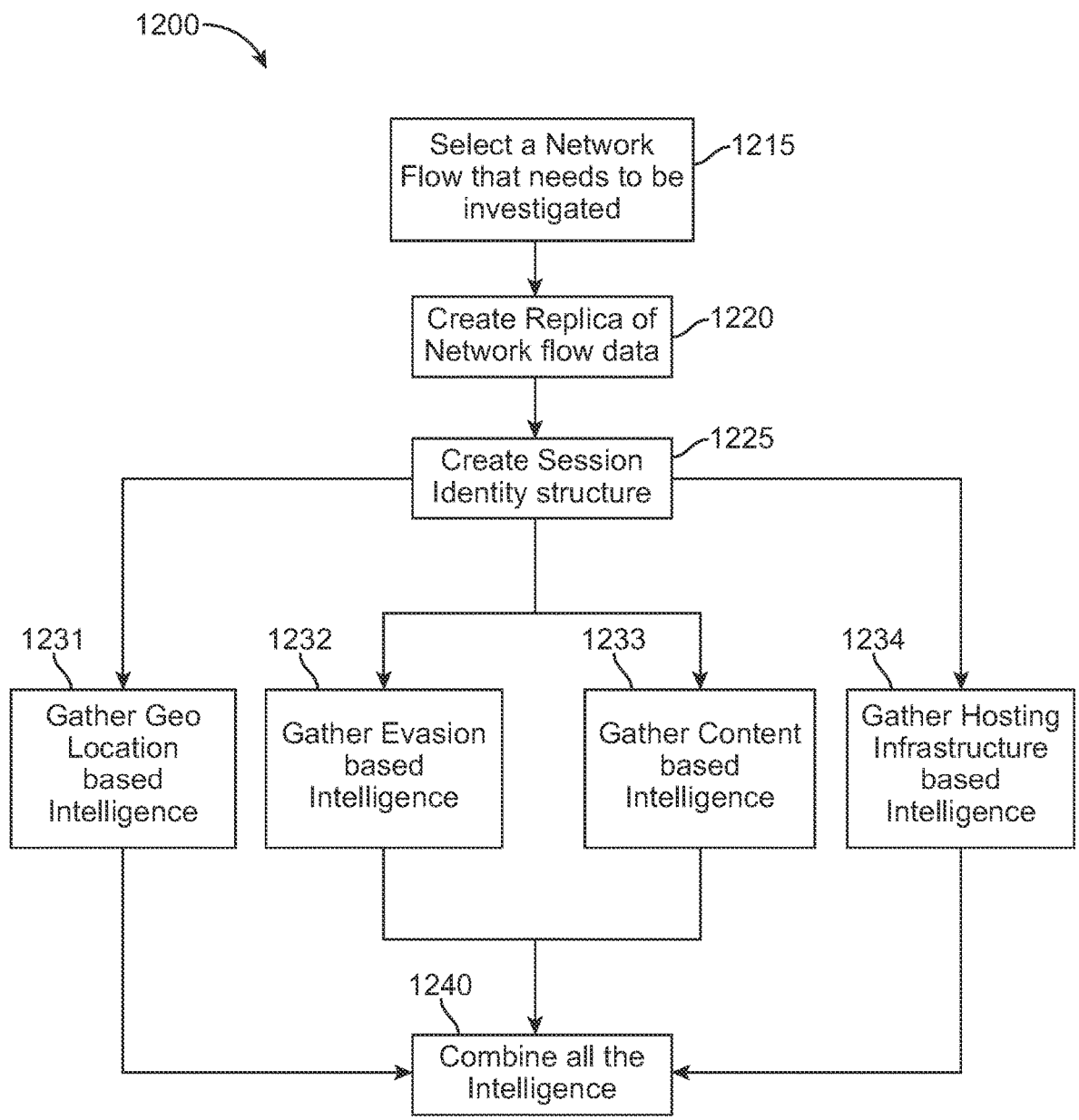
FIG. 12 is a flowchart showing an exemplary method for detecting an online malicious server.

FIG. 12 is a flowchart showing an exemplary method for actively probing an online server in order to gather various type of intelligence. A network flow or session may be supplied by Protocol Analysis Engine (PAE). The network flow may consist of one or more variables related to the internet communication between the client and the server. A replica of the network flow data may be created at 1220 which may then be used to create a session identity structure at 1225. The session identity structure may be processed and one or more types of forensic intelligence related to the operation of the server can be collected or gathered at 1231-1234 using the processed session identity structure. The multiple types of forensic intelligence can be collected simultaneously or sequentially. In some embodiments, all or some of the four types of intelligence are collected and analyzed. In some embodiments, one or more VPN IPs can also be used for collecting or gathering intelligence at 1231-1234. The collected one or more types of forensic intelligence can be combined at 1240 and further used by Active Feature Extractor. These features can further be used by Active Self Learning classifiers to determine if the given session is malicious or benign.

Figure 13:
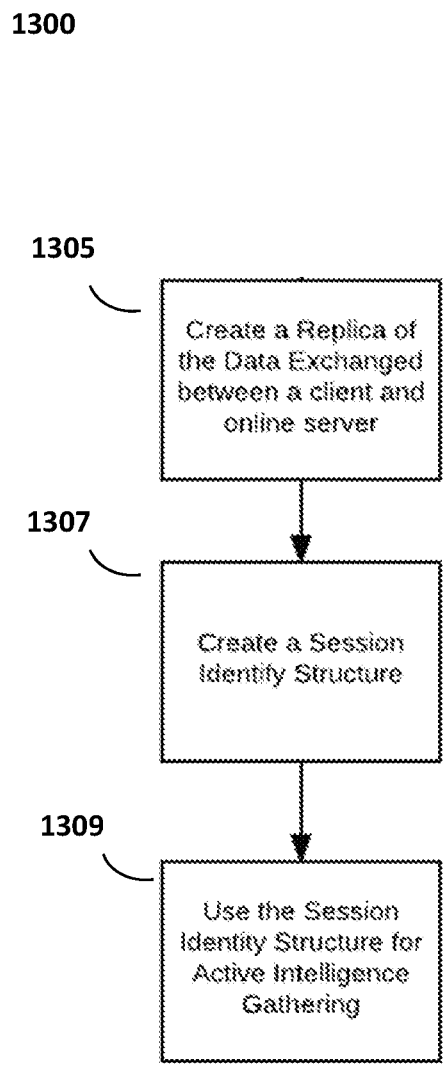
FIG. 13 is a flowchart showing an exemplary method for constructing a session identity structure from monitored and captured internet traffic.

The process of creating or constructing a session identity structure from a given network session is further depicted in FIG. 13. The given network session can be parsed by the Network Session Extraction Module 1103 in order to extract network variables like destination (online server) IP, destination Port, protocol, geo location of source (client) IP and data. As described previously, the data can comprise the session data (e.g., requests, and/or responses) exchanged between the client and the server. The Network Session Mimicking Module 1104 can be engaged at step 1305 to create a replica of the session data as described previously herein. The created session data can be a replica of the original session data with exception of the data fields that contains identity information of the real client. The created session data can replace the original client identity data with dummy data to impersonate a different client. Next, the Network Session Mimicking Module 1104 can create or generate a Session Identity Structure 1307, including the five variables destination (online server) IP, destination Port, protocol, geo location of source (client) IP, and the created session data as described elsewhere herein. The Session Identity Structure can be further used by the Active Intelligence Gathering modules to gather intelligence in real time 1309.

Figure 14:
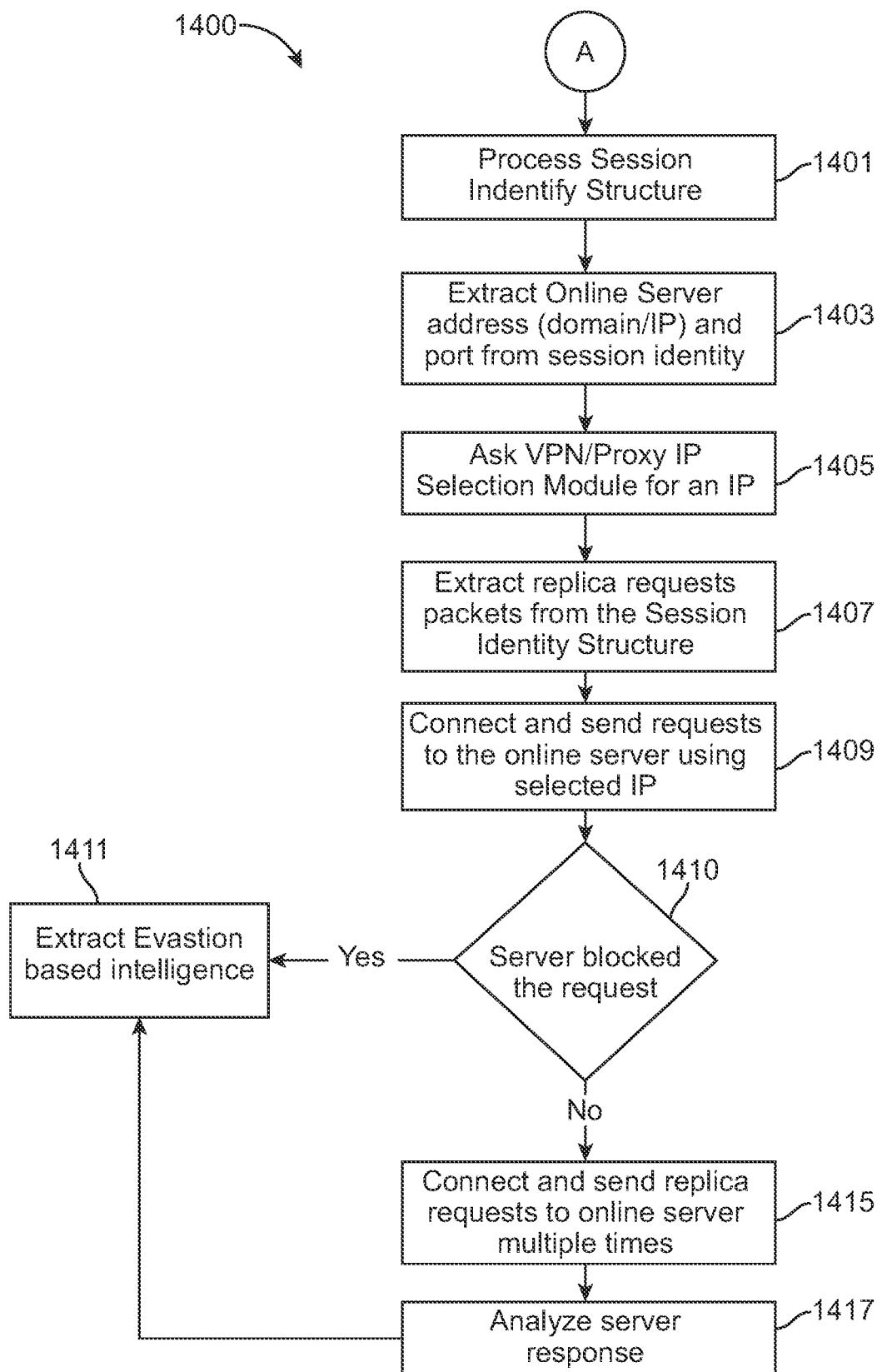
FIG. 14 is a flowchart showing an exemplary method for the collection of evasion based intelligence.

FIG. 14 is a flowchart showing an exemplary method for the collection of evasion based intelligence. The evasion based intelligence collection process 1400 can be performed by the one or more sub-modules of the Active Intelligent Manager such as the Evasion based Intelligence Gathering Sub-Module 1109 and VPN/Proxy IP selection and connection modules. At step 1401, the Evasion based Intelligence Gathering Sub-Module 1109 can be configured to process the Session Identity structure created by the process described in FIG. 3 to extract the domain/IP and destination port of the online server at step 1403. Next, at step 1405, the sub-module can request an available VPN/Proxy gateway IP from the VPN/Proxy Selection Module to be used to connect to the online server. In some embodiments, along with the request, the identity information (e.g., domain and port) of the to-be-connected online server can be included such that the selection Module can select an appropriate VPN/Proxy IP that was not used for connecting to the specific server. Other requirements can also be incorporated in the request to select a VPN/Proxy IP for the system to impersonate through an anonymous VPN/Proxy server. At step 1407, once the Evasion based Intelligence Gathering Sub-Module 1109 receives the VPN/Proxy gateway IP, the sub-module can extract the Session Data Replica packet from the Session Identity Structure. At step 1409, the VPN/Proxy Connection Manager 1113 can establish a connection to the online server using the selected VPN/Proxy gateway IP and send the replica request packet to the online server. Next, the Evasion based Intelligence Gathering Sub-Module 1109 can monitor and observe the presence of evasion activities of the online server. For example, the online server can be monitored to check if it is trying to block the connection at 1410. If the online server is not blocking the first request, the Evasion based Intelligence Gathering Sub-Module 1109 can send a number of additional requests at 1415 to test if the online server is blocking the connection after multiple requests. In addition to examine blocking connection behavior of the online server, various other evasion behaviors can be examined. In some embodiments, the Evasion based Intelligence Gathering Sub-Module 1109 can also examine or analyze the response received after multiple requests at step 1417. The sub-module can compare the response received to a response that was served to a real client. A difference in the two responses can indicate that the online server is trying to hide its malicious contents. The Evasion based Intelligence Gathering Sub-Module 1109 can then extract Evasion based intelligence at 1411 from the server responses.

Figure 15:
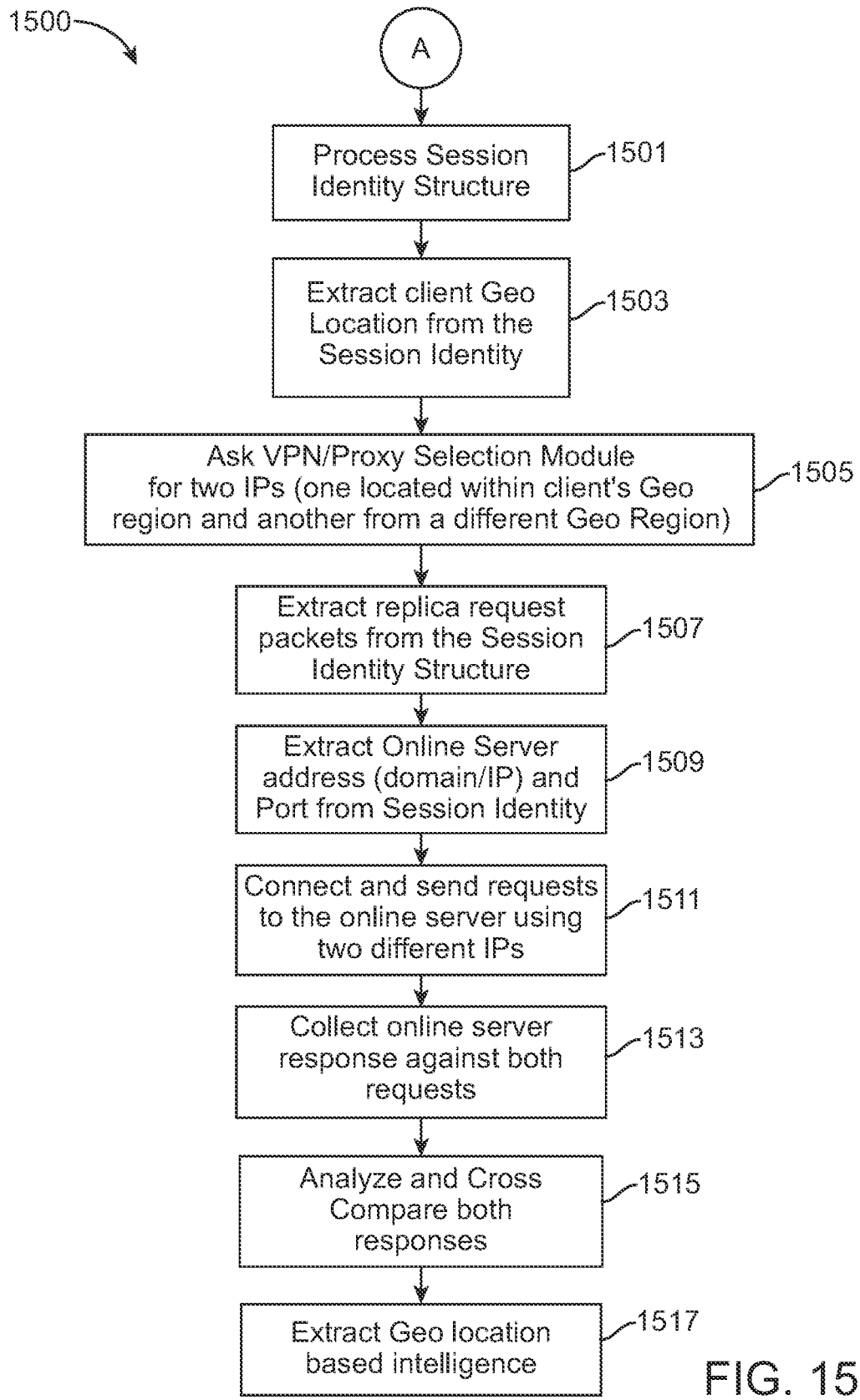
FIG. 15 is a flowchart showing an exemplary method for the collection of geo location based intelligence.

FIG. 15 is a flowchart showing an exemplary method for the collection of geo location based intelligence. In some embodiments, one or more sub-modules of the Active Intelligent Manager such as the Geo Location based Intelligence Gathering Sub-Module 1110 and VPN/Proxy IP Selection and VPN Connection Manager Modules, 1114 and 1113 respectively, can be involved in the process 1500. The purpose of the Geo Location based intelligence gathering process is to find out if an online server is behaving the same way across various geo locations or if its behavior or content being served changes across different geo locations. At step 1501, the Geo Location Based Intelligence Gathering Sub-Module 1110 can be configured to process the Session Identity structure created by the process described in FIG. 3 and to extract the client Geo Location information at 1503. In some embodiments, the domain/IP and destination port of the online server can also be extracted at step 1503. Next, the Geo Location Based Intelligence Gathering Sub-Module 1110 can request two or more available VPN/Proxy gateway IPs from the VPN/Proxy Selection Module to be used to connect to the online server at 1505. In the request, information regarding the geo location of the client can be included such that the VPN/Proxy IP Selection Module can select at least one IP within the Geo Region and at least one IP from a different geo location. Other requirements can also be incorporated in the request to select a VPN/Proxy IP for the system to impersonate through an anonymous VPN/Proxy server. For example, the identity information (e.g., domain and port) of the to be connected online server can be included such that the VPN/Proxy IP Selection Module can select an appropriate VPN/Proxy IP that was not used for connecting to the specific server. At step 1507, once the Geo Location based Intelligence Gathering Sub-Module 1109 receives the VPN/Proxy gateway IP, the sub-module can extract the Session Data Replica packet from the Session Identity Structure. If the online server address is not extracted from previous steps, the Geo Location Based Intelligence Gathering Sub-Module 1110 can extract the domain/IP and port of the online server from the Session Identity structure at step 1509. At step 1511, the VPN/Proxy Connection Manager 1113 can establish a connection to the online server using the selected two or more VPN/Proxy gateway IPs and send the same replica request packets to the online server simultaneously. Next, at step 1513, the Geo Location Based Intelligence Gathering Sub-Module 1110 can collect the response from the online server to the same session requests sent from the different IPs. The Geo Location Based Intelligence Gathering Sub-Module 1110 can then analyze and cross compare the responses at step 1515 to determine whether they are the same or geo-dependent. At step 1517, various geo location based intelligence can be extracted based on the collected responses. An examination can be conducted to observe whether the online server is trying to behave differently when connected through different Geo locations. Malicious servers are known to change their behavior across different geo locations. Accordingly, if the responses are different or geo location dependent, it can be an indication that the online server may be selectively infecting clients in a specific region. Moreover, analysis results showing that the online server is trying to block the connection when connected through a foreign geo region can indicate that hackers are avoiding entities located in a specific region. The Geo Location based Intelligence Gathering Sub-Module 1110 can extract Geo Location based intelligence from the server responses at step 1517.

Figure 16:
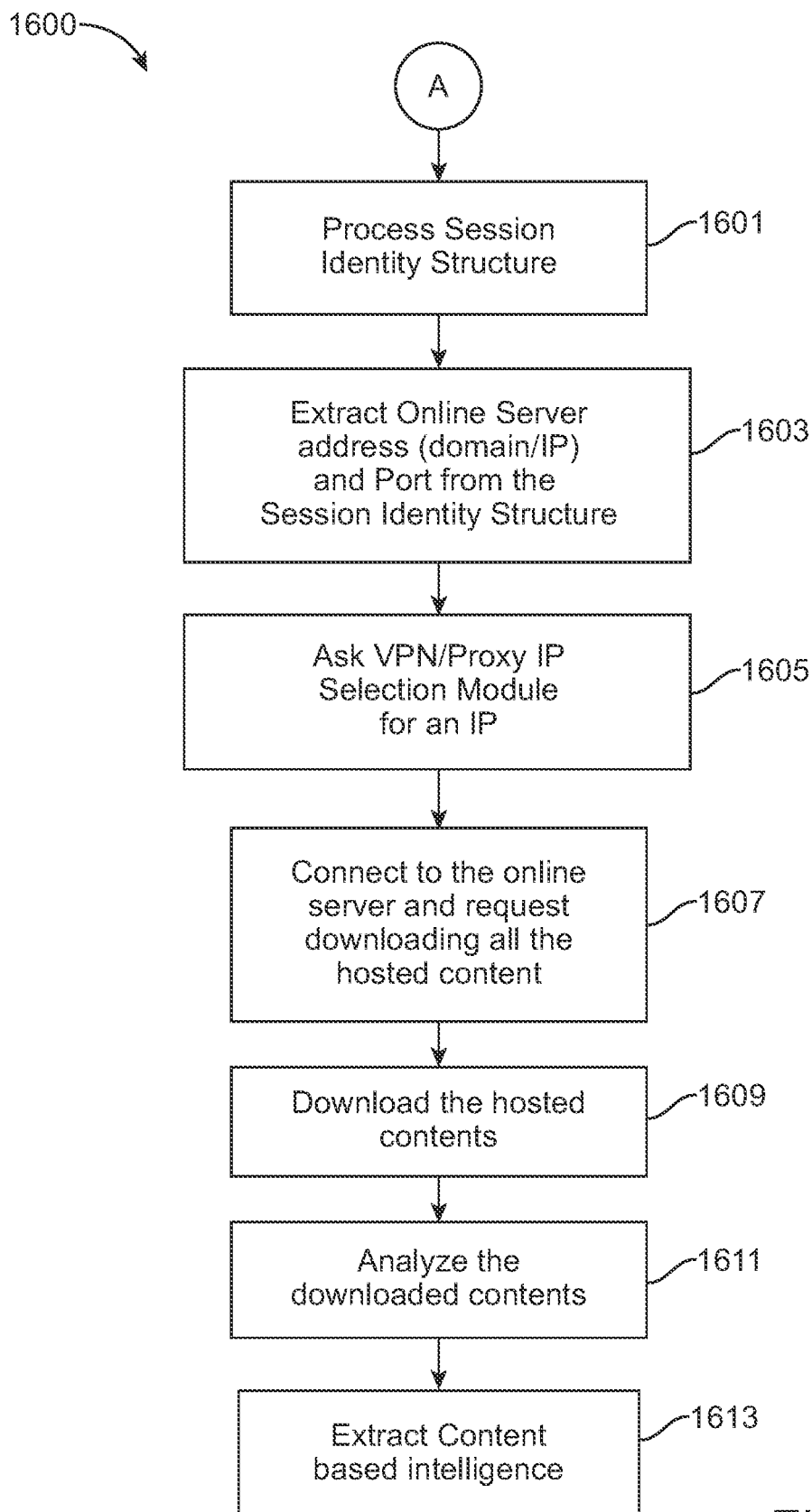
FIG. 16 is a flowchart showing an exemplary method for the collection of content based intelligence.

FIG. 16 is a flowchart showing an exemplary method for the collection of content based intelligence. In some embodiments, one or more sub-modules of the Active Intelligent Manager such as the Content based Intelligence Gathering Sub-Module 1111 and VPN/Proxy IP selection can be involved in the process 1600. The content based intelligence gathering process 1600 can gather intelligence by scanning an online server and downloading all relevant artifacts hosted on the server. The hosted content on a server can comprise HTML Code, Images, Java Script, Binaries, or other hosted content as known in the art or yet to be developed. At step 1601, the Content Based Intelligence Gathering Sub-Module 1111 can be configured to process the Session Identity structure created by the process described in FIG. 3 and to extract the domain/IP and destination port of the online server at step 1603. Next, at step 1605, the Content Based Intelligence Gathering Sub-Module 1111 can request an available VPN/Proxy gateway IPs from the VPN/Proxy Selection Module to be used to connect to the online server. In some embodiments, along with the request, the identity information (e.g., domain and port) of the to be connected online server can be included such that the selection Module can select an appropriate VPN/Proxy IP that was not used for connecting to the specific server. Other requirements can also be incorporated in the request to select a VPN/Proxy IP for the system to impersonate though an anonymous VPN/Proxy server. At step 1607, once the Content based Intelligence Gathering Sub-Module 1111 receives the VPN/Proxy gateway IP, the VPN/Proxy Connection Manger 1113 can establish a connection to the online server using the selected VPN/Proxy gateway IP and send a request packet to the online server to request download all the hosted content. Next, at step 1609 the Content Based Intelligence Gathering Sub-Module 1111 can download the hosted contents from the online server. The Content Based Intelligence Gathering Sub-Module 1111 can then analyze the downloaded contents at step 1611. Various analyses can be performed to analyze the contents. For example, if an online server is serving a lot of legitimate content, it can be an indication that the online server is not part of a criminal infrastructure and vice versa. In another example, active probing for additional artifacts gives the Active Intelligent System a unique ability to analyze contents that were not accessed by the real client, for instance, if the real client was seen downloading an executable from the online server. During content probing the Active Intelligent System can find more binaries and even other types of malicious artifacts like Exploits, Phishing pages, Spam templates hosted on the same server. Downloading all hosted contents provides more data points to the system and increases the accuracy of the decision. The Content based Intelligence Gathering Sub-Module 1110 can then extract Content based intelligence from the server responses at step 1613.

Figure 17:
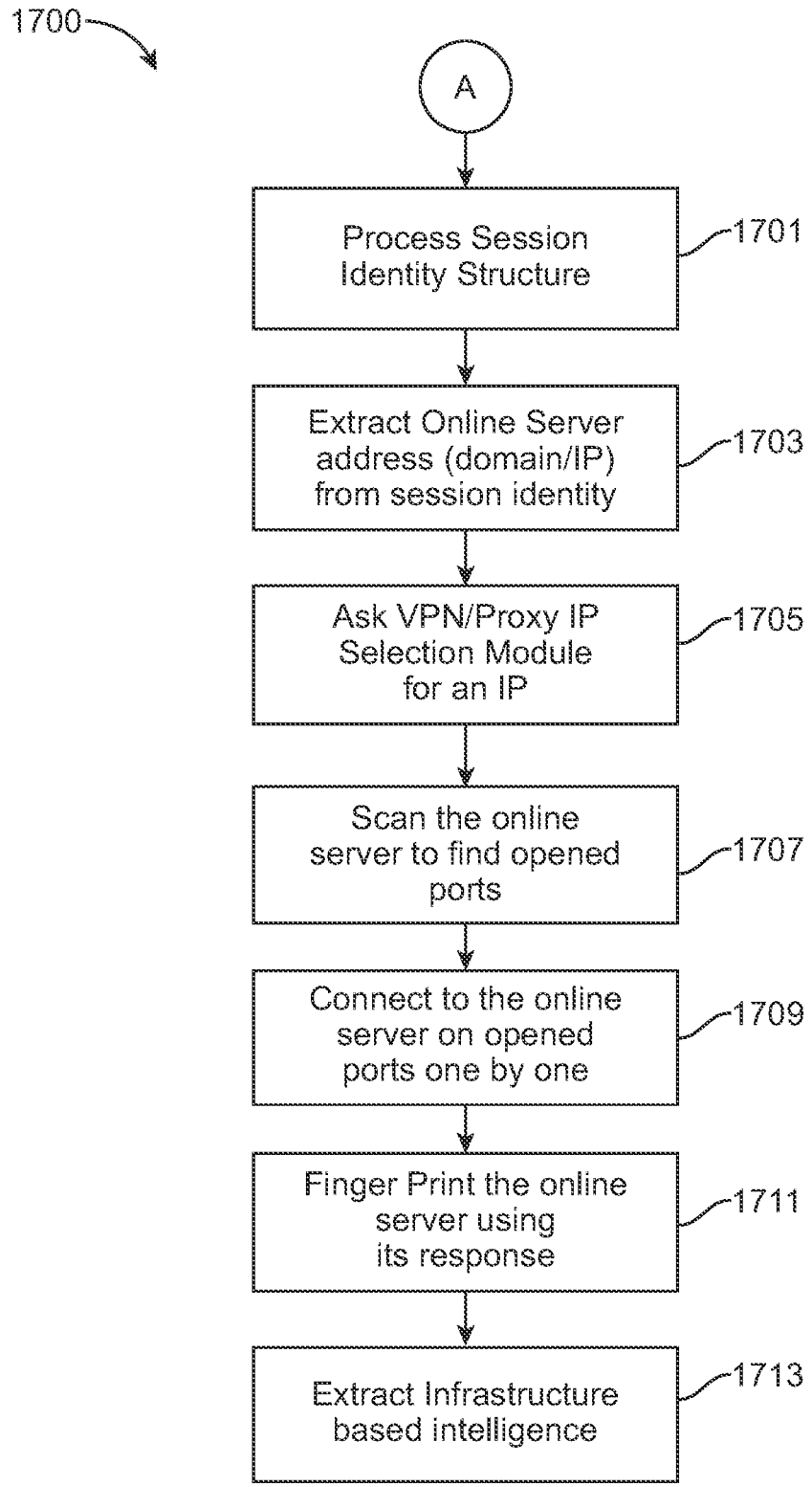
FIG. 17 is a flowchart showing an exemplary method for the collection of hosting infrastructure based intelligence.

FIG. 17 is a flowchart showing an exemplary method for the collection of hosting infrastructure based intelligence. This hosting infrastructure based intelligence is gathered by checking security posture and quality of an online server hosting infrastructure. Normally, as compared to legitimate servers, most malicious servers are hosted on cheap infrastructures with poor security postures. These servers are set up in a rush and are meant to be used for a very limited time. Once these servers appear on security vendor's black lists, hackers abandon these servers and move to new hosting infrastructure. Similarly, most malicious servers are overwhelmed by connections originating from infected machines world-wide. Most of the time, such servers would respond very slowly to requests. As part of its intelligence gathering process, the system also looks for all open ports on the online server and uses this information to examine the server components hosted on the server. Various features of the online server can be examined, including for example, the response of the server to a request, number of opened ports on the online server, types of software installed on the online server, and protocols used by the online server. In some embodiments, one or more sub-modules of the Active Intelligent Manager such as the Hosting Infrastructure based Intelligence Gathering Sub-Module 1112 and VPN/Proxy IP selection can be involved in the process 1700. The Hosting Infrastructure based intelligence gathering process 1700 can gather intelligence by checking the security posture and quality of an online server hosting infrastructure. At step 1701, the Hosting Infrastructure Based Intelligence Gathering Sub-Module 1112 can be configured to process the Session Identity structure created by the process described in FIG. 3 to extract the domain/IP and destination port of the online server at step 1703. Next, at step 1705 the Hosting Infrastructure Based Intelligence Gathering Sub-Module 1112 can request an available VPN/Proxy gateway IP from the VPN/Proxy Selection Module to be used to connect to the online server. In some embodiments, along with the request, the identity information (e.g., domain and port) of the to-be-connected online server can be included such that the selection Module can select an appropriate VPN/Proxy IP that was not used for connecting to the specific server. Other requirements can also be incorporated in the request to select a VPN/Proxy IP for the system to impersonate through an anonymous VPN/Proxy server. At step 1707, once the Hosting Infrastructure based Intelligence Gathering Sub-Module 1112 receives the VPN/Proxy gateway IP, the Sub-Module can scan the online server to find the opened ports. Next, the VPN/Proxy Connection Manager can establish a connection to the open port of the online server one by one at step 1709. For each connection, the Hosting Infrastructure Based Intelligence Gathering Sub-Module 1112 can collect fingerprint of the online server by analyzing various features, responses, performance of the online server in response to the request sessions at step 1711. The Hosting Infrastructure based Intelligence Gathering Sub-Module 1112 can then extract Hosting Infrastructure based intelligence from the server fingerprint at step 1713.

Active Vision Analysis ("Active Analysis Runtime" Use Case)

The Active Cyber Defense system and method described herein provides a platform that can incorporate different systems for performing various types of forensics analysis. For instance, Active Cyber Defense system may use Natural Language Processing (NLP) and Visual Analysis to determine the maliciousness of a variety of attacks. For instance in order to detect a potential Credential Stealing Attack, Active Cyber Defense System can employee Natural Language and Visual analysis based analysis called Active Vision. Active Vision which is one of the many subsystems of the Active Analysis Engine 130 as shown in FIG. 1 that may receive a HTTPS or HTTP Session marked as a Potential Candidate for a Credential Stealing Attack from Protocol Analysis Engine (PAE). Active Vision can further use Visual and Natural Language Analysis 334 as shown in FIG. 3 to detect if the given suspicions session is a credential stealing attack. The output of Active Vision analysis is, either the given session is benign or one of the many types of Credential Stealing Attacks. This verdict is further used by the Active Feature Extractors that consider this verdict as one of the many features. At the end features collected from Active Vision and other analysis modules like Active Intelligence get combined in form of a final feature set. This final feature set is processed by Self Learning Classifiers to reach the final conclusion.

Credential stealing is a type of network-based cyber attack. It is a problem that exists due to the increasing use of webpages that require a user to provide sensitive or confidential information in order to access products or services. An attacker may exploit this use of webpages in order to steal a user's credentials, including sensitive or confidential user information, by creating look-alike pages that match or look similar to an original legitimate web page associated with a brand or trustworthy entity. For example, a hacker seeking to acquire or steal a user's credentials may create a fake or impostor page that matches or is similar to a Sign-in, Sign-up, Password, or Recovery page of a known brand such as Google, Yahoo, or Microsoft. The hacker may then send an email or instant message to a user that includes a link to this fake page. When the user reads the email or message and selects the link, the fake page is displayed for the user. A user that fails to notice discrepancies in the URL or security certificate of the page may trust that the fake page is legitimate and may proceed to enter confidential information onto the fake page resulting in real time transfer of the user's sensitive information to the attackers.

The credential stealing attacks as described above are designed to exploit the vulnerability of the human brain that gives much higher weight to visual design and language written on a web page than to reliable indicators that may validate the identification of the page such as, for example, the URL or security certificate. A user opening a web page will typically focus on the visual appearance of the page and then on the language written on that page, and will often ignore the URL, Domain and Certificate information of a web page that will usually be visible at top of a browser window. The visual appearance and text on the page are vital to a user's perception and understanding of the origin and purpose of a particular web page. The downside is that this natural human tendency to rely on visual and textual similarities for identifying legitimate web pages associated with known brands may be exploited by a hacker or an attacker who creates a visual replica or fake page of the legitimate web page to gain a user's trust. That is, many users will assume the replica or fake page to be a legitimate web page due to visual and textual similarities associated with known brands and will not hesitate to enter their confidential information onto the replica or fake page.

There are two categories of credential stealing attacks considered in this application: (1) brand-based credential stealing; and (2) custom credential stealing. In the case of brand-based credential stealing, an attacker creates an exact replica (at least in terms of visual and textual content) of a brand page that requests for identical information required by the original legitimate page associated with the brand. In contrast, in the case of custom credential stealing, the fake page created by attackers is not an exact replica in terms of visual and textual content of a known brand page but uses certain elements of known brands such as brand logos, brand names and other brand elements to make victims believe that the page belongs to the trusted brand. An advantage of the custom credential stealing page is that an attacker can use multiple brand names on a single page to snatch or acquire a variety of information. Additionally, these pages may also ask for information that is usually not required by the original legitimate brand pages. For instance, a Banking Sign-in page does not typically request a user's social security or ATM PIN number, but a custom credential stealing page with a bank logo may have a web form asking for all of this information.

An Active Vision detection method and system for detecting credential stealing attacks using an automated machine-learning page examination engine may be used to detect both brand-based and custom credential stealing attacks. The approach disclosed herein assumes that if a candidate web page is a replica of a known Brand Page (i.e. an original legitimate web page associated with a brand or trustworthy entity) but the identity as determined by identification information such as a URL or an SSL Certificate of the candidate web page does not match with that of a known brand or if a candidate web page is a replica of a known Credential Stealing Page or has certain text, visual and source code features known to be only associated with Credential Stealing Pages, then it must be a Credential Stealing Page. The efficacy of the similarity analysis may be achieved through machine learning and is comparable to human analysis. In a preferable embodiment, the classifiers responsible for establishing similarity are binary in nature and have only two outputs.

The Active Vision System is also capable of self-learning; every new attack detected by the system becomes part of system's long term memory making it incrementally more accurate in future predictions using its past experience.

The Active Vision System may comprise modules, sub-modules, feature extraction modules, classifiers and databases. Databases or knowledge bases are data repositories that hold vital information about a set of archived web pages that may be stored as profiles and that may include identity information and various features extracted from the web pages. The system may comprise two, three, four, or more different types of knowledge bases. Classifiers may include binary classifiers. Binary classifiers may comprise machine learning models that help the overall system in making accurate predictions. These classifiers may first be trained by human experts on a set of training data and may later be used for prediction in real time. The system may comprise one, two, three, four or more different types of classifiers. Feature extraction modules may compare and extract various features from a Candidate Page and from pages stored in the knowledge bases explained above based on Visual, Natural Language, and Source Code analysis. These features may then be used by the binary classifiers to determine whether the Candidate Page is a legitimate brand page or whether it is a look-alike, fake, or impostor page that may be devised to implement a credential stealing attack. The system may comprise ten, eleven, twelve, thirteen, fourteen, fifteen or more modules or major components.

Figure 21:
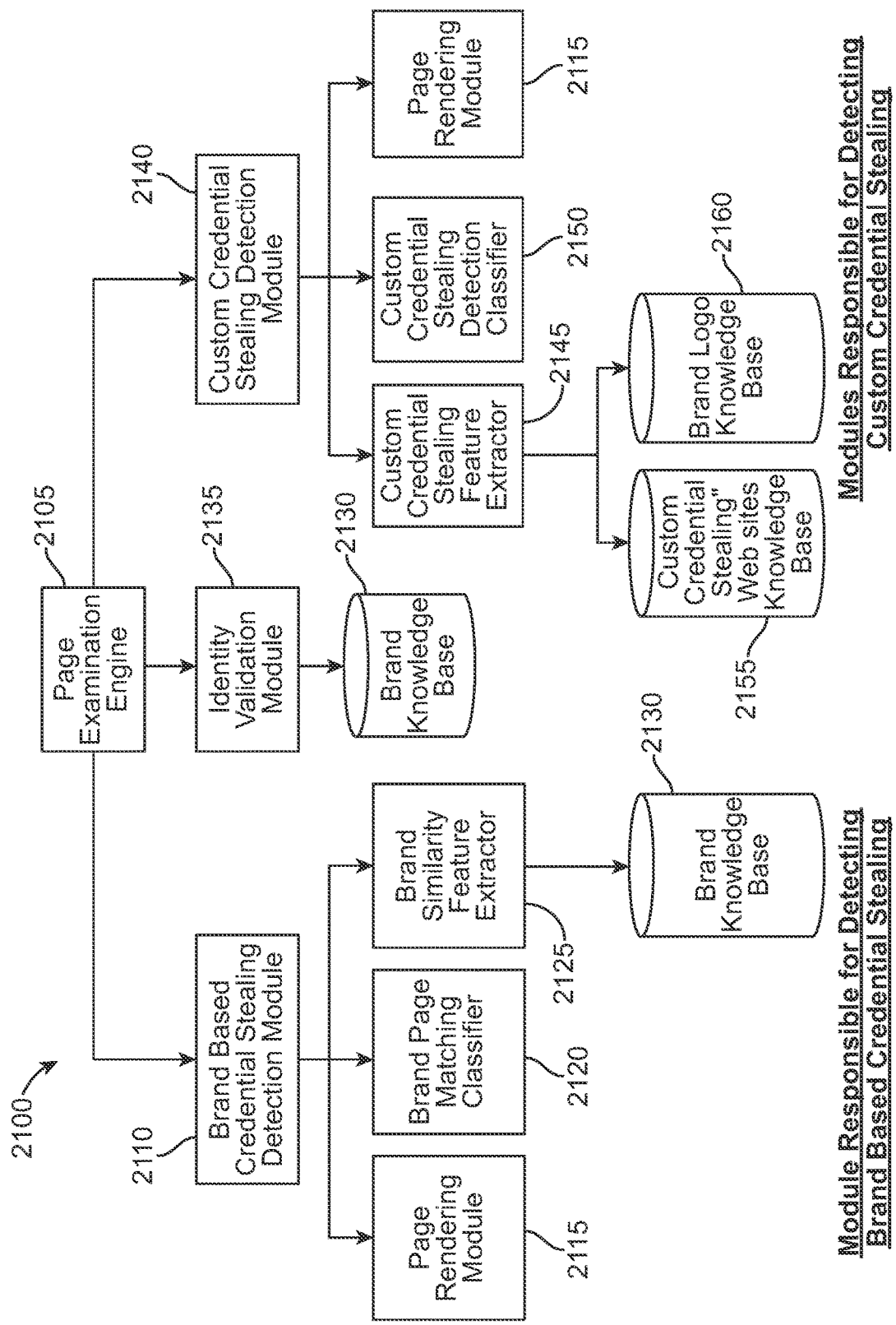
FIG. 21 is a block diagram showing a number of functional components of an embodiment of an Active Vision System where Natural Language Processing (NLP) and Computer Vision Analysis is being used to detect Credential Stealing attacks.

FIG. 21 represents a block diagram showing a number of functional components of an embodiment of an Active Vision System. As shown in FIG. 21, a preferable embodiment of an Active Vision System (2100) may comprise a Page Examination Engine (2105), which may further comprise three functional modules: an Identity Validation Module (2135), a Brand Based Credential Stealing Detection Module (2110), and a Custom Credential Stealing Detection Module (2140).

A Page Examination Engine (2105) may comprise a main engine to manage one or more modules or sub-modules used to determine whether a given page or Candidate Page (not shown) is not what it is purported to be based on its appearance to the user. Such a page may be merely posing as a legitimate brand page while it is actually attempting to steal a user's credentials. This main engine may be responsible for controlling all of the modules or sub-modules in order to output a single verdict i.e. that the Candidate Page is a Credential Stealing Page (i.e. a fake or impostor page that may be attempting to steal a user's credentials) or that it is not a Credential Stealing Page.

An Identity Validation Module (2135) may comprise a cross validation module that may check identity information such as URL Domain, SSL Certificate, and Domain WHOIS information of a Candidate Page (i.e. candidate identity information) against identity information from the profiles of legitimate brand pages (i.e. brand identity information) stored in the Brand Knowledge Base (2130). If there is a match between the candidate and the brand identity information it may be determined that no further investigation is needed and the Candidate Page may be identified as benign. In case of a mismatch, the Candidate Page may be marked as under investigation for further analysis.

Brand Knowledge Bases may comprise data repositories that hold vital information about a set of archived known brand web pages. This knowledge base may store content (e.g. Images, Text, and Source Code) and identification and/or identity information (e.g. URL, Domain and SSL information) about known brand web pages that belong to some of the world's most popular global brands like Yahoo, Gmail, Hotmail, Dropbox to name a few examples. These brand web pages may be classified as falling into various categories or types such as Sign-in Pages, Sign-up Pages, Forgot password pages and Password Recovery Pages. One example of a brand page is a Yahoo Email Sign-in page. A Brand Knowledge Base (2130) may hold vital identify information corresponding to each of these brand pages, including for example, Domain, SSL information and Domain ownership records. For instance, in the case of a Yahoo Email sign-in page the identity information may be: Domain=mail.yahoo.com, SSL Cert Owner=Yahoo, Inc., Domain owner for mail.yahoo.com=Yahoo, Inc. A Brand Knowledge Base (2130) may also store information about whether these pages are normally served over http or https.

A Page Examination Engine (2105) may comprise a Brand Based Credential Stealing Detection Module (2110). The Brand Based Credential Stealing Detection Module (2110) may comprise a sub-module dedicated to detecting if a Candidate Page is using a known brand replica page as a Credential Stealing scheme or not. To accomplish this task, this module may comprise one or more sub-modules including, for example, a Page Rendering Module (2115), a Brand Page Matching Classifier (2120), a Brand Similarity Feature Extractor (2125), and a Brand Knowledge Base (2130).

A Page Rendering Module (2115) may be used for loading/rendering a Candidate Page into a browser memory (not shown) and for extracting the rendered webpage's Image, written text, and source code from the browser memory. Extracting these artifacts from the browser memory instead of fetching it directly from the web server may avoid opportunities for encryption, obfuscation and encoding.

A Brand Similarity Feature Extractor (2125) may comprise a component that compares a Candidate Page with content or profiles stored in the Brand Knowledge Base (2130) in order to extract different types of features to form similarity feature sets. The features may be extracted based on a Visual, a Natural Language, and a Source Code similarity analysis. These extracted similarity features sets may comprise features extracted from the Candidate Page and from a given brand page. The similarity feature sets may be sent or passed to the Brand Page Matching Classifier (2120).

A Brand Page Matching Classifier (2120) may comprise a binary classifier used to make a prediction as to whether a Candidate Page is a replica of any of the brand pages whose profiles are stored in the Brand Knowledge Base (2130) based on the similarity feature sets received from the Brand Similarity Feature Extractor (2125). The features used to make this prediction may be extracted based on a Visual, a Natural Language, and a Source Code similarity analysis.

A Custom Credential Stealing Detection Module (2140) may comprise a sub-module used to determine whether a Candidate Page is a Custom Credential Stealing Page. This module may comprise other sub-modules including: a Custom Credential Stealing Feature Extractor (2145), a Custom Credential Stealing Detection Classifier (2150), a Page Rendering Module (2115), a Custom Credential Stealing Knowledge Base (2155), and a Brand Logo Knowledge base (2160) to accomplish this task.

A Custom Credential Stealing Websites Knowledge Base (2155) may comprise data repositories that hold vital information about a set of archived Custom Credential Stealing Pages. These Custom Credential Stealing Pages are known or have been determined to be fake or impostor webpages that may be attempting to steal a user's credentials but that do not appear to be exact replicas of brand pages. This knowledge base may store content (e.g. Images, Text, and Source Code) and identification and/or identity information (e.g. URL, Domain and SSL information) about known or identified Custom Credential Stealing Pages. This knowledge base may first be populated at the training phase by human experts. Later the system may keep updating this knowledge base on its own automatically as it detects more and more Custom Credential Stealing Pages. In addition, a Brand Logo Knowledge Base (2160) may store content and information about official logos of different global brands that are commonly targeted in Credential Stealing attacks.

A Custom Credential Stealing Feature Extractor (2145) may comprise components that compare a Candidate Page with content or profiles stored in a Custom Credential Stealing Websites Knowledge Base (2155) and/or a Brand Logo Knowledge Base (2160) in order to extract different types of features to form similarity feature sets. The features may be extracted based on a Visual, a Natural Language, and a Source Code similarity analysis. These extracted similarity features sets may comprise features extracted from the Candidate Page and from a given custom credential stealing page and/or from a brand logo. The similarity feature sets may be sent or passed to the Custom Credential Stealing Detection Classifier (2150).

A Custom Credential Stealing Detection Classifier (2150) may comprise a binary classifier used to make a prediction as to whether a Candidate Page is a Custom Credential Stealing Page (i.e. a fake or impostor page that may be attempting to steal a user's credentials but that does not appear to be a replica of a known brand page) based on the similarity feature sets received from the Custom Credential Stealing Detection Classifier (2150). The features used to make this prediction may be extracted based on a Visual, a Natural Language, and a Source Code similarity analysis. This classifier may come into play where the Candidate Page does not appear to be an exact replica of a known brand page. In such a case, the Brand Page Matching Classifier (2120) may fail to detect a Candidate Page as a Brand-based Credential Stealing Page and further investigation may be needed to determine whether the Candidate Page poses a threat of credential stealing.

The Active Vision detection method may comprise a two stage process, wherein the stages are herein referred to as Stage 1 and Stage 2 respectively. The two stage process may be needed to accurately detect both types of Credential Stealing attacks, namely, brand-based and custom credential stealing attacks. In a preferable embodiment, the two stage process may be implemented by the Brand Based Credential Stealing Detection Module (2110) and Custom Credential Stealing Detection Module (2140) respectively.

The Active Vision System may first match a Candidate Page's vital identify information such as the URL Domain, SSL Certificate, and Domain WHOIS information with brand identity information from brand profiles stored in the Brand Knowledge Base (2130). If there is a match it may be assumed that the Candidate Page belongs to a legitimate entity and there is no need to investigate further. If the identity information is not matched, then the next step may be to determine whether the Candidate Page is a Credential Stealing page or an unrelated legitimate web page.

In Stage 1, the system may determine whether the Candidate Page is a look-alike page of a known brand page that appears to be an exact replica of the brand page. If it is a look-alike page posing as a brand page, it may be labeled as a Brand-based Credential Stealing page. However, even if the Candidate Page does not appear to be an exact replica of a known brand page, there still is a chance that it is a fake or impostor page (i.e. a Custom Credential Stealing Page). This is where Stage 2 may come into play. In Stage 2, the system may determine whether the Candidate Page falls under the Custom Credential Stealing category.

Figure 22:
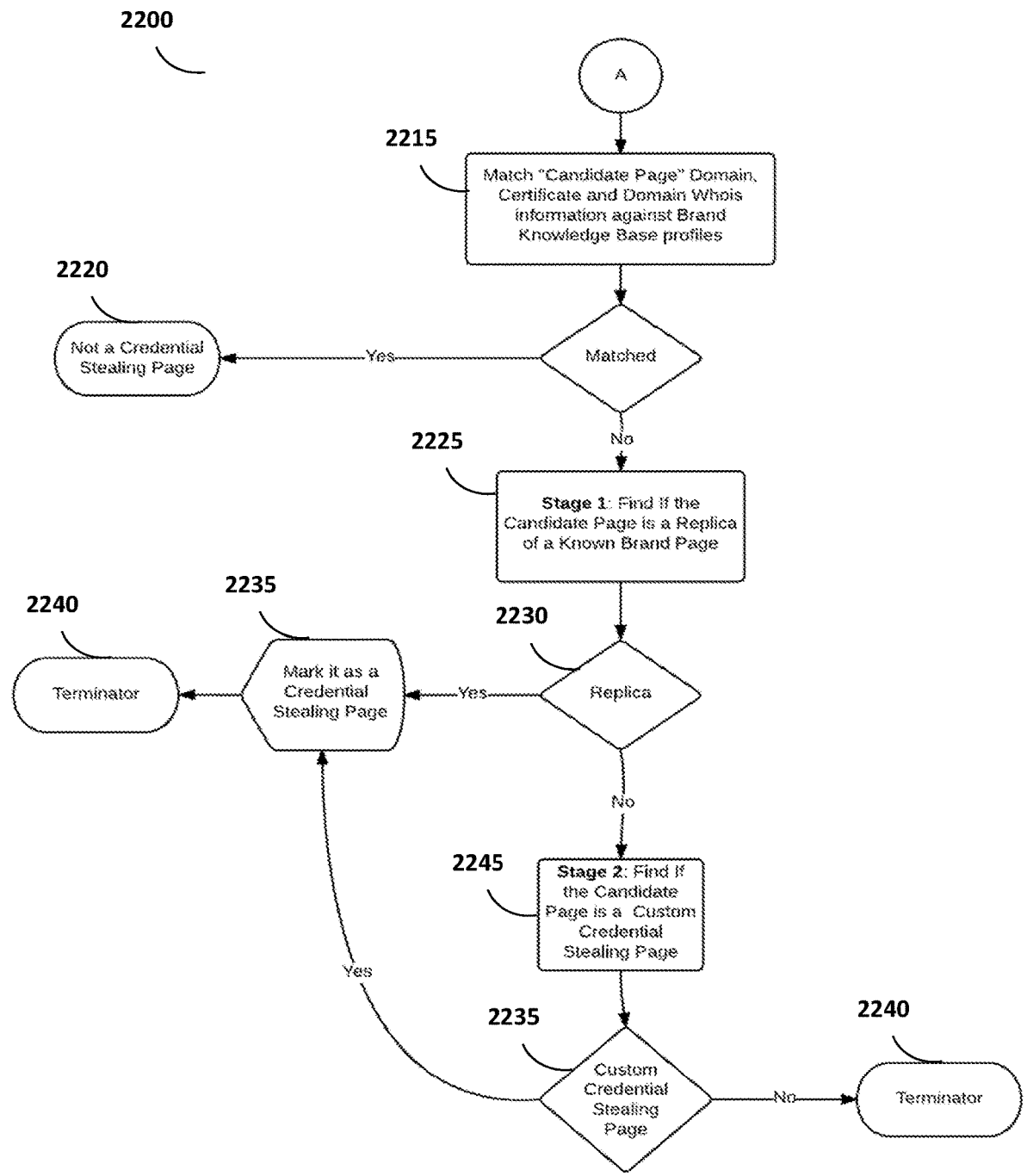
FIG. 22 is a flowchart showing an exemplary method for detecting credential stealing attacks.

FIG. 22 is a flowchart showing an exemplary method (2200) for detecting credential stealing attacks. A Candidate Page (A) may be selected. Components, features, or elements of the Candidate Page including candidate identity information such as the Candidate Page URL Domain, SSL Certificate and Domain WHOIS information and the corresponding brand identity information from one or more Brand Knowledge Base profiles (2210) may be matched (2215). If a match is found then the Candidate Page (A) may be classified as Not a Credential Stealing Page (2220). If the candidate identity information from Candidate Page (A) is not matched to the brand identity information from any of the brand profiles, then the method proceeds to Stage 1 (2225) of the two stage process. Stage 1 (2225) may determine whether the Candidate Page is a replica (2230) of a known brand page. If the Candidate Page (A) is identified as a replica then the Candidate Page (A) may be labeled as a Brand-based Credential Stealing Page (2235). At this point, a Terminator procedure may be initiated (2240) indicating that the system has determined a verdict as to whether the Candidate Page constitutes a credential stealing attack. If the Candidate Page (A) is not identified as a replica, then the method may proceed to Stage 2 (2245). Stage 2 (2245) may be used to determine whether the Candidate Page (A) is a Custom Credential Stealing Page. If the page is determined to be a Custom Credential Stealing Page, then the Candidate Page (A) is labeled as a Credential Stealing Page (2235) and a Terminator procedure may be initiated (2240) indicating that the system has determined a verdict as to whether the Candidate Page constitutes a credential stealing attack. If the Candidate Page (A) is not classified as a Custom Credential Stealing Page (2250), then a Terminator procedure may be initiated (2240) without labeling the Candidate Page as a Credential Stealing Page and the system may return a verdict that the Candidate Page is benign.

Figure 23:
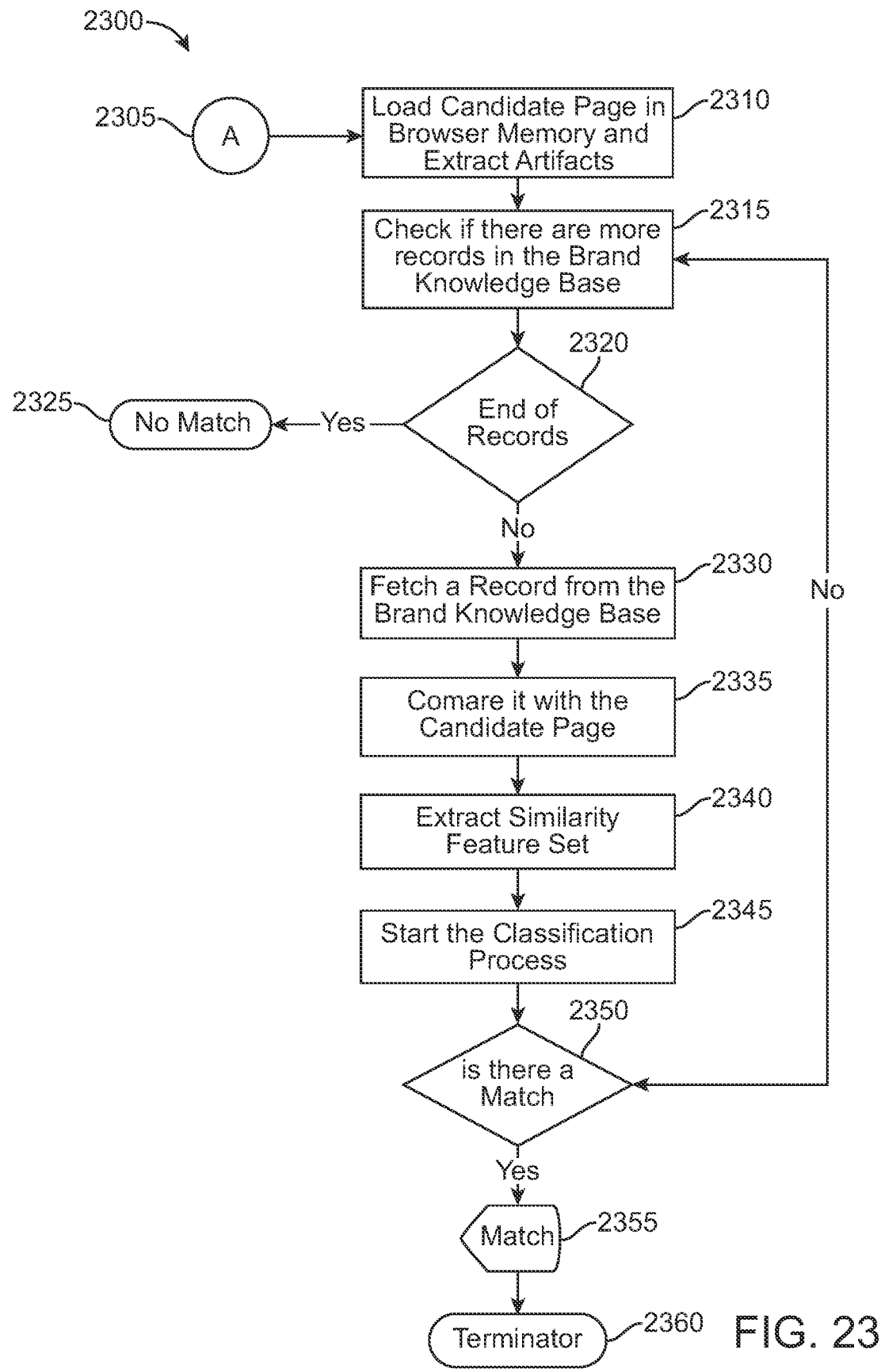
FIG. 23 is a flowchart showing an exemplary method for detecting brand-based credential stealing attacks.

FIG. 23 is a flowchart showing Stage 1 of the method (2300) for detecting custom credential stealing attacks. First a Candidate Page (A) (2305) may be selected and loaded into a browser memory, where key artifacts may be extracted (2310). Similar features from artifacts extracted from the Candidate Page may be extracted from artifacts of profiles stored in the Brand Knowledge Base. This may be done for all records or brand page profiles in the Brand Knowledge Base. The Brand Knowledge Base may be checked to determine if there are records to be processed (2315). If an end to all the records in the Brand Knowledge Base is reached and all Brand Knowledge Base records have been assessed (2320) then there may be no significant matches (2325) between the artifacts extracted from the Candidate Page (A) and the artifacts of the Brand Knowledge Base records. If the end of records (2320) is not reached, a record may be fetched from the Brand Knowledge Base (2330). A comparison may be made with features from a selected record associated with a brand page (e.g. a brand profile) retrieved from the Brand Knowledge Base and features extracted from the Candidate Page (2335). A similarity feature set may be extracted and generated from the Candidate Page (A) and the selected record stored within the Brand Knowledge Base (2340). These feature sets may be used to classify (2345) the Candidate Page (A) relative to each of the records stored in the Brand Knowledge Base, and determine whether there is a match (2350). If no match is found, the Brand Knowledge Base may be checked to determine if there are more records to be processed (2315). The subsequent record may then follow the procedure used to process each of the prior records, namely, the subsequent record may be fetched from the Brand Knowledge Base (2330), the selected record associated with a brand page may be compared with the Candidate Page (2335), a similarity feature set may be extracted (2340), the Candidate Page may undergo classification (2345), and determination of a match may be made (2350). Steps 2315, 2320, 2330, 2335, 2340, 2345, and 2350, may repeat until either the end of records is reached without a match (2325), or a match is identified (2355) and the sequence is terminated (2360).

The modules and sub-modules described in FIG. 21 may participate in Stage 1 of any method disclosed herein. At Stage 1, the Page Examination Engine (2105) hands over or passes the Candidate Page identity information such as the URL to the Brand Based Credential Stealing Detection Module (2110) for a determination as to whether or not the Candidate Page is a Brand-based Credential Stealing page. A Brand Based Credential Stealing Detection Module (2110) may further invoke the Page Rendering Module (2115) to load/render the Candidate Page in the Browser Memory by extracting its image, written text, and source code. The image, written text, and source code of the Candidate Page may then handed over or passed to the Brand Similarity Feature Extractor (2125) to extract similarity features by comparing artifacts (e.g. candidate features) extracted from the Candidate Page with artifacts (e.g. brand features) from each of the brand profiles stored in the Brand Knowledge Base (2130) to generate extracted similarity feature sets. The extracted similarity feature set may then be handed over or passed to the Brand Page Matching Classifier (2120) module to determine whether the Candidate Page appears to be a replica of any of the brand pages stored in the Brand Knowledge Base (2130). If a match is found as a result of comparing the candidate features to the brand features based on the similarity feature sets, the system may flag the Candidate Page as a Brand-based Credential Stealing Page. If no match is found, the system may proceed to Stage 2 of the two stage process.

Figure 24:
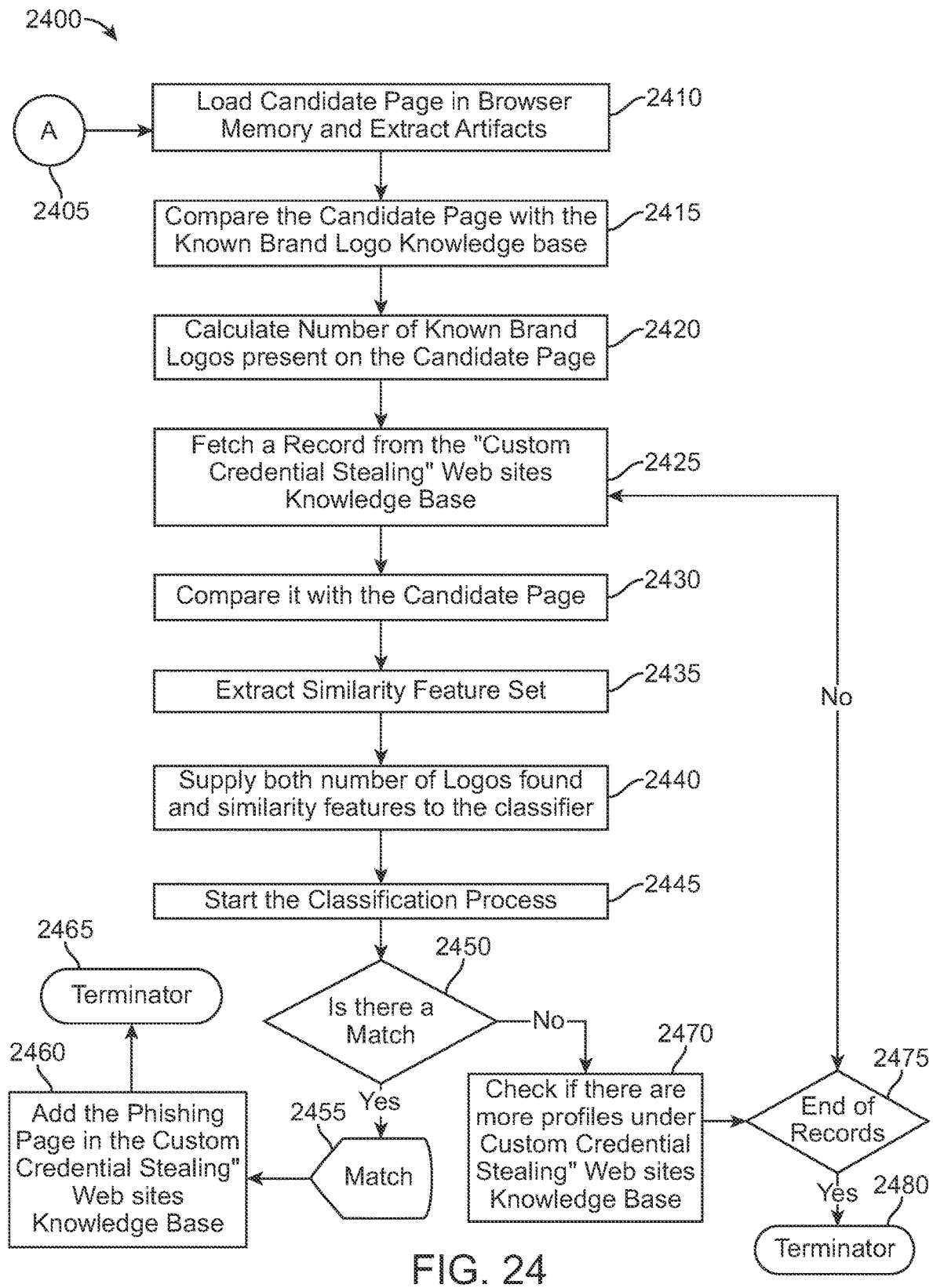
FIG. 24 is a flowchart showing an exemplary method for detecting custom credential stealing attacks.

FIG. 24 is a flowchart showing Stage 2 of a method (2400) for detecting custom credential stealing attacks. A Candidate Page (A) (2405) may be selected and loaded into a browser memory and one or more artifacts (e.g. candidate features) may be extracted (2410). The Candidate Page (A) may be compared with artifacts from brand logo profiles stored in the Known Brand Logo Knowledge Base (2415). In a preferable embodiment, the number of Known Brand Logos present on the Candidate Page may be calculated (2420). A record (e.g. a custom profile associated with a known or identified Custom Credential Stealing Page) from the Custom Credential Stealing Websites Knowledge Base may be fetched (2425) and compared (2430) with the Candidate Page (A). A similarity feature set may be generated (2435) from extracted candidate features, from custom features (e.g. features extracted from custom profiles), and from the numbers of logos found on the Candidate Page. The generated similarity feature set may then be supplied to the classifier (2440). The classification process may be started (2445) and a determination made as to whether a match based on analyzing the similarity feature set does or does not exist (2450). If a match is found (2455) then the Candidate Page (A) may be identified or classified as a Custom Credential Stealing Page and it may be added to the Custom Credential Stealing Websites Knowledge Base (2460). A termination sequence may then be initiated (2465) indicating that the system has determined a verdict as to whether the Candidate Page constitutes a credential stealing attack. If a match is not identified (2450), then the method proceeds to check whether there are more profiles or records in the Custom Credential Stealing Websites Knowledge Base (2470) to process. If there are more records, another record may be fetched (2425), compared with the Candidate Page (2430), features from each record may be extracted and a similarity feature set generated (2435), the number of logos and features may be supplied to the classifier (2440), and classification (2445) as well as a match determination (2450) may be made. This sequence of 2425, 2430, 2435, 2440, 2445, and 2450 may repeat until either a match is identified (2455), or no records remain (2475) in the Custom Credential Stealing Websites Knowledge Base, which will trigger initiation of a termination sequence (2480) that no match has been found. The system may then return a verdict that the Candidate Page is benign.

One or more modules and sub-modules described in FIG. 21 may participate in Stage 2 of any method disclosed herein. The purpose of Stage 2 may be to determine if the Candidate Page is a Custom Credential Stealing Page or not. At this stage, both the image and source code of the Candidate Page may be handed over or passed to the Custom Credential Stealing Feature Extractor (2145) that extracts features and generates a similarity feature set between the Candidate Page and each record or profile stored in the Custom Credential Stealing Knowledge Base (2155) and Brand Logo Knowledge Base (2160). The similarity feature sets may be handed over or passed to the Custom Credential Stealing Detection Classifier module (2150), which determines whether or not the Candidate Page is a Custom Stealing Page. If a match is found based on the similarity feature sets, the system may flag the Candidate Page as a Credential Stealing Page that falls under the Custom category. If no match is found, the system may classify the Candidate Page as a legitimate or authentic page, and the sequence may stop or terminate.

Figure 25:
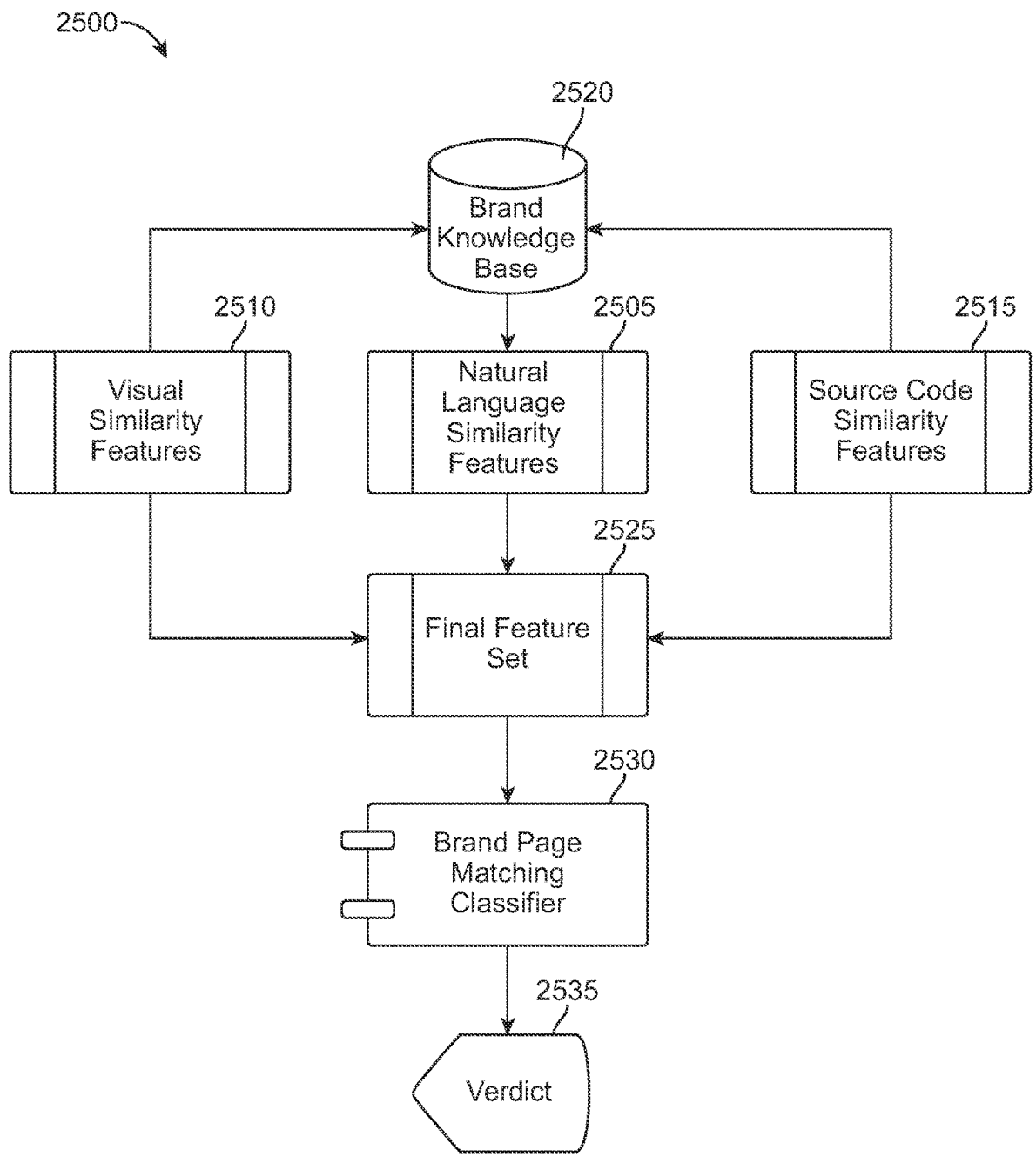
FIG. 25 is a flowchart providing further details of the exemplary method of FIG. 23.

FIG. 25 is a flowchart providing further details on the classification process (2500) used in an exemplary method of FIG. 23. The purpose of this classification process may be to find out if a Candidate Page looks similar to a known brand page or not. This classification system may comprise binary classification criterion based on supervised machine learning that has just two outcomes "matched" or "not-matched." FIG. 25 depicts the classification method. Three types of feature categories: Visual Similarity Features (2510), Natural Language Similarity Features (2505), and Source Code Similarity Features (2515), are extracted from records in the Brand Knowledge Base (2520) to generate similarity feature sets in the Final Feature Set (2525). These similarity feature sets are then fed into a Brand Page Matching Classifier (2530) which processes and analyzes the similarity feature sets to compute a verdict (2535).

Visual Similarity Features may be extracted through visual analysis. As part of this analysis, the image file of a candidate page may be compared to each of the individual Brand Page Image files stored in the brand profiles in the Brand Knowledge Base. Each comparison may generate one or more features which may include: total graphical interest points available in the Candidate Page, total graphical interest points available in a Brand Page, Graphical Interest points matched between the Candidate and a Brand Page, Image Size of the Candidate Page or Image Size of a Brand Page.

Natural Language Similarity Features may be related features that are extracted by analyzing text written on the Candidate Page and comparing it with text written on a Brand Page. Such analysis may include or consider natural language used on the Candidate Page, natural language used on the Brand Page, percentage of text matched between the Candidate Page and Brand Page, number of user inputs required by the Candidate Page, number of user inputs required by a Brand Page, number of readable paragraphs in the Candidate Page, number of readable paragraphs in a Brand Page.

Source Code Similarity Features may be used to check if there is a source code similarity between the candidate page and a known Brand Page. An analysis of source code similarity features may include taking into account: percentage of html source code matched between the Candidate Page and a Brand Page, percentage of style-sheet code matched between the Candidate Page and a Brand Page, number fonts and size matched between the Candidate Page and a Brand Page, number of external hyperlinks links matched between the Candidate Page and a Brand Page, and number of internal hyperlinks links matched between the Candidate Page and a Brand Page.

Figure 26:
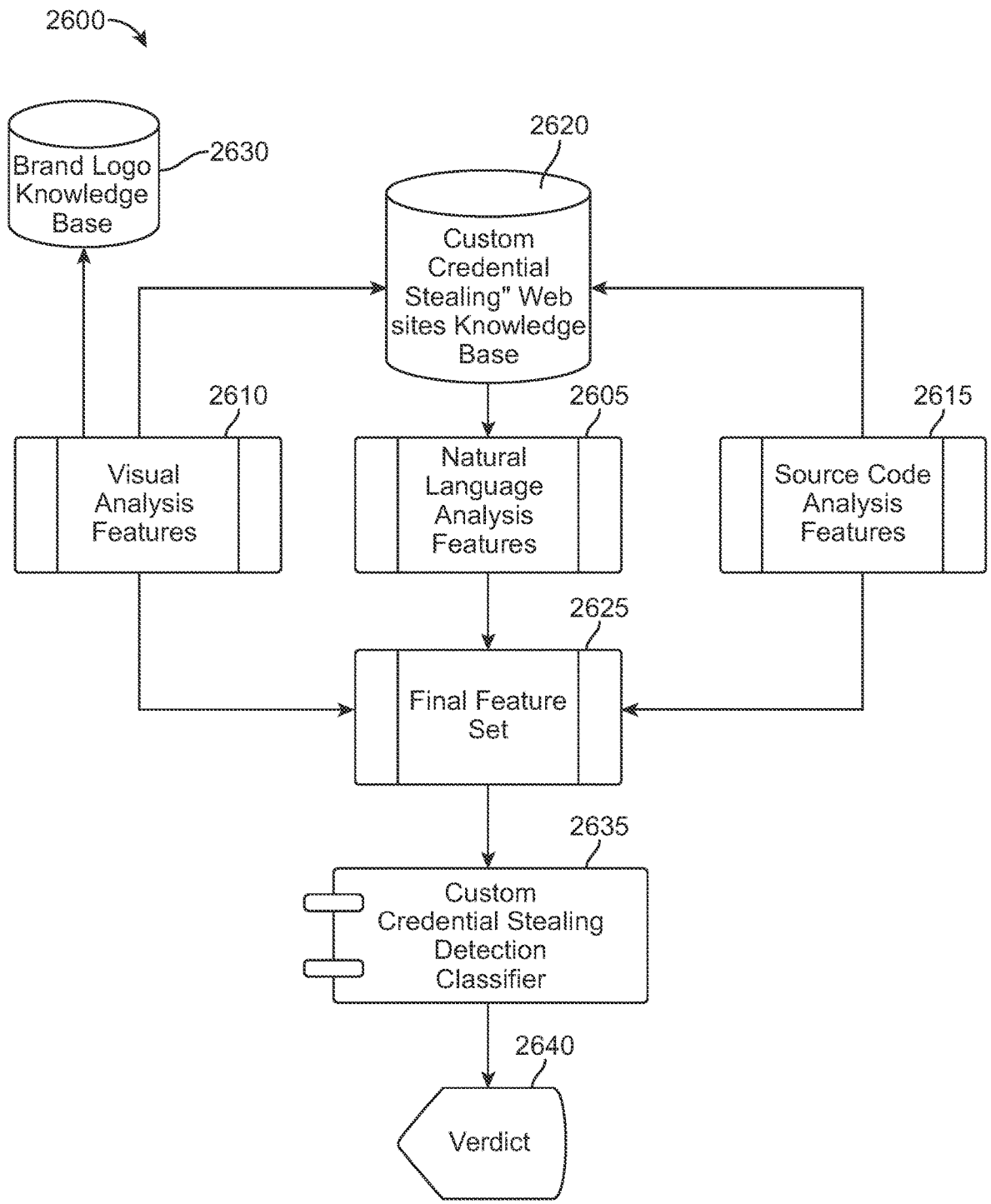
FIG. 26 is a flowchart providing further details of the exemplary method of FIG. 24.

FIG. 26 is a flowchart providing further details for the classification process (2600) used in exemplary method of FIG. 24. The purpose of this second stage classification process may be to detect credential stealing attacks where the Credential Stealing Pages do not appear to be an exact replica of a brand page. These Custom Credential Stealing Pages will typically have some resemblance to a particular brand page, for example by displaying brand logos and brand names, but the overall page layout and information being asked may be different from a brand page. As part of this second stage classification, a Candidate Page is cross compared with known Custom Credential Stealing Pages and known brand logos. The classification model may comprise a classifier, e.g. a binary classifier. Binary classification may be based on a machine learning model that has only two outcomes—either it is a Custom Credential Stealing Page or it is a Benign Page.

The Candidate Page may be compared with known Custom Credential Stealing Pages stored in the Custom Credential Stealing Websites Knowledge Base (2620), and known brand logos stored in the Brand Logo Knowledge Base (2630). The comparison may be made by extracting features from the candidate page and comparing these against similar features extracted from the Custom Credential Stealing Pages and known brand logos. These extracted features may be divided into three categories: Visual Analysis Features, Natural Language Analysis Features, and Source Code Analysis Features.

FIG. 26 depicts a classification method (2600). Three types of feature categories, Visual Similarity Features (2610), Natural Language Similarity Features (2605), and Source Code Similarity Features (2615), are extracted from records in the Custom Credential Stealing Website Knowledge Base (2620) to generate similarity feature sets in the Final Feature Set (2625). The Visual Similarity Features (2610) may also be extracted from records in the Brand Logo Knowledge Base (2630). The generated similarity feature sets are then fed into a Custom Credential Stealing Detection Classifier (2635) which processes and analyzes the similarity feature sets to compute a verdict (2640).

Visual Analysis Features may comprise features extracted through visual analysis. As part of this visual analysis, one or more image files of the candidate may be compared to each Custom Credentials Stealing Image file stored in a custom profile in the Custom Credential Stealing Websites Knowledge Base. In a preferable embodiment, the image file may be compared with an image file from a brand logo stored in the Brand Logo Knowledge base to determine whether the Candidate Page contains one or more brand logos. Each comparison may result in identifying features used to generate similarity feature sets, including: total number of brand logos found on the Candidate Page, total graphical interest points available on the Candidate Page, total graphical interest points available on a Custom Credential Stealing Page, and graphical interest points matched between the Candidate and a Custom Credential Stealing Page.

Natural Language Analysis Features may perform one or more functions. In a preferable embodiment, Natural Language analysis may be used to determine whether there is text similarity between the candidate page and a known Credential Stealing Page. Natural Language Analysis Features may further be used to understand the whole purpose behind the candidate page e.g. is the page asking for confidential information like Username, Password, Social Security number etc., or it's just meant for simple reading. To perform the text similarity analysis, a syntactic analysis on the Candidate Page's text data may be performed and cross referenced with text against each Custom Credential Stealing. Based on this comparison a text similarity index may be calculated. A similarity index can vary from between 0 to 100%. In order to find the type of information being asked by the Candidate Page, overall text may be divided in multiple segments like simple reading paragraphs, headlines, labels of the input controls like buttons and password fields. Labels extracted from the input fields may be analyzed through dictionary and grammar analysis to understand their meanings. An English translation for these labels may be performed if system detects the language being used is not English. This whole analysis may result in a certain number of categorical (e.g. binary) and numeric features that are later used to classify the Candidate Page. Features used in the analysis may include: Text similarity index between the Candidate Page and a Custom Credential Stealing Page, Total number of input fields on the Candidate Page, Is the Candidate Page asking for a password, Is the Candidate Page asking for Social Security number, and Is the Candidate Page asking for an ATM Pin.

In a preferable embodiment, Source Code Analysis Features may perform the purpose of understanding how the Candidate Page is collecting and sending confidential information. Features used in this analysis may include: the number of hyperlinks pointing to un-trusted domains, the number of hyperlinks pointing to trusted-domains, the number of Password fields on the Candidate Page, whether there is a "Submit form" on the Candidate Page, and the Protocol being used to submit the information, e.g. is it "http" or "https."

Once a Candidate Page is declared a Custom Credential Stealing Page it may be added as a new custom profile in the Custom Credential Stealing Websites Knowledge Base. Moreover, the Brand Knowledge base may get periodically updated with the most of up-to-date Profile pages.

Almost all of the global brands keep their web sites dynamic. For example, their sign-in and sign-up pages are periodically updated visually and textually. Thus, in order to the keep the Brand Knowledge base up-to-date with current elements of these known brands, an autonomous process may be provided to periodically access the brand web sites over the internet and to download the most up-to-date image files, text, and source code automatically.

Figure 27:
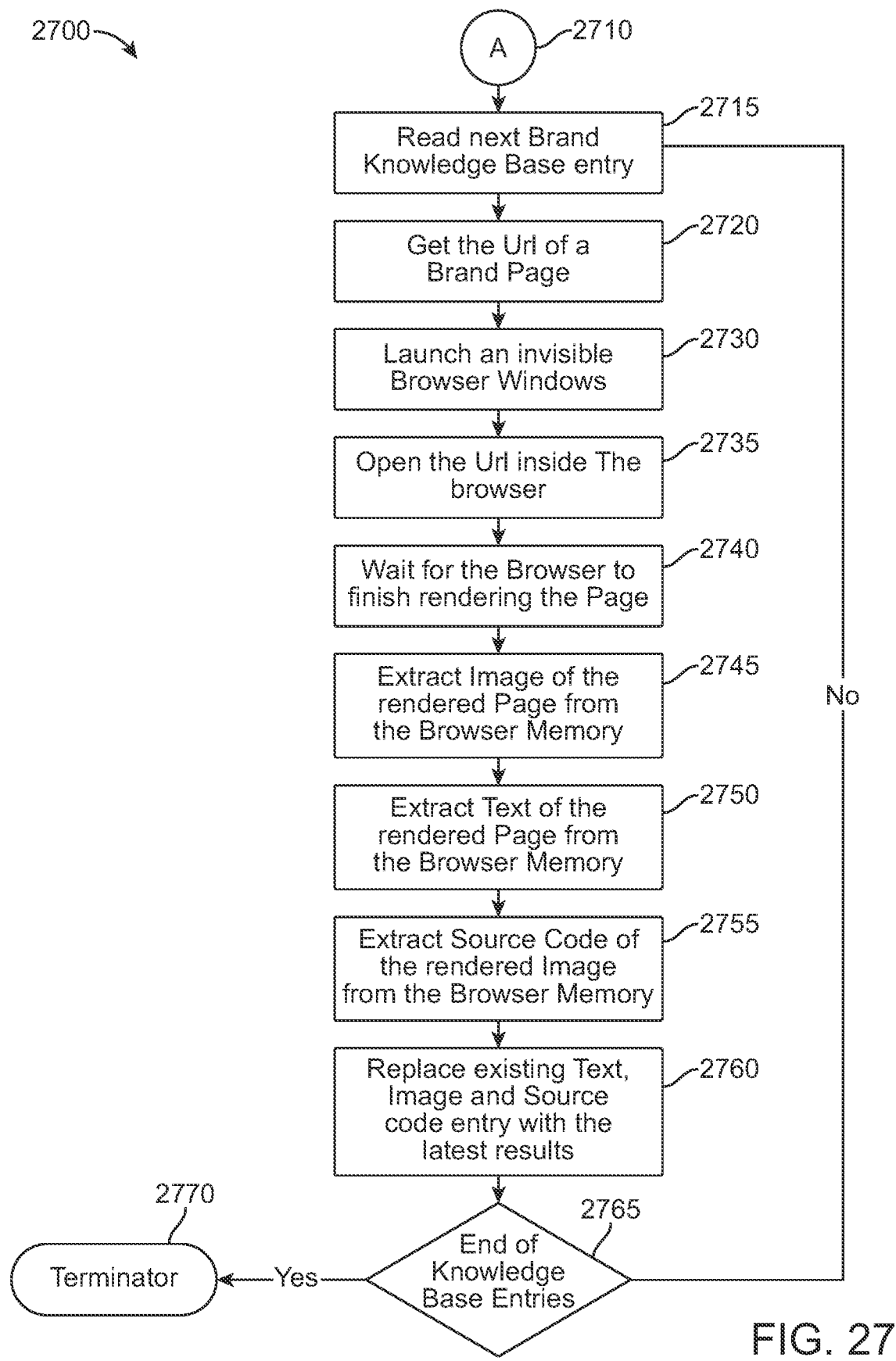
FIG. 27 is a flowchart showing an exemplary method for updating a knowledge base for an embodiment of an Active Vision System.

FIG. 27 is a flowchart showing an exemplary method for updating a knowledge base for an embodiment of an Active Vision System. As shown in FIG. 27, a method for updating (2700) may start by accessing the Brand Knowledge Base at (A) (2710). The next Brand Knowledge Base entry (e.g. a record or brand profile) may be read (2715) and the URL of a brand page may be obtained (2720). An invisible browser window may be launched (2730) and subsequently, the URL of the brand page may be opened inside the browser (2735) and the brand page may be loaded, rendered, and stored in the browser memory. After the system has waited for the browser to finish rendering the brand page (2740), an image of the rendered brand page may be extracted from the browser memory (2745). In addition, text (2750) of the rendered brand page and source code (2755) of the rendered image may also be extracted from the browser memory (2750). The system may then replace existing text, image, and source code of the entry (e.g. record or brand profile) with the latest results (2760) thus updating the brand profile. The system queries whether it has reached the end of the Brand Knowledge Base entries. If the system has not reached the end and there are still more brand profiles to be updated, the method proceeds to read the next Brand Knowledge Base entry (2715). If the system has reached the end and there are no more brand profiles to be updated, the method terminates (2770) and the updating process is complete.

Using these systems and methods, the Active Vision System may learn from its past experience and from environmental changes. Accordingly, with time the Active Vision System may become incrementally more accurate in its future predictions.

The output given by Active Vision system i.e. "It's a Brand Based Credential Stealing", "It's a Custom Credential Stealing Page", "It's Not a Credential Stealing Page" is further handed over to the Active Feature Extractor that uses this output as one of the many features and combines it with features extracted from other Active Analysis modules like Active Intelligence to create a final feature set. At the end final feature set gets processed by Self Learning Active Classifiers to reach the final decision. This multi layered classification allows the system to remove occasional False +ves and –ves that may result from Active Vision level classification.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A cyber defense system for detecting and blocking malicious cyber activity of a network, the cyber defense system comprising: at least one processor, a memory, and a computer program including instructions executable by the processor to create an application, wherein the application comprises:
 (a) a first module configured to monitor and capture network session activity between one or more client devices and one or more internet servers and to extract a network flow from the network session activity;

(b) a second module configured to evaluate the network flow to identify a type of protocol associated with the network flow; and (c) a third module configured to:
 i. extract and evaluate a first set of features from the network flow,
 ii. classify the network flow as a potentially malicious flow or as a benign flow by processing the first set of features using a first set of classifiers, and
 iii. evaluate only the potentially malicious flow and to determine whether the potentially malicious flow is malicious or benign by: collecting active features in real-time and processing the active features using a second set of classifiers different from the first set of classifiers.

2. The cyber defense system of claim 1, wherein the application further comprises a fourth module configured to:
 i. identify a malware name in response to the malicious flow and to evaluate the malicious flow to identify a hacker group responsible for an attack associated with the malicious flow; and
 ii. block subsequent communication associated with the malicious flow.

3. The cyber defense system of claim 2, wherein the fourth module is further configured to store the infected machine and user information, and wherein the stored infected machine and user information are marked as an incident.

4. The cyber defense system of claim 2, wherein the fourth module is further configured to send a notification related to the incident.

5. The cyber defense system of claim 1, wherein the first set of features comprise protocol features.

6. The cyber defense system of claim 5, wherein the first set of features further comprise one or more members selected from the group consisting of: binary features, nominal features, and numeric features.

7. The cyber defense system of claim 1, wherein the potentially malicious flow is classified using automated self-learning classifiers.

8. The cyber defense system of claim 1, wherein the active features comprise at least visual and natural language based features.

9. The cyber defense system of claim 8, wherein the visual and natural language based features comprise at least images.

10. The cyber defense system of claim 8, wherein the active features further comprise features extracted from real-time intelligence collected by probing a suspicious server associated with the potentially malicious flow.

11. The cyber defense system of claim 1, wherein the second set of classifiers are automated self-learning classifiers.

12. The cyber defense system of claim 1, wherein the first set of classifiers are selected based on the type of protocol identified in (b).

13. The cyber defense system of claim 12, wherein each of the first set of classifiers corresponds to a type of protocol.

14. The cyber defense system of claim 9, wherein the at least visual and natural language based features are processed by the second set of classifiers to detect a credential stealing attack.

15. The cyber defense system of claim 14, wherein the second set of classifiers.

16. The cyber defense system of claim 10, wherein the real-time intelligence comprises evasion-based intelligence about a presence of an evasion behavior of the one or more internet servers employing an evasion technique to avoid detection of malicious activities of the one or more internet servers.

17. The cyber defense system of claim 10, wherein the real-time intelligence is collected using anonymous VPN/Proxy servers to establish out-of-band connections with the one or more internet servers.

* * * * *